US012527853B2

(12) United States Patent
Puntervoll et al.

(10) Patent No.: US 12,527,853 B2
(45) Date of Patent: Jan. 20, 2026

(54) HEAT-STABLE ENTEROTOXINS MUTANTS AS ANTIDIARRHEAL VACCINE ANTIGENS

(71) Applicant: VESTLANDETS INNOVASJONSSELSKAP AS (VIS), Bergen (NO)

(72) Inventors: Pål Puntervoll, Bergen (NO); Françoise Baleux, Paris Cede (FR); Yves-Marie Coïc, Paris Cede (FR); Yuleima Diaz, Bergen (NO); Morten Andreas Govasli Larsen, Bergen (NO); Laurence Mulard, Paris Cede (FR); Arne Taxt, Oslo (NO); Ephrem Debebe Zegeye, Bergen (NO); Sandhya Srikant Visweswariah, Bangalore (IN); Vishwas Mishra, Bangalore (IN); Anaxee Barman, Bangalore (IN)

(73) Assignee: VESTLANDETS INNOVASJONSSELSKAP AS (VIS), Bergen (NO)

( * ) Notice: Subject to any disclaimer, the term of this patent is extended or adjusted under 35 U.S.C. 154(b) by 551 days.

(21) Appl. No.: 17/271,127

(22) PCT Filed: Aug. 22, 2019

(86) PCT No.: PCT/IB2019/057082
§ 371 (c)(1),
(2) Date: Jan. 23, 2023

(87) PCT Pub. No.: WO2020/039387
PCT Pub. Date: Feb. 27, 2020

(65) Prior Publication Data
US 2022/0249644 A1   Aug. 11, 2022

(30) Foreign Application Priority Data
Aug. 24, 2018  (EP) .................................... 18306137

(51) Int. Cl.
*A61K 39/108*  (2006.01)
*A61K 39/00*   (2006.01)
*C07K 14/245*  (2006.01)

(52) U.S. Cl.
CPC ........ *A61K 39/0258* (2013.01); *C07K 14/245* (2013.01); *A61K 2039/6037* (2013.01)

(58) Field of Classification Search
None
See application file for complete search history.

(56) References Cited

U.S. PATENT DOCUMENTS 4,912,094 A   3/1990 Myers et al.
4,987,237 A   1/1991 Myers et al.
7,371,727 B2 *  5/2008 Currie .................. C07K 7/08
                                           435/325
10,166,279 B2 *  1/2019 Puntervoll ......... A61K 39/0258
2008/0220519 A1   9/2008 Hsu et al.

FOREIGN PATENT DOCUMENTS

| WO | 1999/09416 A2 | 2/1999 |
|---|---|---|
| WO | 2005/087797 A1 | 9/2005 |
| WO | 2007/022531 A1 | 2/2007 |
| WO | 2010/048322 A1 | 4/2010 |
| WO | 2011/156453 A1 | 12/2011 |
| WO | 2014/128555 A2 | 8/2014 |
| WO | 2014/131008 | 8/2014 |
| WO | 2017/094793 A1 | 6/2017 |
| WO | 2018/007999 A1 | 1/2018 |
| WO | 2018/193427 A1 | 10/2018 |

OTHER PUBLICATIONS

A. Taxt et al. , Infection and Immunity vol. 78, No. 5, pp. 1824-1831, May 1, 2010 (Year: 2010).*
Taxt et al., Infection and Immunity vol. 78, No. 5, pp. 1824-1831, May 1, 2010 (Year: 2010) (Year: 2010).*
Ruan et al. Infection and Immunity, vol. 82, No. 5, pp. 1823-1832, May 2014. (Year: 2014).*
Taxt et al., (Infection and Immunity vol. 84, No. 4, pp. 1239-1249, Apr. 2016) (Year: 2016).*
Wang Shilong et al., Protein Chemistry, pp. 90-92, 124-125, Tongji University Press, published on Aug. 2012 (original and machine translation).
Altboum Z et al., "Genetic Characterization and Immunogenicity of coli Surface Antigen 4 from Enterotoxigenic *Escherichia coli* when It Is Expressed in a Shigella Live-Vector Strain," Infect. Immun., Mar. 2003, vol. 71(3) pp. 1352-1360.
Borgia J A and Fields G B, "Chemical synthesis of proteins," TibTech, 2000, vol. 18(6), pp. 243-251.
Clements J D and Norton E D, "The Musosal Vaccine Adjuvant LT(R192G/L211A) or dmLT," mSphere, Jul. 25, 2018, vol. 3(4): e00215-18.
Coffin et al., "Retroviruses," 1997, Cold Spring Harbour Laboratory Press (eds) J M Coffin, S M Hughes, H E Marmus, pp. 758-763.
Diaz Y et al., "Immunizations with Enterotoxigenic *Escherichia coli* Heat-Stable Toxin Conjugates Engender Toxin-Neutralizing Antibodies in Mice That Also Cross-React with Guanylin and Uroguanylin," Infect. Immun., Jun. 20, 2019, vol. 87(7): e00099-19.
Govasli M L et al., "Purification and Characterization of Native and Vaccine Candidate Mutant Enterotoxigenic *Escherichia coli* Heat-Stable," Toxins (Basel), Jul. 3, 2018, vol. 10(7): E274.
Krah S et al., "Single-domain antibodies for biomedical applications," Immunopharmacology and Immunotoxicology, 2016, vol. 38, No. 1, pp. 21-28.

(Continued)

*Primary Examiner* — Jana A Hines
*Assistant Examiner* — Khatol S Shahnan Shah
(74) *Attorney, Agent, or Firm* — McDonnell, Boehnen, Hulbert, Berghoff, LLP

(57) ABSTRACT

The present invention relates to mutants of an *E. coli* heat-stable toxin (ST) having the following wild-type sequence: NSSNYCCELCCNPACTGCY wherein the mutant has two mutations wherein the first mutation is selected from L9K, L9N and L9T and the second mutation is A14T.

8 Claims, 22 Drawing Sheets

Specification includes a Sequence Listing.

(56) References Cited

OTHER PUBLICATIONS

Khetarpal S A et al., "A human APOC3 missense variant and monoclonal antibody accelerate apoC-III clearance and lower triglyceride rich lipoprotein levels", Nature Medicine, Aug. 21, 2017, vol. 23, No. 9, pp. 1086-1094.

Lockwood D E and Robertson D C, "Development of a competitive enzyme-linked immunosorbent assay (ELISA) for *Escherichia coli* heat-stable enterotoxin (Sta)," J Immunol. Methods, Dec. 31, 1984, vol. 75(2), pp. 295-307.

Liu et al., "Modified heat-stable toxins (hSTa) of Enterotoxigenic *Escherichia coli* lose toxicity but display antigenicity after being genetically fused to heat-labile toxid LT (R192G)," Toxins, Dec. 15, 2011, vol. 3, No. 12, pp. 1146-1162.

Okamoto et al., "Reduction of enterotoxic activity by substitution for an asparagine residue", Infection and Immunity, Aug. 1, 1988, vol. 56, No. 8, pp. 2144-2148.

Presolski S I et al., "Copper-Catalyzed Azide-Alkyne Click Chemistry for Bioconjugation," Current Protocols in Chemical Biology, 2011, vol. 3, pp. 153-162.

Rivera F P et al., "Genotypic and Phenotypic Characterization of Enterotoxigenic *Escherichia coli* Strains Isolated from Peruvian Children," J Clin Microbiol, Sep. 2010, vol. 48(9) pp. 3198-3203.

Taxt A et al., "Heat-stable enterotoxin of enterotoxigenic *Escherichia coli* as a vaccine target", Infection and Immunity, May 1, 2010, vol. 78 No .5 pp. 1824-1831.

Taxt A M et al., "Towards rational design of a toxoid vaccine against the heat-stable toxin of *Escherichia coli*," Infect. Immun., 2016, vol. 84, pp. 1239-1249.

Van der Put, R M et al., "A Synthetic Carbohydrate Conjugate Vaccine Candidate against Shigellosis: Improved Bioconjugation and Impact of Alum on Immunogenicity," Bioconj Chem, 2016, vol. 27, p. 883.

Yamasaki S et al., "Structure-activity relationship of *Escherichia coli* heat-stable enterotoxin: Role of Ala residue at position 14 I toxin-receptor interaction," Bulletin of the Chemical Society of Japan, Jul. 1, 1990, vol. 63, No. 7, pp. 2063-2070.

Zegeye E D et al., "Development of an enterotoxigenic *Escherichia coli* vaccine based on the heat-stabletoxin, " Human Vaccines Immunotherapeutics, 2019, vol. 15(6) pp. 1379-1388.

Zhang W et al., "Genetic fusions of heat-labile (LT) and heat-stable (ST) toxoids of porcine enterotoxigenic *Escherichia coli* elicit neutralizing anti-LT and anti-Sta antibodies," Infection and Immunity, Jan. 1, 2010, vol. 78, No. 1, pp. 316-325.

Harlow and Lane (1988), Antibodies: A laboratory Manual, Chapter 5, pp. 83-137.

Harlow and Lane (1988), Antibodies: A laboratory Manual, Chapter 6, pp. 139-243.

\* cited by examiner

```
STp          - N T F Y C C E L C C N P A C A G C Y
STh          N S S N Y C C E L C C N P A C T G C Y
uroguanylin  - - - N D D C E L C V N V A C T G C L
guanylin     - - - P G T C E I C A Y A A C T G C -
```

FIG. 1

SEQUENCE LISTING

<160> NUMBER OF SEQ ID NOS: 18

<210> SEQ ID NO 1
<211> LENGTH: 19
<212> TYPE: PRT
<213> ORGANISM: Escherichia coli

<400> SEQUENCE: 1

Asn Ser Ser Asn Tyr Cys Cys Glu Leu Cys Cys Asn Pro Ala Cys Thr
1               5                   10                  15

Gly Cys Tyr

<210> SEQ ID NO 2
<211> LENGTH: 18
<212> TYPE: PRT
<213> ORGANISM: Escherichia coli

<400> SEQUENCE: 2

Asn Thr Phe Tyr Cys Cys Glu Leu Cys Cys Asn Pro Ala Cys Ala Gly
1               5                   10                  15

Cys Tyr

<210> SEQ ID NO 3
<211> LENGTH: 16
<212> TYPE: PRT
<213> ORGANISM: Homo sapiens

<400> SEQUENCE: 3

Asn Asp Asp Cys Glu Leu Cys Val Asn Val Ala Cys Thr Gly Cys Leu
1               5                   10                  15

<210> SEQ ID NO 4
<211> LENGTH: 15
<212> TYPE: PRT
<213> ORGANISM: Homo sapiens

<400> SEQUENCE: 4

Pro Gly Thr Cys Glu Ile Cys Ala Tyr Ala Ala Cys Thr Gly Cys
1               5                   10                  15

<210> SEQ ID NO 5
<211> LENGTH: 19
<212> TYPE: PRT
<213> ORGANISM: Artificial Sequence
<220> FEATURE:
<223> OTHER INFORMATION: mutant heat-stable toxin sequence

<400> SEQUENCE: 5

Asn Ser Ser Asn Tyr Cys Cys Glu Lys Cys Cys Asn Pro Thr Cys Thr
1               5                   10                  15

Gly Cys Tyr

<210> SEQ ID NO 6
<211> LENGTH: 19
<212> TYPE: PRT
<213> ORGANISM: Artificial Sequence
<220> FEATURE:
<223> OTHER INFORMATION: mutant heat-stable toxin sequence

<400> SEQUENCE: 6

Asn Ser Ser Asn Tyr Cys Cys Glu Asn Cys Cys Asn Pro Thr Cys Thr
1               5                   10                  15

Gly Cys Tyr

```
<210> SEQ ID NO 7
<211> LENGTH: 19
<212> TYPE: PRT
<213> ORGANISM: Artificial Sequence
<220> FEATURE:
<223> OTHER INFORMATION: mutant heat-stable toxin sequence

<400> SEQUENCE: 7

Asn Ser Ser Asn Tyr Cys Cys Glu Thr Cys Cys Asn Pro Thr Cys Thr
1               5                   10                  15

Gly Cys Tyr

<210> SEQ ID NO 8
<211> LENGTH: 19
<212> TYPE: PRT
<213> ORGANISM: Artificial Sequence
<220> FEATURE:
<223> OTHER INFORMATION: mutant heat-stable toxin sequence

<400> SEQUENCE: 8

Asn Ser Ser Asn Tyr Cys Cys Glu Ser Cys Cys Asn Pro Thr Cys Thr
1               5                   10                  15

Gly Cys Tyr

<210> SEQ ID NO 9
<211> LENGTH: 19
<212> TYPE: PRT
<213> ORGANISM: Artificial Sequence
<220> FEATURE:
<223> OTHER INFORMATION: mutant heat-stable toxin sequence

<400> SEQUENCE: 9

Asn Ser Ser Asn Tyr Cys Cys Glu Ala Cys Cys Asn Pro Thr Cys Thr
1               5                   10                  15

Gly Cys Tyr

<210> SEQ ID NO 10
<211> LENGTH: 19
<212> TYPE: PRT
<213> ORGANISM: Artificial Sequence
<220> FEATURE:
<223> OTHER INFORMATION: mutant heat-stable toxin sequence

<400> SEQUENCE: 10

Asn Ser Ser Asn Tyr Cys Cys Glu Gly Cys Cys Asn Pro Thr Cys Thr
1               5                   10                  15

Gly Cys Tyr

<210> SEQ ID NO 11
<211> LENGTH: 18
<212> TYPE: PRT
<213> ORGANISM: Artificial Sequence
<220> FEATURE:
<223> OTHER INFORMATION: mutant heat-stable toxin sequence

<400> SEQUENCE: 11

Asn Thr Phe Tyr Cys Cys Glu Lys Cys Cys Asn Pro Thr Cys Ala Gly
1               5                   10                  15

Cys Tyr

<210> SEQ ID NO 12
<211> LENGTH: 18
```

<212> TYPE: PRT
<213> ORGANISM: Artificial Sequence
<220> FEATURE:
<223> OTHER INFORMATION: mutant heat-stable toxin sequence

<400> SEQUENCE: 12

Asn Thr Phe Tyr Cys Cys Glu Asn Cys Cys Asn Pro Thr Cys Ala Gly
1               5                   10                  15

Cys Tyr

<210> SEQ ID NO 13
<211> LENGTH: 18
<212> TYPE: PRT
<213> ORGANISM: Artificial Sequence
<220> FEATURE:
<223> OTHER INFORMATION: mutant heat-stable toxin sequence

<400> SEQUENCE: 13

Asn Thr Phe Tyr Cys Cys Glu Thr Cys Cys Asn Pro Thr Cys Ala Gly
1               5                   10                  15

Cys Tyr

<210> SEQ ID NO 14
<211> LENGTH: 18
<212> TYPE: PRT
<213> ORGANISM: Artificial Sequence
<220> FEATURE:
<223> OTHER INFORMATION: mutant heat-stable toxin sequence

<400> SEQUENCE: 14

Asn Thr Phe Tyr Cys Cys Glu Ser Cys Cys Asn Pro Thr Cys Ala Gly
1               5                   10                  15

Cys Tyr

<210> SEQ ID NO 15
<211> LENGTH: 18
<212> TYPE: PRT
<213> ORGANISM: Artificial Sequence
<220> FEATURE:
<223> OTHER INFORMATION: mutant heat-stable toxin sequence

<400> SEQUENCE: 15

Asn Thr Phe Tyr Cys Cys Glu Ala Cys Cys Asn Pro Thr Cys Ala Gly
1               5                   10                  15

Cys Tyr

<210> SEQ ID NO 16
<211> LENGTH: 18
<212> TYPE: PRT
<213> ORGANISM: Artificial Sequence
<220> FEATURE:
<223> OTHER INFORMATION: mutant heat-stable toxin sequence

<400> SEQUENCE: 16

Asn Thr Phe Tyr Cys Cys Glu Gly Cys Cys Asn Pro Thr Cys Ala Gly
1               5                   10                  15

Cys Tyr

<210> SEQ ID NO 17
<211> LENGTH: 19
<212> TYPE: PRT
<213> ORGANISM: Artificial Sequence
<220> FEATURE:
<223> OTHER INFORMATION: mutant heat-stable toxin sequence

```
<400> SEQUENCE: 17

Asn Ser Ser Asn Tyr Cys Cys Glu Lys Cys Cys Asn Pro Ala Cys Thr
1               5                   10                  15

Gly Cys Tyr

<210> SEQ ID NO 18
<211> LENGTH: 18
<212> TYPE: PRT
<213> ORGANISM: Artificial Sequence
<220> FEATURE:
<223> OTHER INFORMATION: mutant heat-stable toxin sequence

<400> SEQUENCE: 18

Asn Thr Phe Tyr Cys Cys Glu Lys Cys Cys Asn Pro Ala Cys Ala Gly
1               5                   10                  15

Cys Tyr
```

HEAT-STABLE ENTEROTOXINS MUTANTS AS ANTIDIARRHEAL VACCINE ANTIGENS

This application is a national stage application under 35 U.S.C. § 371 of International Application No. PCT/IB2019/057082, filed Aug. 22, 2019, which claims priority from European Application No. 18306137.3, filed Aug. 24, 2018. The disclosures of each of these applications are incorporated herein by reference in their entirety for all purposes.

FIELD OF THE INVENTION

The present invention relates to vaccines against enterotoxigenic *Escherichia coli* (ETEC). More specifically, the present invention relates to mutants of the ETEC heat-stable enterotoxin that are suitable for use as vaccine components.

Sequence Listing Statement

A computer readable form of the Sequence Listing is filed with this application by electronic submission and is incorporated into this application by reference in its entirety. The Sequence Listing is contained in the file created on Jul. 18, 2023 having the file name "sequence listing_P115076US_updated.txt" and is 5,190 bytes in size.

BACKGROUND TO THE INVENTION

Infection with enterotoxigenic *Escherichia coli* (ETEC), a Gram-negative bacterium, is one of the major causes of diarrhea-related illness and death among children under 5 years of age in low- and middle-income countries (LMIC). These very common infections are estimated to cause some 25,000 child deaths annually and contribute to child malnutrition. Besides, ETEC is the leading cause of diarrhea among tourists and military personnel staying in ETEC endemic regions. Deaths associated with ETEC infection are declining worldwide; nevertheless, morbidity remains high. Notably, children who survive repeated diarrheal episodes have a higher risk of long-term sequelae, including impaired cognitive development, growth faltering, and obesity. Collectively, these short and long-term negative impacts of ETEC infection under-line the need for effective interventions. See: Zegeye E D, Govasli M L, Sommerfelt H, Puntervoll P. Development of an enterotoxigenic *Escherichia coli* vaccine based on the heat-stable toxin. Hum Vaccin Immunother. 2018 Aug. 6:1-10. doi: 10.1080/21645515.2018.1496768. [Epub ahead of print] PubMed PMID: 30081709.

ETEC colonises the small intestine and is transmitted by the faecal-oral route. The bacteria adhere to the intestinal epithelium via characteristic colonisation factors (CFs). CFs are fimbriae or fibrillae-filamentous proteins that are presented on the bacterial surface. To date, 25 distinct ETEC CFs have been identified (Rivera et al., J Clin Microbiol. 2010 September; 48(9): 3198-3203).

Enterotoxins known as heat stable (ST) and heat-labile (LT) toxins, in addition to CFs are virulence determinants in ETEC diarrhoea. Both toxins act by stimulating net secretion of ions and water by intestinal epithelial cells. This causes watery diarrhoea, which can lead to a cholera-like condition in the most extreme cases.

ST was identified as target for an ETEC vaccine in the early 1980s but, despite many attempts, no successful ST-based vaccine has been developed.

Three main problems underlie the difficulty in utilising ST as a vaccine component. First, the ST polypeptide is inherently toxic. Second, in its natural form, the ST polypeptide is non-immunogenic. Finally, ST closely resembles the endogenous polypeptides guanylin and uroguanylin, which raises the possibility that anti-heat-stable toxin antibodies may cross-react, and cause autoimmune reactions in vaccinees.

Porcine and human ST (STp and STh) are antigens of interest in the search for a broad coverage ETEC vaccine. Owing to their inherent toxicity and similarity with guanylin and uroguanylin (FIG. 1), toxin analogues are the only option when considering ST as antigen.

ST mutants have been disclosed in the art see, for example, Taxt, A. et al. *Infect. Immun.* 78, 1824-1831 (2010); Zhang et al (2010) Infection and Immunity 78 (1): 316-325; Liu, M. et al. *Toxins* 3, 1146-1162 (2011); WO2010/048322; Okamoto et al (1988) Infection and immunity 56 (8): 2144-2148; Yamasaki et al (1990) Bull. Chem Soc Jpn 63:2063-2070; WO2005/087797; WO2007/022531; WO2014/128555; WO2011/156453.

Several ST mutants have been reported to reduce toxicity (Taxt, A. et al. *Infect. Immun.* 78, 1824-1831 (2010) and Liu, M. et al. *Toxins* 3, 1146-1162 (2011). In this context, selected mono- and double mutants of STh have emerged as lead candidate ST toxoids (Taxt, A. M. et al, Towards rational design of a toxoid vaccine against the heat-stable toxin of *Escherichia coli*, Infect Immun, 2016, 84, 1239-1249). However, as ST is a small polypeptide, most mutants with reduced toxicity may also have reduced antigenicity and immunogenicity when coupled to a carrier.

WO2014/128555 discusses mutants of ST which have reduced toxicity.

The problem of providing a ST mutant that exhibits both reduced toxicity and elicits antibodies that can neutralize native ST is a challenge. The problem of providing a ST mutant that exhibits reduced toxicity, specific immunogenicity when coupled to a carrier, and reduced cross-reactivity remains a significant challenge.

SUMMARY OF THE INVENTION

STh and STp are 19 and 18 amino acid peptides, respectively, encompassing three disulfide bridges (FIG. 1). Both recombinant expression and chemical synthesis of peptides with three disulfide bridges is challenging. Correct cysteine pairing is of upmost importance for antigenicity, and therefore for immunogenicity. While STh and STp can be produced as recombinant peptides or as chemically synthesized peptides upon direct oxidative folding, the preparation of their analogues is challenging, especially considering the large variety of possible isomers.

In this context, the present application:

(i) reports on ST mutants, in particular ST double-mutants, encompassing an internal mutation (such as lysine and/or threonine, or an amino acid analogue encompassing a substitution compatible with orthogonal conjugation), in particular at position 9 and/or 14 of SEQ ID NO: 1 or at position 8 and/or 13 of SEQ ID NO: 2.

(ii) discloses the chemical synthesis of diverse analogues of ST double-mutants, possibly modified, for example at their N-terminus.

(iii) exemplifies that the "orthogonal chemical strategy", which relies on a combination of three sets of thiol-protecting groups orthogonal to each other, ensures that unnatural ST analogues are folded according to expectations, whether native or unnatural folding is required.

(iv) discloses ST analogues compatible with their intrachain site-selective anchoring, broadening the potential for applications as vaccines, immunogens, diagnostic tools.

(v) shows that double mutants $_{Ac}$L9KA14T and L9GA14T and $_{Ac}$L9GA14K are non-toxic antigenic mimics of STh.

(vi) discloses ST toxoid-protein conjugates, whereby ST is attached to the carrier at a single site internal to the peptide chain.

(vii) discloses a chemically synthesized immunogenic ST toxoid-protein conjugate based on a conjugation process different from the conventional glutaraldehyde-based chemistry.

(viii) discloses a chemically synthesized immunogenic ST-protein conjugate based on a thiol-maleimide conjugation process or click chemistry.

(ix) shows that double mutant L9KA14T elicits neutralizing antibodies and there is low or no cross-reactivity. The term "L9KA14T" as used herein is interchangeable with the term "L9K/A14T" and "L9K-A14T".

The present inventors have shown that the A14T mutation is a de-toxifying mutation that consistently elicit antibodies that neutralize native STh. However, some mutations of ST may lead to unwanted immunodominant neo-epitopes. Indeed, the inventors have found that an A14H mutation, unlike A14T, forms an immunodominant neo-epitope, and that the A14H mutant elicits antibodies that react poorly with the native toxin. The inventors have also shown that L9, which is shared with uroguanylin, is the central residue in a shared epitope that can elicit cross-reacting antibodies (Taxt, A. M. et al, Towards rational design of a toxoid vaccine against the heat-stable toxin of *Escherichia coli, Infect Immun*, 2016, 84, 1239-1249). To disrupt this shared epitope, the inventors have mutated the L9 residue. In one form, an L9K mutation was introduced. To avoid the lysine residue forming an immunodominant neo-epitope, the inventors found that the introduced lysine can be used as an anchor when conjugating to a carrier. In addition, the inventors found that by acetylating the N-terminus of the L9K-containing STh analogue, the lysine residue becomes the only anchor available for conjugation, thus preventing the exposure of free lysine residues to the immune system. Additional advantages of an internal lysine combined with an acetylated N-terminus is that the N-terminus will be exposed to the immune system (the N-terminal sequence is unique to ST), and allows single-site attachment of the mutant on to a carrier. Advantageously L9 mutations, and the L9K mutation in particular, are less toxic than other ST mutants.

The present inventors produced a panel of mutants and reference ST either by recombinant expression and purification or solid phase peptide synthesis (SPSS) combined to direct air-oxidation folding or to site-selective cysteine pairing. Whilst native STh adopted the right cysteine pairing independently of the protocol, important divergences have been observed for some toxoids, with a strong impact on their antigenic properties.

ST- and ST toxoid-protein conjugates produced by use of the thiol-maleimide chemistry demonstrated immunogenicity. In one embodiment LT-B was used as a protein carrier, and the inventors have found that conjugation using thiol-maleimide chemistry did not disrupt the pentameric structure of the carrier. Moreover, the inventors have found that thiol-maleimide chemistry did not lead to immunodominant neo-epitopes. Click chemistry is an alternative to the thiol-maleimide chemistry, when seen as an alkyne-azide reaction, as exemplified herein. Click chemistry could be an alternative to facilitate controlled, high loading, multivalent presentation of the toxoids when needed. The term "click chemistry" as used herein refers to ways of generating products that follows examples in nature, which also generates substances by joining small modular units.

It is an object of the present invention to provide heat-stable toxin mutants that can be used as ETEC vaccine components. Specifically, it is intended to provide mutants of ST that exhibit no or very low toxicity and are able to elicit a neutralizing, specific immune response when coupled to a suitable carrier. In a more specific aspect, it is intended to provide mutants of ST that: exhibit no or very low toxicity; are able to elicit a neutralizing, specific immune response when coupled to a suitable carrier; and exhibit no or low cross-reactivity.

To address the problems, a screen of ST mutants (in particular, STh mutants) has been performed.

Mutants can be expressed with a signal sequence to direct the proteins for secretion from the host cell and expression may be carried out using an *E. coli* lab strain. In some embodiments, this experimental model effectively mimics native ST production by ETEC. In other embodiments, the mutants do not have native ST folding.

Native STh and STp, as well as ST mutants can also be expressed recombinantly as cleavable fusions to the disulfide isomerase DsbC, which allows the purification of correctly folded native ST peptides and many ST mutant peptides (Govasli M L, Diaz Y, Zegeye E D, Darbakk C, Taxt A M, Puntervoll P. and Characterization of Native and Vaccine Candidate Mutant Enterotoxigenic *Escherichia coli* Heat-Stable Toxins. Toxins (Basel). 2018 Jul. 3; 10 (7). pii: E274. doi: 10.3390/toxins10070274.)

The toxicity of ST mutants can be assessed using purified peptides or filtered culture supernatants in the GC-C receptor cell assay.

The antigenicity of ST mutants can be assessed using, for example, ELISA assays such as competitive ELISA.

The cross-reactivity of ST mutants can be assessed using polyclonal and monoclonal antibodies raised against ST mutants in assays to determine the extent to which the antibodies can bind to endogenous peptides such as guanylin and uroguanylin. Such assays include competitive ELISA and the GC-C receptor cell assay.

ST mutants for use as an antigen or as an immunogen when conjugated to a carrier, are disclosed herein. Such ST mutants exhibit reduced toxicity and retained (and/or have improved) antigenicity or immunogenicity. In some aspects the ST mutants have reduced cross-reactivity.

ST mutants for use in an ETEC vaccine are disclosed herein. Such ST mutants exhibit reduced toxicity and retained (and/or have improved) antigenicity or immunogenicity. In some aspects the ST mutants have reduced cross-reactivity.

The term "antigenicity" as used herein refers to the ability of an antigen (or hapten) to bind specifically with cells of the immune system such as by means of T cell receptors or to antibodies. The term "immunogenicity" as used herein refers to the ability of an antigen (or hapten) to induce an immune response. If the antigen (or hapten) is capable of inducing a response, it is an immunogenic antigen, which is referred to as an immunogen. An antigen (or hapten) might bind specifically to a T or B cell receptor but it might not be able to induce an immune response; such an antigen (or hapten) is antigenic but not immunogenic. All immunogenic substances are antigenic but not all antigenic substances are immunogenic.

The term "mutant of an E. coli heat-stable toxin", as used herein may be used to refer to the "ST mutant", "mutant", "hapten", "antigen", "mutant ST peptide", or "ST mutant peptide".

According to a broad aspect of the invention there is provided a mutant of an E. coli heat-stable toxin (ST) having the following wild-type sequence:

NSSNYCCELCCNPACTGCY (SEQ ID NO: 1)

wherein the mutant comprises a mutation at position L9.

In one embodiment the mutant has the mutation L9K.

According to another broad aspect of the invention there is provided a mutant of an E. coli heat-stable toxin (ST) having the following wild-type sequence:

NTFYCCELCCNPACAGCY (SEQ ID NO: 2)

wherein the mutant comprises a mutation at position L8.

In one embodiment the mutant has the mutation L8K.

According to a broad aspect of the invention there is provided a mutant of an E. coli heat-stable toxin (ST) having the following wild-type sequence:

NSSNYCCELCCNPACTGCY wherein the mutant comprises a mutation at position L9 in combination with a mutation at position A14.

In one embodiment, the mutant has a mutation at position L9 in combination with the mutation A14T.

In one embodiment, the mutant has the mutation L9K in combination with the mutation A14T.

In another embodiment, the mutant has a mutation at position L9 in combination with the mutation A14K.

In one embodiment, the mutant has the mutation L9G in combination with the mutation A14K.

According to another broad aspect of the invention there is provided a mutant of an E. coli heat-stable toxin (ST) having the following wild-type sequence:

NTFYCCELCCNPACAGCY wherein the mutant comprises a mutation at position L8 in combination with a mutation at position A13.

In one embodiment, the mutant has a mutation at position L8 in combination with the mutation A13T.

In one embodiment, the mutant has a mutation L8K in combination with the mutation A13T.

In another embodiment, the mutant has a mutation at position L8 in combination with the mutation A13K.

In one embodiment, the mutant has a mutation L8G in combination with the mutation A13K.

According to another aspect of the present invention there is provided a mutant of an E. coli heat-stable toxin (ST) having the following wild-type sequence:

NSSNYCCELCCNPACTGCY wherein the mutant comprises at least two mutations wherein the first mutation is selected from L9K, L9N, L9T, L9S, L9A and L9G and the second mutation is A14T.

In one embodiment the mutant has the following mutations: L9K and A14T.

In another embodiment the mutant has the following mutations: L9N and A14T.

In a further embodiment the mutant has the following mutations: L9T and A14T.

In one embodiment the mutant has the following mutations: L9S and A14T.

In another embodiment the mutant has the following mutations: L9A and A14T.

In a further embodiment the mutant has the following mutations: L9G and A14T.

In a further aspect of the present invention there is provided a method for producing the mutant of an E. coli heat-stable toxin (ST) according to the present invention wherein the method comprises synthesizing the polypeptide sequence of the mutant using Fluoromethoxycarbonyl amino acids (Fmoc-AAs) wherein the cysteines (Cs) are sequentially orthogonally side-protected by the introduction of Fmoc-Cys(Trt)-OH at positions 7 and 15, Fmoc-Cys(Acm)-OH at positions 10 and 18, and Fmoc-Cys(Mob)-OH at positions 6 and 11.

In a further aspect of the present invention there is provided a method for producing the mutant of an E. coli heat-stable toxin (ST) according to the present invention wherein the method comprises synthesizing the polypeptide sequence of the mutant using Fluoromethoxycarbonyl amino acids (Fmoc-AAs) wherein the Fmoc-AAs are side-protected using tert-butyl (tBu) for E, S, T, and Y; Trt or Dmcp for N; tert-butoxycarbonyl (Boc) for K; and wherein the cysteines (Cs) are sequentially orthogonally side-protected by the introduction of Fmoc-Cys(Trt)-OH at positions 7 and 15, Fmoc-Cys(Acm)-OH at positions 10 and 18, and Fmoc-Cys(Mob)-OH at positions 6 and 11.

According to another aspect of the present invention there is provided a mutant of an E. coli heat-stable toxin (ST) having the following wild-type sequence:

NTFYCCELCCNPACAGCY wherein the mutant comprises at least two mutations wherein the first mutation is selected from L8K, L8N, L8T, L8S, L8A and L8G and the second mutation is A13T.

In one embodiment the mutant has the following mutations: L8K and A13T.

In a further embodiment the mutant has the following mutations: L8N and A13T.

In another embodiment the mutant has the following mutations: L8T and A13T.

In one embodiment the mutant has the following mutations: L8S and A13T.

In a further embodiment the mutant has the following mutations: L8A and A13T.

In another embodiment the mutant has the following mutations: L8G and A13T.

In another aspect of the present invention there is provided a method for producing the mutant of an E. coli heat-stable toxin (ST) according to the present invention wherein the method comprises synthesizing the polypeptide sequence of the mutant using Fluoromethoxycarbonyl amino acids (Fmoc-AAs) wherein the cysteines (Cs) sequentially orthogonally side-protected by the introduction of Fmoc-Cys(Trt)-OH at positions 6 and 14, Fmoc-Cys(Acm)-OH at positions 9 and 17, and Fmoc-Cys(Mob)-OH at positions 5 and 10.

In another aspect of the present invention there is provided a method for producing the mutant of an *E. coli* heat-stable toxin (ST) according to the present invention wherein the method comprises synthesizing the polypeptide sequence of the mutant using Fluoromethoxycarbonyl amino acids (Fmoc-AAs) wherein the Fmoc-AAs are side-protected using tert-butyl (tBu) for E, S, T, and Y; Trt or Dmcp for N; tert-butoxycarbonyl (Boc) for K; and wherein the cysteines (Cs) sequentially orthogonally side-protected by the introduction of Fmoc-Cys(Trt)-OH at positions 6 and 14, Fmoc-Cys(Acm)-OH at positions 9 and 17, and Fmoc-Cys(Mob)-OH at positions 5 and 10.

The terms "mutant of an *E. coli* heat-stable toxin (ST)" and "ST mutant" may be used interchangeably herein.

In one embodiment the method for producing the ST mutant comprises the step wherein the N-terminus is blocked.

In one embodiment the method for producing the ST mutant comprises the step wherein a carrier is coupled at the N-terminus.

In one embodiment the method for producing the ST mutant comprises the step wherein a carrier is coupled at an internal amino acid such as the amino acid at position 9 for mutants of the wild-type sequence

```
                                              (SEQ ID NO: 1)
           NSSNYCCELCCNPACTGCY
``` or the amino acid at position 8 for mutants of the wild-type sequence

```
                                              (SEQ ID NO: 2)
           NTFYCCELCCNPACAGCY.
```

In one embodiment the method for producing the ST mutant comprises the step wherein the orthogonal attachment of a carrier is carried out at an internal amino acid such as the amino acid at position 9 for mutants of the wild-type sequence

```
                                              (SEQ ID NO: 1)
           NSSNYCCELCCNPACTGCY
``` or the amino acid at position 8 for mutants of the wild-type sequence

```
                                              (SEQ ID NO: 2)
           NTFYCCELCCNPACAGCY.
```

In a further aspect, the present invention provides a method for producing the ST mutant wherein the N-terminus is blocked.

In a further aspect, the present invention provides a method for producing the ST mutant wherein a carrier is coupled at an internal amino acid such as the amino acid at position 9 for mutants of the wild-type sequence

```
                                              (SEQ ID NO: 1)
           NSSNYCCELCCNPACTGCY
``` or the amino acid at position 8 for mutants of the wild-type sequence

```
                                              (SEQ ID NO: 2)
           NTFYCCELCCNPACAGCY.
```

In a further aspect, the present invention provides a method for producing the ST mutant wherein orthogonal attachment of a carrier is carried out at an internal amino acid such as the amino acid at position 9 for mutants of the wild-type sequence

```
                                              (SEQ ID NO: 1)
           NSSNYCCELCCNPACTGCY
``` or the amino acid at position 8 for mutants of the wild-type sequence

```
                                              (SEQ ID NO: 2)
           NTFYCCELCCNPACAGCY.
```

In a further aspect, the present invention provides a mutant of an *E. coli* heat-stable toxin (ST) produced by the method according to the present invention.

In one embodiment, at least one carrier is coupled to a mutant as described herein.

In one embodiment, at least two carriers are coupled to a mutant as described herein.

In one embodiment, at least three carriers are coupled to a mutant as described herein.

In one embodiment, one carrier is coupled to a mutant as described herein.

In one embodiment, two carriers are coupled to a mutant as described herein.

In some embodiments, a carrier is coupled to a mutant as described herein at an internal amino acid. For example, a carrier is coupled to a mutant at an internal amino acid wherein the mutant is a mutant of the wild-type sequence

```
                                              (SEQ ID NO: 1)
           NSSNYCCELCCNPACTGCY
``` and the internal amino acid is the amino acid at position 9. In a further example, a carrier is coupled to a mutant at an internal amino acid wherein the mutant is a mutant of the wild-type sequence

```
                                              (SEQ ID NO: 2)
           NTFYCCELCCNPACAGCY
``` and the internal amino acid is the amino acid at position 8.

In addition or in an alternative embodiment, a carrier is coupled to a mutant as described herein at the N-terminus.

The present inventors found that for some ST mutants, such as L9G in SEQ ID NO: 1 or L8G in SEQ ID NO: 2, the ST mutant should be synthesised by orthogonal chemical synthesis rather than recombinant synthesis and/or direct folding. Advantageously, orthogonal chemical synthesis of the ST mutants as described herein produces ST mutants which may exhibit no or very low toxicity; and/or which may be able to elicit a neutralizing, specific immune response when coupled to a suitable carrier; and/or which may exhibit no or low cross-reactivity. Without wishing to be bound by theory, orthogonal chemical synthesis may help ensure that neutralizing epitopes are maintained, by making sure that the correct topology is formed, which enables the elicitation of neutralizing antibodies; peptides with incorrect topology tend to have no or low toxicity.

In one embodiment the carrier is a polysaccharide. In other embodiments, the carrier is a polypeptide. Typically, a carrier polypeptide comprises at least 10 amino acids.

In another embodiment the mutant is coupled to a carrier, for example, CRM197 or LT-B The terms "LT-B" and "LTB" are used interchangeably herein.

ST mutants can be coupled to carrier proteins to create molecules with improved antigenic or immunogenic properties. Suitable carrier proteins, such as CRM197 and LT-B, are well known to those skilled in the art. Coupling to a carrier protein can be accomplished using, for example, genetic and chemical conjugation approaches.

In one embodiment the mutant is coupled to the carrier CRM197.

The term "CRM" may be used interchangeably with the term "CRM197".

In another embodiment the mutant is coupled to a virus-like particle (VLP).

ST mutants can be coupled to VLPs to create molecules with improved antigenic or immunogenic properties. Suitable VLPs, such as AP205, are well known to those skilled in the art. Coupling to a VLP can be accomplished using, for example, genetic and chemical conjugation approaches, as well as non-chemical conjugation approaches, such as Spy-Catcher/SpyTag.

In another embodiment the mutant is polymerized by chemical conjugation.

ST mutants can be polymerized to create molecules with improved antigenic or immunogenic properties. Polymerization can be achieved by chemical conjugation using multi-arm linkers, or by exploiting multiple reactive groups in ST mutants, such as lysine containing mutants.

According to another aspect of the present invention there is provided an isolated nucleic acid that encodes the ST mutant of the invention.

According to another aspect of the present invention there is provided a vector comprising the nucleic acid of the invention.

According to another aspect of the present invention there is provided a host cell comprising the vector of the invention.

Host cells of the invention include prokaryotic and eukaryotic cells. Suitable prokaryotic host cells include bacteria, for example *E. coli*. Suitable eukaryotic cells include yeast, insect cells (e.g. Sf9 cells) and mammalian cell lines.

In some embodiments, sera are induced by the ST mutant coupled to a carrier disclosed herein.

In some embodiments, antibodies are induced by the ST mutant coupled to a carrier disclosed herein.

According to another aspect of the present invention there is provided an antibody that is immunospecific for the ST mutant. In some embodiments, the antibody that is immunospecific for the ST mutant is capable of being cross-reactive. In some embodiments, the antibody that is immunospecific for the ST mutant is also capable of binding to native ST. In some embodiments, the antibody that is immunospecific for the ST mutant does not cross-react with uroguanylin and guanylin. In some embodiments, the antibody that is immunospecific for the ST mutant is also capable of binding to native ST and does not cross-react with uroguanylin and guanylin.

According to another aspect of the present invention there is provided an antibody that is an anti-ST mutant. In some embodiments, the antibody that is anti-ST mutant is also anti-native ST. In some embodiments, the antibody that is anti-ST mutant does not cross-react with uroguanylin and guanylin. In some embodiments, the antibody that is anti-ST mutant is also anti-native ST and does not cross-react with uroguanylin and guanylin.

According to another aspect of the present invention there is provided a vaccine composition comprising the ST mutant, nucleic acid or vector of the invention, and a pharmaceutically acceptable carrier and/or excipient.

According to another aspect of the present invention there is provided an ST mutant, nucleic acid or vector of the invention for use in treating or preventing *E. coli* infection.

According to another aspect of the present invention there is provided an ST mutant, nucleic acid or vector of the invention for use in treating or preventing ETEC infection.

According to another aspect of the present invention there is provided an ST mutant, nucleic acid or vector of the invention for use in treating or preventing diarrhoea (such as traveller's diarrhoea).

According to another aspect of the present invention there is provided an ST mutant, nucleic acid or vector of the invention for use in treating or preventing diarrhoea (such as traveller's diarrhoea) caused by ETEC or ETEC infection.

According to another aspect of the present invention there is provided a method for treating or preventing *E. coli* infection comprising administering an ST mutant, a nucleic acid or a vector of the invention to a patient (such as a human) in need of the same.

According to another aspect of the present invention there is provided a method for treating or preventing ETEC infection comprising administering an ST mutant, a nucleic acid or a vector of the invention to a patient (such as a human) in need of the same.

According to another aspect of the present invention there is provided a method for treating or preventing diarrhoea (such as traveller's diarrhoea) comprising administering an ST mutant, a nucleic acid or a vector of the invention to a patient (such as a human) in need of the same.

According to another aspect of the present invention there is provided a method for treating or preventing diarrhoea (such as traveller's diarrhoea) caused by ETEC or ETEC infection comprising administering an ST mutant, a nucleic acid or a vector of the invention to a patient (such as a human) in need of the same.

According to another aspect of the present invention there is provided use of an ST mutant, a nucleic acid or a vector of the invention for the manufacture of a medicament for the treatment or prevention of *E. coli* infection.

According to another aspect of the present invention there is provided use of an ST mutant, a nucleic acid or a vector of the invention for the manufacture of a medicament for the treatment or prevention of ETEC infection.

According to another aspect of the present invention there is provided use of an ST mutant, a nucleic acid or a vector of the invention for the manufacture of a medicament for the treatment or prevention of diarrhoea (such as traveller's diarrhoea).

According to another aspect of the present invention there is provided use of an ST mutant, a nucleic acid or a vector of the invention for the manufacture of a medicament for the treatment or prevention of diarrhoea (such as traveller's diarrhoea) caused by ETEC or ETEC infection.

DESCRIPTION OF THE DRAWINGS

FIG. 1. The STp and STh toxins and their sequence similarities with uroguanylin and guanylin.

FIG. 4: SDS page analysis performed on 4-15% polyacrylamide gels (Biorad 456-8084). FIG. 4A): Peptide-LTB conjugates and reference LTB used following sample treatment in non-reducing conditions at room temperature (NR, 2× Laemmli sample buffer, Biorad left) or reducing conditions (R, 5% mercaptoethanol in 2× Laemmli sample buffer, treatment at 90° C. for 5 min). FIG. 4B): Peptide-LTB conjugates pre-treated in non-reducing conditions at room temperature (left, NR), pre-treated in non-reducing conditions at 90° C. for 5 min (NR heated, middle), and pre-treated in reducing conditions (R, right).

FIG. 5: Dynamic Light Scattering (DLS) analysis for LTB in TRIS buffer (A), LTB in PBSE buffer (B), STh- (C), A14T- (D) and $_{Ac}$L9K-A14T (E) LTB conjugates in PBS buffer. A 4.0-4.9 nm radius is in agreement with 100-120 kDa species. An 18-25 nm radius was observed for soluble aggregates.

FIG. 6: FIG. 6A—Western blots analysis of selected peptide-LTB conjugates and reference LTB detecting with an anti-LTB antibody (left panel) and an anti-STh antibody (right panel). Data are shown for conjugates prepared by glutaraldehyde chemistry (lines 2 and 3) and by thiol-maleimide chemistry (line 5-7). FIG. 6B-Toxicity analysis measured by the T84 cell GC-C receptor assay for the same set of peptide-LTB conjugates including conjugates prepared by glutaraldehyde chemistry (lines 4 and 5) and by thiol-maleimide chemistry (line 1-3).

FIGS. 7-9: The native (N) to topological (T) isomer ratio strongly depends on the order of cysteine bridge formation. Among the three of the six possible combinations tested for STh synthesis, the 7-15$_{Cys(Trt)}$/10-18$_{Cys(Acm)}$/6-11 $_{Cys(Mob)}$ system gave the best N/T ratio. In order to abrogate premature loss of Mob during TFA cleavage and optimize protecting group orthogonality, Asn was side-chain protected by Dmcp instead of Trt. A 7.5% overall yield of STh was achieved, well above the 2.8% yield of the original synthesis. In contrast, for Glycine mutants, L9GA14T and $_{Ac}$L9GA14K, orthogonal chemical synthesis gives 2 isomers—a major one (OM) and a minor one (Om), which differ from the major isomers (DFM, DFm) obtained by direct air oxidation (Direct Folding, DF) chemical synthesis as well as from the recombinant (Rec) mutant (FIGS. 7 & 8). As seen upon coinjection (CoInj), the recombinant GT peptide co-eluted with one of the minor isomers isolated from the direct air folding chemical synthesis (FIG. 7), albeit featuring divergent antigenic properties. Moreover, N$_{ter}$-acetylation of the recombinant GK peptide (FIG. 9) gives a compound, which co-elutes with the minor isomer purified from the direct folding synthesis of that same peptide. Unexpectedly, none of the mutants obtained by direct air folding synthesis were recognized by the anti-STp mAb used for pre-selecting the mutants.[3] Furthermore, whereas the orthogonally synthesized peptides, and in particular the major isomers, retained reasonable antigenicity, this was not the case for the recombinant mutants, which are only poorly recognized by C30 when compared to STh.

FIG. 10. Anti-LTB, anti-STh, and anti-BSA-maleimide antibody titers. Titration of sera was performed using ELISA plates coated with: (A) LTB; (B) STh, and (C) BSA-maleimide. The titer was defined as the highest dilution with a signal-to-background ratio of ≥2.1. The solid lines indicate the median titer for each group. The dotted line indicates the lowest serum dilution tested, which was 1:1000. Sera with no measurable titer was set to $10^2$. For the anti-BSA-maleimide titer ELISA (C), two sera from mice immunized with BSA-STh conjugates were included as a control for anti-BSA antibodies.

FIG. 11. Neutralization of STh in the HEK-hGCC and T84 cell assays. Each serum was analyzed using the HEK-hGCC cell assay (A) with technical duplicates and in two independent T84 cell assay experiments (B and C) with technical duplicates. The bars represent the mean cGMP concentration measured for each serum-STh peptide mix relative to the peptide only control (no serum; solid line). The shaded grey area represents the standard deviation of the peptide only control. The error bars represent standard deviations of the sera. The dotted line represents the neutralizing ability of positive controls: the ST:G8 anti-STh monoclonal antibody (A), an anti-STh rabbit serum (B) and a mouse anti-STh serum (C). L9K/A14T/dmLT serum #1 and A14T/dmLT serum #3 were not tested in the T84 cell assays (B and C).

FIG. 12. Anti-LTB and anti-STh antibody titers. Titration of sera was performed using ELISAs coated with: A, LTB and B, STh. The titer was defined as the highest dilution with a signal-to-background ratio of ≥2.1. The solid lines indicate the median titer for each group. The lowest serum dilution tested was 1:100, and sera with no measurable titer was set to $10^2$.

FIG. 13. Neutralization of STh in the HEK-hGCC and T84 cell assays. Each serum was analyzed using the HEK-hGCC cell assay (A) and the T84 cell assay (B) both with technical duplicates. Naïve sera, i.e. sera from non-immunized mice, were included as negative controls. The bars represent the mean cGMP concentration for each serum-STh peptide mix relative to the peptide only control (no serum; solid line). The shaded grey area represents the standard deviation of the peptide only control. The error bars represent standard deviations of the sera. The dotted line represents the neutralizing ability of the positive controls: the ST:G8 anti-STh monoclonal antibody (A) and a mouse anti-STh serum (B).

FIG. 14. Immunological cross-reactions of neutralizing anti-STh sera assessed using competitive ELISAs. The four L9K/A14T/dmLT sera from mouse immunization experiment 2 that neutralized native STh were assessed for Immunological cross-reactions: (A) serum #1, (B) serum #2, (C) serum #3, and (D) serum #6. All four GC-C receptor ligands were used in serial dilutions to compete for binding to the STh coating: STh (blue), STp (red), uroguanylin (green), and guanylin (purple). The vertical axes show percent inhibition of maximum binding to the ELISA coating, and the horizontal axes show the peptide concentration on a logarithmic scale. Each data point represents the mean of three technical replicates and the error bars depict standard deviations. The lines are regression curves from four-parameter logistic regression analyses.

FIG. 15. Anti-STh IgG antibody titers. Titration of sera was performed using ELISA plates coated with STh peptide. The titer was defined as the highest dilution with a signal-to-background ratio of ≥2.1. The solid lines indicate the mean titer for each group. The lowest serum dilution tested was 1:1,000, and the dotted line indicates the highest dilution, which was 1:2,040,000. Sera with no measurable titer was set to $10^3$. Differences between groups that are statistically significant are indicated above the plot. Each mouse group is detailed in Table 3.2. For example, "mouse group LTB-3" received a 3 ug dose of the immunogen LTB-STh-L9K/A14T.

Figure 16:
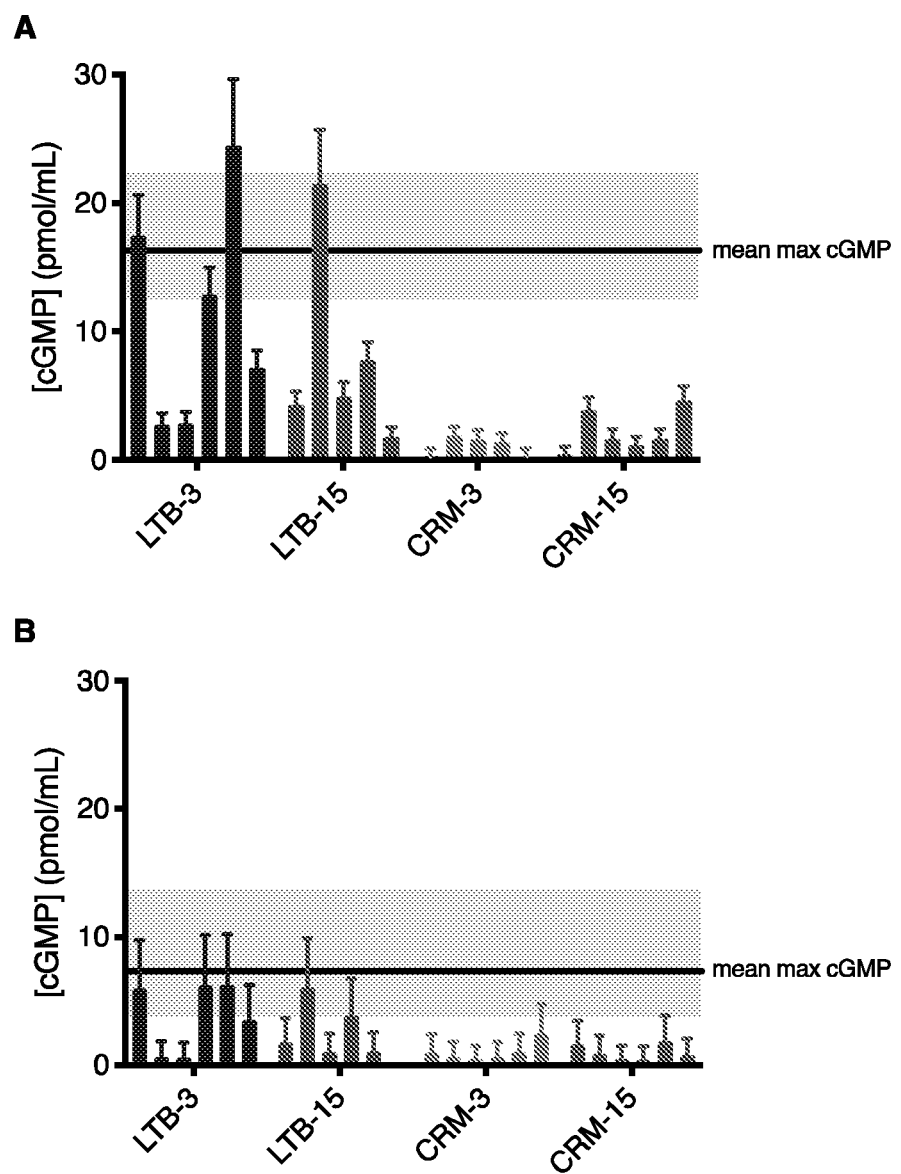

FIG. 16. Neutralization of STh (T84 cell assay). Each serum was analyzed in two T84 cell assay experiments with technical duplicates (A and B). The bars represent the mean cGMP concentration measured for each serum-STh peptide mix (peptide only; solid line). The shaded grey area represents the standard deviation of the peptide only control. The error bars represent standard deviations.

Figure 17:
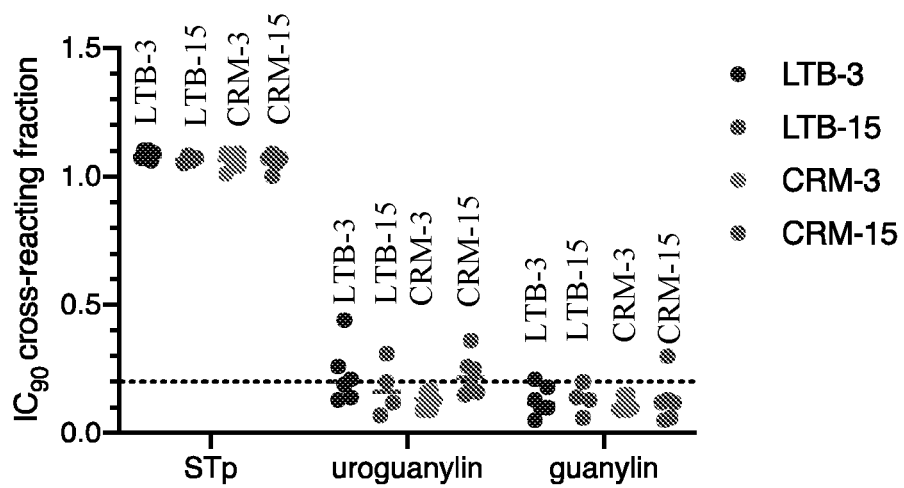

FIG. 17. Immunological cross-reactions of neutralizing anti-STh sera assessed using competitive ELISAs. The sera from all mice, except LTB-15 #2, were assessed for immunological cross-reactions towards STp, uroguanylin, and guanylin. The figure shows the cross-reactive fractions at 90% inhibitory concentrations ($IC_{90}$) of STh. For each serum, four-parameter logistic regression was performed, and the ICgo were calculated for STh. These concentrations were used to calculate the inhibition for each peptide relative to that of the cognate peptides. The plot shows the cross-reactivity at $IC_{90}$ (vertical axis) for each peptide (horizontal axis) in each serum, and the lines depict median cross-reactions. The dotted line shows an $IC_{90}$ of 0.2. The analysis could not be performed for LTB-15 serum #2 due to low levels of anti-STh antibodies.

DETAILED DESCRIPTION OF THE INVENTION

Various preferred features and embodiments of the present invention will now be described by way of non-limiting examples.

The practice of the present invention will employ, unless otherwise indicated, conventional techniques of chemistry, molecular biology, microbiology, recombinant DNA and immunology, which are within the capabilities of a person of ordinary skill in the art. Such techniques are explained in the literature. See, for example, J. Sambrook, E. F. Fritsch, and T. Maniatis (1989) Molecular Cloning: A Laboratory Manual, Second Edition, Books 1-3, Cold Spring Harbor Laboratory Press; Ausubel, F. M. et al. (1995 and periodic supplements) Current Protocols in Molecular Biology, Ch. 9, 13, and 16, John Wiley & Sons, New York, NY; B. Roe, J. Crabtree, and A. Kahn (1996) DNA Isolation and Sequencing: Essential Techniques, John Wiley & Sons; J. M. Polak and James O'D. McGee (1990) In Situ Hybridization: Principles and Practice; Oxford University Press; M. J. Gait (ed.) (1984) Oligonucleotide Synthesis: A Practical Approach, IRL Press; and, D. M. J. Lilley and J. E. Dahlberg (1992) Methods of Enzymology: DNA Structure Part A: Synthesis and Physical Analysis of DNA Methods in Enzymology, Academic Press. SPPS is discussed in Fmoc Solid Phase Peptide Synthesis, a practical approach, edited by W. C. Chan and P. D. White, Series editor: B. D. Hames, Oxford university press, 2000. Each of these general texts is herein incorporated by reference.

Enterotoxigenic *Escherichia coli* (ETEC) Toxins

ETEC secretes two essential virulence factors, the heat-labile and/or heat-stable enterotoxins. Both toxins act by stimulating net secretion of ions and water by intestinal epithelial cells. This causes watery diarrhoea, which can lead to a cholera-like condition in the most extreme cases.

Heat-Labile Toxin

ETEC heat-labile toxin (LT) is an 84 kDa oligotoxin that is related to cholera toxin in structure and mechanism. LT has an AB5 structure composed of an enzymatically active A subunit (LTA, 28 kDa) noncovalently associated with a pentameric B subunit (consisting of five 11.5-kDa LTB monomers). The LTB pentamer alone is non-toxic and highly immunogenic, and hence suitable as a vaccine protein carrier. A non-toxic double mutant variant of LT (dmLT: R192G/L211A), where LTA is enzymatically inactive, is an excellent mucosal adjuvant (Clements J D, Norton E B. The Mucosal Vaccine Adjuvant LT (R192G/L211A) or dmLT. mSphere. 2018 Jul. 25; 3 (4). pii: e00215-18. doi: 10.1128/mSphere.00215-18. Review. PubMed PMID: 30045966; PubMed Central PMCID: PMC6060342.). LT stimulates increased concentrations of CAMP in intestinal epithelial cells. This results in a net secretion of chloride ions and water, causing watery diarrhoea.

The present inventors advantageously found that the pentameric nature of LTB can be maintained after conjugation.

Heat-Stable Toxin

Two distinct ETEC heat-stable toxins have been identified, STa/STI and STb/STII. These proteins are structurally, functionally and immunologically unrelated. The STa/STI toxins are the subject of this invention and are referred to herein as ST.

Epidemiological studies strongly indicate that ETEC strains which secrete ST contributes more to the diarrheal disease burden of children of developing countries than do ETEC strains that only produce LT.

The genes encoding ETEC ST proteins are harboured on transmissible plasmids. The ST proteins are expressed as 72 amino acid immature pre-pro-peptides. Residues 1-19 of the pre-pro-peptide constitute a signal peptide that targets the immature protein for secretion across the inner membrane via the Sec machinery. The pro-peptide is then processed to the mature form with translocation across the outer membrane.

The mature ST is an approximately 2 kDa polypeptide. Two ST variants are known:
1. STh (also known as STlb and STa II): a 19 amino acid polypeptide isolated from ETEC strains infecting humans;
2. STp (also known as STla and STa I): an 18 amino acid polypeptide isolated from both ETEC strains infecting humans and animals.

The mature STh polypeptide (corresponding to residues 54-72 of the immature pre-pro-peptide) has the amino acid sequence:

NSSNYCCELCCNPACTGCY

The mature STp polypeptide (corresponding to residues 55-72 of the immature pre-pro-peptide) has the amino acid sequence:

NTFYCCELCCNPACAGCY

The term "ST" as used herein may refer to "STh" and "STp".

For the purposes of the present invention, unless stated otherwise, the ST amino acid residues and mutants will be numbered according to the relevant mature polypeptide sequences.

Both ST variants are non-immunogenic in their natural forms.

Mature STh and STp contain three intramolecular disulfide bonds arranged in a 1-4/2-5/3-6 pattern (here the numbering corresponds to the order of cysteine residues in the mature polypeptide). The periplasmic disulfide isomerase (DsbA) is required for disulfide bond formation.

ST binds to and activates the guanylate cyclase C (GC-C) receptor by mimicking the endogenous ligands, guanylin and uroguanylin. ST binding results in increased concentrations of intracellular messenger cyclic GMP (CGMP). This causes decreased absorption of sodium and chloride ions, and increased secretion of bicarbonate and chloride ions, which ultimately results in diarrhoea.

ETEC ST polypeptides are structurally similar to both guanylin and uroguanylin. Both guanylin and uroguanylin contain only two disulfide bonds and interconvert between two distinct topological isomers. The three ST disulfide bonds appear to lock the ST polypeptide into a topology that resembles the active topology of guanylin and uroguanylin. The two ST disulfide bonds that are common with guanylin and uroguanylin are essential for activity. Mutation of any ST cysteine that corresponds to one of these disulfide bonds abolishes or dramatically reduces toxicity.

The section of ST from the first to last cysteine are referred to as the toxic domain.

The ST described herein can be obtained by methods well known in the art. Various techniques for the chemical synthesis of peptides are reviewed by Borgia and Fields, 2000, TibTech 18: 243-251, and are described in detail in the references contained therein.

In one embodiment, ST is synthesized on a solid support by solid phase peptide synthesis (SPPS).

In some embodiments, the synthesized polypeptide is folded by oxidative folding (such as direct-air oxidation). In other embodiments, the synthesized polypeptide is folded by site-selective cysteine pairing. This site-selective cysteine pairing may be referred to as "orthogonal side-chain protection" also termed orthogonal chemical synthesis. In some embodiments, site-selective cysteine pairing may occur in any order. In other embodiments, site-selective cysteine pairing occurs in the order: positions 7 and 15, positions 10 and 18, and lastly positions 6 and 11 for mutants of the wild-type sequence (SEQ ID NO: 1)
NSSNYCCELCCNPACTGCY or in the order: positions 6 and 14, positions 9 and 17, and lastly positions 5 and 10 for mutants of the wild-type sequence (SEQ ID NO: 2)
NTFYCCELCCNPACAGCY Typically the synthesized polypeptide is cleaved from the solid support and sidechain protecting groups are removed from the amino acids before oxidative folding. Alternatively, the synthesized polypeptide is cleaved from the solid support and sidechain protecting groups are removed sequentially from cysteine pairs with concomitant or subsequent site-selective cysteine pairing.

In a broad aspect there is provided a method for producing an *E. coli* heat-stable toxin (ST) having the sequence shown as SEQ ID NO: 1 wherein the method comprises synthesizing the polypeptide sequence of the ST using Fluoromethoxycarbonyl amino acids (Fmoc-AAs) (preferably wherein the Fmoc-AAs are side-protected using tert-butyl (tBu) for E, S, T, and Y; Trt or Dmcp for N; tert-butoxycarbonyl (Boc) for K); and wherein the cysteines (Cs) are sequentially orthogonally side-protected by the introduction of Fmoc-Cys(Trt)-OH at positions 7 and 15, Fmoc-Cys (Acm)-OH at positions 10 and 18, and Fmoc-Cys(Mob)-OH at positions 6 and 11.

In a broad aspect there is provided a method for producing an *E. coli* heat-stable toxin (ST) having the sequence shown as SEQ ID NO: 2 wherein the method comprises synthesizing the polypeptide sequence of the ST using Fluoromethoxycarbonyl amino acids (Fmoc-AAs) (preferably wherein the Fmoc-AAs are side-protected using tert-butyl (tBu) for E, S, T, and Y; Trt or Dmcp for N; tert-butoxycarbonyl (Boc) for K); and wherein the cysteines (Cs) sequentially orthogonally side-protected by the introduction of Fmoc-Cys(Trt)-OH at positions 6 and 14, Fmoc-Cys (Acm)-OH at positions 9 and 17, and Fmoc-Cys(Mob)-OH at positions 5 and 10.

In a further aspect, there is provided an *E. coli* heat-stable toxin (ST) having the sequence shown as SEQ ID NO: 1 or SEQ ID NO: 2 produced by the method described herein.

In another embodiment the ST having the sequence shown as SEQ ID NO: 1 or SEQ ID NO: 2 is coupled to a carrier, for example, CRM197 or LT-B.

In a further embodiment the ST having the sequence shown as SEQ ID NO: 1 or SEQ ID NO: 2 is coupled to CRM197.

In one embodiment, the ST is acetylated.

In one embodiment, the ST is acetylated at its N-terminus.

In one embodiment, at least one amino acid of the ST bears a dimethylcyclopropylmethyl (Dmcp).

In one embodiment, Dmcp is used as Asn side-chain protecting group for chemical synthesis.

ETEC Heat-Stable Toxin Mutants

The present invention provides a mutant of an *E. coli* heat-stable toxin (ST) having the following wild-type sequence:

(SEQ ID NO: 1)
NSSNYCCELCCNPACTGCY wherein the mutant comprises a mutation at position L9.

The present invention further provides a mutant of an *E. coli* heat-stable toxin (ST) having the following wild-type sequence:

(SEQ ID NO: 2)
NTFYCCELCCNPACAGCY wherein the mutant comprises a mutation at position L8.

In one embodiment, the ST mutant may have only one mutation. This ST-mutant may be referred to as a single ST mutant. Examples of single mutants include, but are not limited to: L9K and L8K.

In one embodiment, the present invention provides a mutant of an *E. coli* heat-stable toxin (ST) having the following wild-type sequence:

(SEQ ID NO: 1)
NSSNYCCELCCNPACTGCY wherein the mutant has a mutation at position L9.

In another embodiment, the present invention further provides a mutant of an *E. coli* heat-stable toxin (ST) having the following wild-type sequence:

(SEQ ID NO: 2)
NTFYCCELCCNPACAGCY wherein the mutant has a mutation at position L8.

In one embodiment, the present invention provides a mutant of an *E. coli* heat-stable toxin (ST) having the following wild-type sequence:

NSSNYCCELCCNPACTGCY wherein the mutant consists of a mutation at position L9.

In another embodiment, the present invention further provides a mutant of an *E. coli* heat-stable toxin (ST) having the following wild-type sequence:

NTFYCCELCCNPACAGCY wherein the mutant consists of a mutation at position L8.

In one embodiment, the present invention provides a mutant of an *E. coli* heat-stable toxin (ST) having the sequence

NSSNYCCEKCCNPACTGCY.    (SEQ ID NO: 17)

In another embodiment, the present invention provides a mutant of an *E. coli* heat-stable toxin (ST) having the sequence

NTFYCCEKCCNPACAGCY.    (SEQ ID NO: 18)

In another embodiment, the ST mutant has at least 2 mutations wherein at least one mutation is at position L9 or position L8.

The present invention provides a mutant of an *E. coli* heat-stable toxin (ST) having the following wild-type sequence:

NSSNYCCELCCNPACTGCY wherein the mutant comprises at least two mutations wherein the first mutation is selected from L9K, L9N, L9T, L9S, L9A and L9G and the second mutation is A14T.

The present invention further provides a mutant of an *E. coli* heat-stable toxin (ST) having the following wild-type sequence:

NTFYCCELCCNPACAGCY wherein the mutant comprises at least two mutations wherein the first mutation is selected from L8K, L8N, L8T, L8S, L8A and L8G and the second mutation is A13T.

The present invention provides a mutant of an *E. coli* heat-stable toxin (ST) having the following wild-type sequence:

NSSNYCCELCCNPACTGCY wherein the mutant comprises at least two mutations wherein the first mutation is selected from L9K, L9N, L9T, L9S, L9A and L9G and the second mutation is A14K.

The present invention further provides a mutant of an *E. coli* heat-stable toxin (ST) having the following wild-type sequence:

NTFYCCELCCNPACAGCY wherein the mutant comprises at least two mutations wherein the first mutation is selected from L8K, L8N, L8T, L8S, L8A and L8G and the second mutation is A13K.

In one embodiment, the ST mutant may have only two mutations. This ST-mutant may be referred to as a double ST mutant. Examples of double mutants include, but are not limited to: L9K A14T; L8K A13T; L9N A14T; L8N A13T; L9T A14T; L8T A13T; L9G A14K; and L8G A13K.

In one embodiment, the present invention provides a mutant of an *E. coli* heat-stable toxin (ST) having the following wild-type sequence:

NSSNYCCELCCNPACTGCY wherein the mutant has two mutations wherein the first mutation is selected from L9K, L9N, L9T, L9S, L9A and L9G and the second mutation is A14T.

In another embodiment, the present invention further provides a mutant of an *E. coli* heat-stable toxin (ST) having the following wild-type sequence:

NTFYCCELCCNPACAGCY wherein the mutant has two mutations wherein the first mutation is selected from L8K, L8N, L8T, L8S, L8A and L8G and the second mutation is A13T.

In one embodiment, the present invention provides a mutant of an *E. coli* heat-stable toxin (ST) having the following wild-type sequence:

NSSNYCCELCCNPACTGCY wherein the mutant has two mutations wherein the first mutation is selected from L9K, L9N, L9T, L9S, L9A and L9G and the second mutation is A14K.

In another embodiment, the present invention further provides a mutant of an *E. coli* heat-stable toxin (ST) having the following wild-type sequence:

NTFYCCELCCNPACAGCY wherein the mutant has two mutations wherein the first mutation is selected from L8K, L8N, L8T, L8S, L8A and L8G and the second mutation is Al3K.

In one embodiment, the present invention provides a mutant of an *E. coli* heat-stable toxin (ST) having the following wild-type sequence:

NSSNYCCELCCNPACTGCY wherein the mutant consists of two mutations wherein the first mutation is selected from L9K, L9N, L9T, L9S, L9A and L9G and the second mutation is Al4T.

In another embodiment, the present invention further provides a mutant of an *E. coli* heat-stable toxin (ST) having the following wild-type sequence:

NTFYCCELCCNPACAGCY wherein the mutant consists of two mutations wherein the first mutation is selected from L8K, L8N, L8T, L8S, L8A and L8G and the second mutation is A13T.

In one embodiment, the present invention provides a mutant of an *E. coli* heat-stable toxin (ST) having the following wild-type sequence:

NSSNYCCELCCNPACTGCY (SEQ ID NO: 1)

wherein the mutant consists of two mutations wherein the first mutation is selected from L9K, L9N, L9T, L9S, L9A and L9G and the second mutation is Al4K.

In one embodiment, the present invention further provides a mutant of an *E. coli* heat-stable toxin (ST) having the following wild-type sequence:

NTFYCCELCCNPACAGCY (SEQ ID NO: 2)

wherein the mutant consists of two mutations wherein the first mutation is selected from L8K, L8N, L8T, L8S, L8A and L8G and the second mutation is Al3K.

In one embodiment, the present invention provides a mutant of an *E. coli* heat-stable toxin (ST) having the following sequence:

NSSNYCCEKCCNPTCTGCY;
or
NSSNYCCENCCNPTCTGCY;
or
NSSNYCCETCCNPTCTGCY.

In some embodiments, the present invention provides a mutant of an *E. coli* heat-stable toxin (ST) having the sequence

NSSNYCCEKCCNPTCTGCY. (SEQ ID NO: 5)

In one embodiment, the present invention provides a mutant of an *E. coli* heat-stable toxin (ST) having the following sequence:

NSSNYCCESCCNPTCTGCY;
or
NSSNYCCEACCNPTCTGCY;
or
NSSNYCCEGCCNPTCTGCY.

In one embodiment, the present invention provides a mutant of an *E. coli* heat-stable toxin (ST) having the following sequence:

NTFYCCEKCCNPTCAGCY;
or
NTFYCCENCCNPTCAGCY;
or
NTFYCCETCCNPTCAGCY.

In some embodiments, the present invention provides a mutant of an *E. coli* heat-stable toxin (ST) having the sequence

NTFYCCEKCCNPTCAGCY. (SEQ ID NO: 11)

In one embodiment, the present invention provides a mutant of an *E. coli* heat-stable toxin (ST) having the following sequence:

NTFYCCESCCNPTCAGCY;
or
NTFYCCEACCNPTCAGCY;
or
NTFYCCEGCCNPTCAGCY.

In another embodiment, the ST mutant may comprise more than two mutations.

It is envisaged that additional mutations may be made in the mutants of the present invention to create, for example, triple or quadruple mutants. Such additional mutations may further improve the properties of the ST mutants of the present invention, for example by reducing toxicity and/or increasing ST-specific antigenicity or immunogenicity and/or reducing cross-reactivity.

In one embodiment, the ST mutant is acetylated.

In one embodiment, the ST mutant is acetylated at its N-terminus.

In one embodiment, at least one amino acid of the ST mutant bears a dimethylcyclopropylmethyl (Dmcp).

In one embodiment, Dmcp is used as Asn side-chain protecting group for chemical synthesis.

In some embodiments, the mutant of an *E. coli* heat-stable toxin (ST) having the following wild-type sequence:

NSSNYCCELCCNPACTGCY has dimethylcyclopropylmethyl protected Asn(Dmcp) incorporated at position 1 and/or 4 and/or 12.

In some embodiments, the mutant of an *E. coli* heat-stable toxin (ST) having the following sequence:

NSSNYCCEKCCNPTCTGCY;
or
NSSNYCCENCCNPTCTGCY;
or
NSSNYCCETCCNPTCTGCY;
or
NSSNYCCESCCNPTCTGCY;
or
NSSNYCCEACCNPTCTGCY;
or
NSSNYCCEGCCNPTCTGCY;

has dimethylcyclopropylmethyl protected Asn(Dmcp) incorporated at position 1 and/or 4 and/or 12.

In some embodiments, the mutant of an *E. coli* heat-stable toxin (ST) having the following wild-type sequence:

NTFYCCELCCNPACAGCY has dimethylcyclopropylmethyl protected Asn(Dmcp) incorporated at position 1 and/or 11.

In some embodiments, the mutant of an *E. coli* heat-stable toxin (ST) having the following sequence:

```
                                         (SEQ ID NO: 11)
    NTFYCCEKCCNPTCAGCY; or (SEQ ID NO: 12)
    NTFYCCENCCNPTCAGCY; or (SEQ ID NO: 13)
    NTFYCCETCCNPTCAGCY; or (SEQ ID NO: 14)
    NTFYCCESCCNPTCAGCY; or (SEQ ID NO: 15)
    NTFYCCEACCNPTCAGCY; or (SEQ ID NO: 16)
    NTFYCCEGCCNPTCAGCY.
``` has dimethylcyclopropylmethyl protected Asn(Dmcp) incorporated at position 1 and/or 11.

The mutants of the present invention can be obtained by methods well known in the art. Various techniques for the chemical synthesis of peptides are reviewed by Borgia and Fields, 2000, TibTech 18: 243-251, and are described in detail in the references contained therein.

In one embodiment, the mutants are synthesized on a solid support by solid phase peptide synthesis (SPPS).

In some embodiments, the synthesized polypeptide is folded by oxidative folding (such as direct-air oxidation). In other embodiments, the synthesized polypeptide is folded by site-selective cysteine pairing. This site-selective cysteine pairing may be referred to as "orthogonal side-chain protection" also termed orthogonal chemical synthesis. In some embodiments, site-selective cysteine pairing may occur in any order. In other embodiments, site-selective cysteine pairing occurs in the order: positions 7 and 15, positions 10 and 18, and lastly positions 6 and 11 for mutants of the wild-type sequence

```
                                          (SEQ ID NO: 1)
    NSSNYCCELCCNPACTGCY;
``` or in the order: positions 6 and 14, positions 9 and 17, and lastly positions 5 and 10 for mutants of the wild-type sequence

```
                                          (SEQ ID NO: 2)
    NTFYCCELCCNPACAGCY.
```

Typically the synthesized polypeptide is cleaved from the solid support and sidechain protecting groups are removed from the amino acids before oxidative folding. Alternatively, the synthesized polypeptide is cleaved from the solid support and sidechain protecting groups are removed sequentially from cysteine pairs with concomitant or subsequent site-selective cysteine pairing.

In one embodiment, the mutant as described herein is folded by site-selective cysteine pairing.

In one embodiment, site-selective cysteine pairing occurs in the order: positions 7 and 15, positions 10 and 18, and lastly positions 6 and 11 for mutants of the wild-type sequence

```
                                          (SEQ ID NO: 1)
    NSSNYCCELCCNPACTGCY.
```

In another embodiment, site-selective cysteine pairing occurs in the order: positions 6 and 14, positions 9 and 17, and lastly positions 5 and 10 for mutants of the wild-type sequence

```
                                          (SEQ ID NO: 2)
    NTFYCCELCCNPACAGCY.
```

In some embodiments, site-selective cysteine pairing occurs in the order: positions 7 and 15, positions 10 and 18, and lastly positions 6 and 11 for mutants of an *E. coli* heat-stable toxin (ST) having the following sequence:

```
    NSSNYCCEKCCNPTCTGCY;
    or

NSSNYCCENCCNPTCTGCY;
    or

NSSNYCCETCCNPTCTGCY;
    or

NSSNYCCESCCNPTCTGCY;
    or

NSSNYCCEACCNPTCTGCY;
    or

NSSNYCCEGCCNPTCTGCY.
```

In some embodiments, site-selective cysteine pairing occurs in the order: positions 6 and 14, positions 9 and 17, and lastly positions 5 and 10 for mutants of an *E. coli* heat-stable toxin (ST) having the following sequence:

```
                                         (SEQ ID NO: 11)
    NTFYCCEKCCNPTCAGCY; or (SEQ ID NO: 12)
    NTFYCCENCCNPTCAGCY; or (SEQ ID NO: 13)
    NTFYCCETCCNPTCAGCY; or (SEQ ID NO: 14)
    NTFYCCESCCNPTCAGCY; or (SEQ ID NO: 15)
    NTFYCCEACCNPTCAGCY; or (SEQ ID NO: 16)
    NTFYCCEGCCNPTCAGCY.
```

In one embodiment, the ST mutant has three intramolecular disulfide bonds arranged between positions 7 to 15 and positions 10 to 18 and positions 6 to 11 for mutants of the wild-type sequence

```
                                          (SEQ ID NO: 1)
    NSSNYCCELCCNPACTGCY.
```

In one embodiment, the ST mutant has three intramolecular disulfide bonds arranged between positions 7 to 15 and positions 10 to 18 and positions 6 to 11 for mutants of an *E. coli* heat-stable toxin (ST) having the following sequence:

```
    NSSNYCCEKCCNPTCTGCY;
    or

NSSNYCCENCCNPTCTGCY;
    or
```

```
NSSNYCCETCCNPTCTGCY;
or

NSSNYCCESCCNPTCTGCY;
or

NSSNYCCEACCNPTCTGCY;
or

NSSNYCCEGCCNPTCTGCY.
```

In one embodiment, the ST mutant has three intramolecular disulfide bonds arranged between positions 6 and 14, positions 9 and 17, and positions 5 and 10 for mutants of the wild-type sequence

```
                                        (SEQ ID NO: 2)
NTFYCCELCCNPACAGCY.
```

In one embodiment, the ST mutant has three intramolecular disulfide bonds arranged between positions 6 and 14, positions 9 and 17, and positions 5 and 10 for mutants of an *E. coli* heat-stable toxin (ST) having the following sequence:

```
NTFYCCEKCCNPTCAGCY;
or

NTFYCCENCCNPTCAGCY;
or

NTFYCCETCCNPTCAGCY;
or

NTFYCCESCCNPTCAGCY;
or

NTFYCCEACCNPTCAGCY;
or

NTFYCCEGCCNPTCAGCY.
```

Typically the synthesized polypeptide is cleaved from the solid support and side-chain protecting groups are removed from the amino acids before oxidative folding. Alternatively, the synthesized polypeptide is cleaved from the solid support and sidechain protecting groups are removed sequentially from cysteine pairs with concomitant or subsequent site-selective cysteine pairing.

Conjugates/Carriers

The present invention also provides conjugates wherein a mutant of the present invention is coupled to a carrier. The terms "coupled", "linked", "covalently bound", "attached" or "cross-linked" may be used interchangeably.

Carriers of the present description may be useful in increasing the antigenicity or immunogenicity of ST. Numerous carriers are known in the art.

Suitable carriers include, but are not limited to, heat-labile enterotoxin B-subunit (LT-B), CRM197, Tentanus toxoid (TT), recombinant Exoprotein from *Pseudomonas aeruginosa* (rEPA), immunoglobulin G (IgG), bovine serum albumin, cholera toxin B-subunit (CT-B), the outer membrane protein OmpC, zwitterionic polysaccharides, the ZZ fragment of *Staphylococcus aureus* protein A, the major subunit CIpG of *E. coli* CS31A fimbriae, and *Salmonella* flagellin, green fluorescent protein, polypeptides from pathogens responsible for enteric disease, and virus-like particles (VPLs).

Conjugation with certain carriers, for example CRM197, LT-B, and CT-B, may advantageously provide immune protection against both ETEC ST and LT.

In one embodiment, the carrier is heat-labile enterotoxin B-subunit (LT-B).

In a preferred embodiment, the carrier is CRM197.

It is envisaged that coupling may be carried out by a range of techniques known in the art, including chemical conjugation, genetic fusion or direct protein synthesis.

Chemical conjugation approaches include the coupling of pre-formed proteins by using a cross-linking agent.

In some embodiments, chemical conjugation includes the coupling of pre-folded proteins by using a cross-linking agent.

In some embodiments, chemical conjugation includes the coupling of proteins comprising a linker and/or a selective reactive moiety by using a cross-linking agent.

Figure 1B:
FIG. 1B. Method for chemical conjugation of native STh (Adapted from *Bioconj. Chem.* (2016) 27, 883).
Figure 1B:
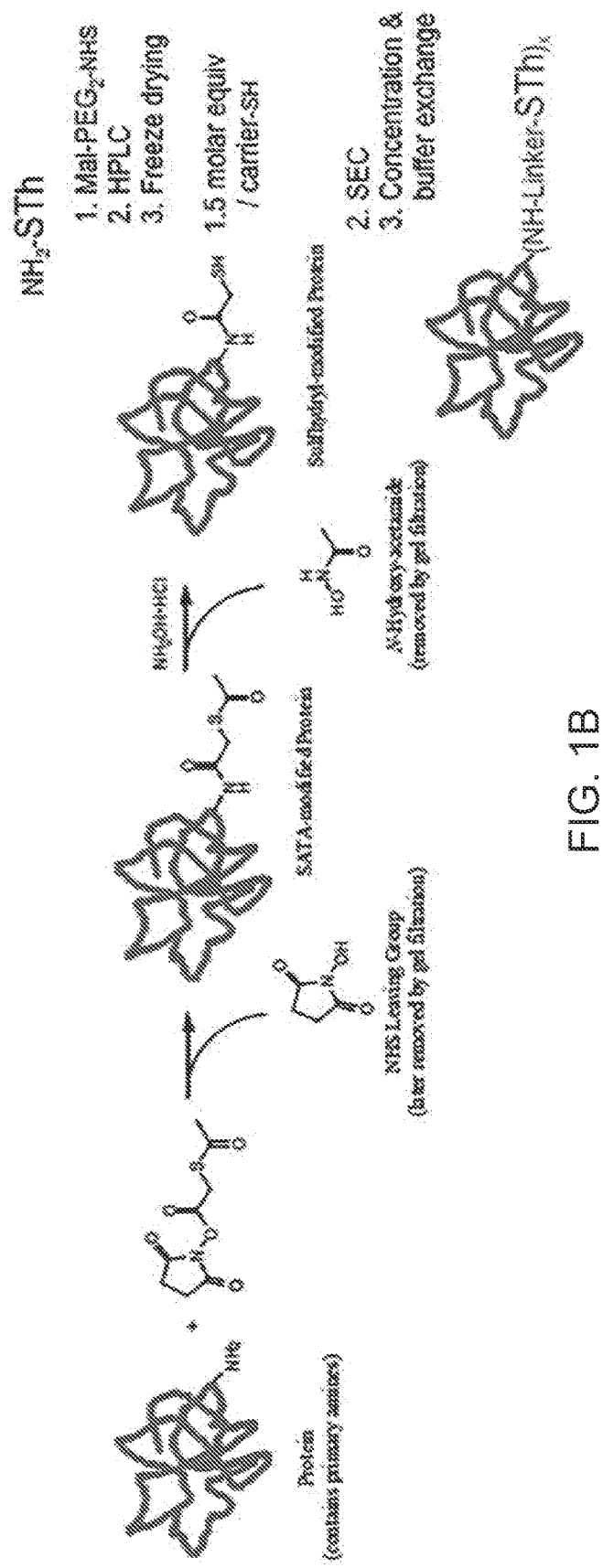

FIG. 1B illustrates a method for chemical conjugation of native STh (Adapted from *Bioconjugate. Chem.* (2016) 27, 883). This method may be used for chemical conjugation of ST mutants.

In one embodiment, the chemical conjugation involves glutaraldehyde as the cross-linking agent.

In one embodiment, the chemical conjugation involves thiol-maleimide.

In one embodiment, the chemical conjugation involves copper(I)-catalysed azide-alkyne cycloaddition.

In one embodiment, the chemical conjugation involves copper-free click chemistry.

In one embodiment, the carrier is coupled at the N-terminus of the ST mutant. In an alternative embodiment, the carrier is coupled to an amino acid within the polypeptide sequence of the ST mutant (i.e. an internal amino acid).

In another embodiment, a carrier is coupled at the N-terminus of the ST mutant and/or a carrier is coupled to an amino acid within the polypeptide sequence of the ST mutant (i.e. an internal amino acid).

In one embodiment the carrier is coupled at amino acid position 9 in the ST mutant of an *E. coli* heat-stable toxin (ST) having the following wild-type sequence:

```
                                        (SEQ ID NO: 1)
NSSNYCCELCCNPACTGCY.
```

Preferably the ST mutant has the amino acid K at amino acid position 9. In another embodiment the carrier is coupled at amino acid position 8 in the ST mutant of an *E. coli* heat-stable toxin (ST) having the following wild-type sequence:

```
                                        (SEQ ID NO: 2)
NTFYCCELCCNPACAGCY.
```

Preferably the ST mutant has the amino acid K at amino acid position 8. Preferably the coupling occurs via cross-linking to the amino side chain of the internal amino acid such as lysine (K). In one embodiment, the N-terminus of the peptide may be blocked by a blocking agent to ensure the unique cross-linking of the internal amino acid (e.g. lysine residue) to the carrier. In some embodiments, the blocking agent may be removed once cross-linking has been achieved.

In one embodiment the carrier is coupled at amino acid position 9 in the ST mutant of an *E. coli* heat-stable toxin (ST) having the following sequence:

```
NSSNYCCEKCCNPTCTGCY;
or

NSSNYCCENCCNPTCTGCY;
or
```

-continued

```
NSSNYCCETCCNPTCTGCY;
or

NSSNYCCESCCNPTCTGCY;
or

NSSNYCCEACCNPTCTGCY;
or

NSSNYCCEGCCNPTCTGCY.
```

In another embodiment the carrier is coupled at amino acid position 8 in the ST mutant of an *E. coli* heat-stable toxin (ST) having the following sequence:

```
NTFYCCEKCCNPTCAGCY;
or

NTFYCCENCCNPTCAGCY;
or

NTFYCCETCCNPTCAGCY;
or
```

In one embodiment, the chemical conjugation is a single site-selective attachment.

In one embodiment, the chemical conjugation utilises a thiol-maleimide reaction.

In some embodiments whereby the mutant is linked to the carrier at its N-terminus, a thiol-maleimide linkage is introduced by reacting the ST mutant comprising a maleimide moiety (mal) at its N-terminus and a carrier modified with a thioacetyl moiety at least at one, and up to all, of its accessible free amino groups.

In some embodiments whereby the mutant is linked to the carrier at the side-chain N-terminus of an internal amino acid (such as lysine), a thiol-maleimide linkage is introduced by reacting (i) the ST mutant acetylated at its N-terminus and comprising a maleimide moiety at the sidechain of the internal amino acid (such as lysine) with (ii) a carrier modified with a thioacetyl moiety at least at one, and up to all, of its accessible free amino groups.

In some embodiments whereby the mutant is linked to the carrier at its N-terminus, a triazole-type linkage is introduced by reacting (i) the ST mutant comprising an azido moiety at its N-terminus with (ii) a carrier modified with an alkynyl, in particular propargyl, moiety at least at one, and up to all, of its accessible free amino groups.

In some embodiments whereby the mutant is linked to the carrier at the sidechain N-terminus of an internal amino acid (such as lysine), a triazole linkage is introduced by reacting (i) the ST mutant acetylated at its N-terminus and comprising an azide moiety at the sidechain of the internal amino acid (such as lysine) with (ii) a carrier modified with a propargyl moiety at least at one, and up to all, of its accessible free amino groups.

Advantageously, linking the mutant to the carrier at an internal amino acid (such as lysine), provides conjugates whereby the peptide is exposed to the immune system in a way diverging from its exposure when linked at its N-terminus. This may lower the risk of inducing antibodies cross-reacting with guanylin and uroguanylin, while providing conjugates retaining high immunogenicity, as measured by their ability at inducing high anti-ST antibody titers.

Genetic fusion includes the approach of linking a mutant of the present invention to a carrier through the polypeptide backbone of each protein to create a fusion protein. This may be achieved by expression of a gene encoding such a fusion protein. The proteins may be coupled at the N- or C-termini of either protein. Alternatively, one protein may be inserted into another protein in such a manner that the structures and functions of both proteins are substantially not altered, for example by incorporation into a loop region. Proteins may be coupled directly or via polypeptide linkers.

Finally, the mutants may be expressed by live vaccine vectors, such as attenuated *Shigella* strains (Altboum et al. Infect Immun. 2003 March; 71(3):1352-60).

In some embodiments, the ST mutant is a mixture of mutants.

One example of a mixture of ST mutants is a mixture comprising at least 2 types of ST mutants having a different amino acid sequence. Such as wherein a first type of ST mutant has the amino acid sequence wherein the mutations are L9K and A14T and a second type of ST mutant has a different amino acid sequence wherein the mutations are L9N and A14T; or such as wherein a first type of ST mutant has the amino acid sequence wherein the mutations are L9K and A14T and a second type of ST mutant has a different amino acid sequence wherein the mutations are L9T and A14T; or such as wherein a first type of ST mutant has the amino acid sequence wherein the mutations are L9N and A14T and a second type of ST mutant has a different amino acid sequence wherein the mutations are L9T and A14T.

Another example of a mixture of ST mutants is a mixture comprising at least 3 types of ST mutants. Such as wherein a first type of ST mutant has the amino acid sequence wherein the mutations are L9K and A14T, the second type of ST mutant has a different amino acid sequence wherein the mutations are L9N and A14T and the third type of ST mutant has a different amino acid sequence wherein the mutations are L9T and A14T.

Another example of a mixture of ST mutants is a mixture comprising at least 2 types of ST mutants wherein the carrier is coupled at a different position. For instance, the mixture of ST mutants comprises a first type of ST mutant wherein the carrier is coupled at the N-terminus of the ST mutant and a second type of ST mutant wherein the carrier is coupled to an amino acid within the polypeptide sequence of the ST mutant; the ST mutants may have the same amino acid sequence or a different amino acid sequence. In a further illustration, the mixture of ST mutants comprises a first type of ST mutant wherein the carrier is coupled at one internal amino acid of the ST mutant and a second type of ST mutant wherein the carrier is coupled to a different internal amino acid within the polypeptide sequence of the ST mutant; the ST mutants may have the same amino acid sequence.

Without wishing to be bound by theory, advantageously conjugation enables more than one mutant of an *E. coli* heat-stable toxin (ST) to be coupled to a single carrier.

In some embodiments, more than one mutant of an *E. coli* heat-stable toxin (ST) is coupled to a carrier (such as CRM197).

In some embodiments, more than one single type of mutant of an *E. coli* heat-stable toxin (ST) is coupled to a carrier (such as CRM197).

The ratio of ST mutant to carrier depends on the size of the carrier and the number of accessible reactive chemical groups on the carrier.

In some embodiments, about 2 to about 100, about 2 to about 50, about 2 to about 40, about 2 to about 30, about 2 to about 25, about 2 to about 20, about 2 to about 18, about 2 to about 15, about 2 to about 10, about 2 to about 5, or about 2 to about 4 mutants, or about 2 to about 3 mutants of an *E. coli* heat-stable toxin (ST) are coupled to a single carrier (such as CRM197).

In some embodiments, about 100, about 50, about 40, about 30, about 25, about 20, about 18, about 15, about 10, about 5, about 4, about 3, or about 2 mutants of an *E. coli* heat-stable toxin (ST) are coupled to a single carrier (such as CRM197).

In some embodiments, the ratio of ST mutant to carrier is in the range from about 2:1 to about 100:1, about 2:1 to about 50:1, about 2:1 to about 40:1, about 2:1 to about 30:1, about 2:1 to about 5:1, about 2:1 to about 20:1, about 2:1 to about 18:1, about 2:1 to about 15:1, about 2:1 to about 10:1, about 2:1 to about 5:1, about 2:1 to about 4:1, or about 2:1 to about 3:1.

In some embodiments, the ratio of ST mutant to carrier is about 100:1, about 50:1, about 40:1, about 30:1, about 25:1, about 20:1, about 18:1, about 15:1, about 10:1, about 5:1, about 4:1, about 3:1 or about 2:1.

In one embodiment, the more than one mutant of an *E. coli* heat-stable toxin (ST) coupled to the single carrier are of the same type (i.e. they have the same amino acid sequence—such as

```
                                    (SEQ ID NO: 8)
NSSNYCCESCCNPTCTGCY; or (SEQ ID NO: 9)
NSSNYCCEACCNPTCTGCY; or (SEQ ID NO: 10)
NSSNYCCEGCCNPTCTGCY.)
```

In an alternative embodiment, the more than one mutant of an *E. coli* heat-stable toxin (ST) coupled to the carrier are at least 2 types of ST mutants having a different amino acid sequence. For example, the first type of ST mutant has the amino acid sequence wherein the mutations are L9K and A14T and the second type of ST mutant has a different amino acid sequence wherein the mutations are L9N and Al4T; or the first type of ST mutant has the amino acid sequence wherein the mutations are L9K and A14T and the second type of ST mutant has a different amino acid sequence wherein the mutations are L9T and A14T; or the first type of ST mutant has the amino acid sequence wherein the mutations are L9N and A14T and the second type of ST mutant has a different amino acid sequence wherein the mutations are L9T and A14T; or the first type of ST mutant has the amino acid sequence wherein the mutations are L9K and A14T, the second type of ST mutant has a different amino acid sequence wherein the mutations are L9N and A14T and the third type of ST mutant has a different amino acid sequence wherein the mutations are L9T and A14T.

In some embodiments, the vaccine is a mixture of different ST mutants as described herein.

In some embodiments, the vaccine is a mixture of different ST mutant-carrier conjugates as described herein.

In one embodiment, the vaccine is a mixture of one type of ST mutant (e.g.

```
                                    (SEQ ID NO: 8)
NSSNYCCESCCNPTCTGCY; or (SEQ ID NO: 9)
NSSNYCCEACCNPTCTGCY; or (SEQ ID NO: 10)
NSSNYCCEGCCNPTCTGCY.)
``` coupled to different types of carriers (e.g. CRM197 and LT-B). In addition or alternatively, in some embodiments, different ST mutants are coupled to a single carrier (e.g. CRM197). In addition or alternatively, in some embodiments different ST mutants are coupled to different carriers; these carriers may be of the same type (e.g. CRM197) or different types (e.g. CRM197 and LT-B).

Peptide Variants, Derivatives, Mutants, Analogues and Fragments

The present invention also encompasses variants, analogues and derivatives of the ST mutant proteins disclosed herein.

The terms "peptide", "polypeptide", "protein", and "amino acid sequence" may be used interchangeably herein.

Terms "variant" or "derivative" in relation to amino acid sequences of the present invention includes any substitution of, variation of, modification of, replacement of, deletion of or addition of one (or more) amino acids from or to the sequence, providing the resultant amino acid sequence preferably has substantially the same therapeutic activity.

The term "STh variant" as used herein may be interchangeable with the term "ST mutant" or "STh mutant".

Amino acid substitutions may include the use of non-naturally occurring analogues, for example to increase blood plasma half-life of a therapeutically administered polypeptide.

Conservative substitutions may be made, for example according to the Table below. Amino acids in the same block in the second column and preferably in the same line in the third column may be substituted for each other.

| ALIPHATIC | Non-polar | G A P |
| | | I L V |
| | Polar-uncharged | C S T M |
| | | N Q |
| | Polar-charged | D E |
| | | K R H |
| AROMATIC | | F W Y |

Polynucleotides, Vectors and Host Cells

The present invention also provides polynucleotides encoding the *E. coli* heat-stable toxin mutants of the invention.

The terms "polynucleotides", "nucleotide sequence" "nucleic acid sequence" and "nucleic acid" as used herein may be interchangeable.

It will be understood by a skilled person that numerous different polynucleotides can encode the same polypeptide as a result of the degeneracy of the genetic code. In addition, it is to be understood that skilled persons may, using routine techniques, make nucleotide substitutions that do not affect the polypeptide sequence encoded by the polynucleotides of the invention to reflect the codon usage of any particular host organism in which the polypeptides of the invention are to be expressed.

Polynucleotides of the invention may comprise DNA or RNA. They may be single-stranded or double-stranded. They may also be polynucleotides which include within them synthetic or modified nucleotides. A number of different types of modification to oligonucleotides are known in the art. These include methylphosphonate and phosphorothioate backbones, addition of acridine or polylysine chains at the 3' and/or 5' ends of the molecule. For the purposes of the present invention, it is to be understood that the polynucleotides described herein may be modified by any method available in the field of the invention.

Such modifications may be carried out in order to enhance the in vivo activity or life span of polynucleotides.

Polynucleotides of the invention can be incorporated into a recombinant replicable vector. The vector may be used to replicate the nucleic acid in a compatible host cell.

Preferably, a polynucleotide of the invention in a vector is operably linked to a control sequence that is capable of providing for the expression of the coding sequence by the host cell, i.e. the vector is an expression vector. The term "operably linked" means that the components described are in a relationship permitting them to function in their intended manner. A regulatory sequence "operably linked" to a coding sequence is ligated in such a way that expression of the coding sequence is achieved under condition compatible with the control sequences.

Control sequences operably linked to sequences encoding the mutant of the invention include promoters/enhancers and other expression regulation signals. These control sequences may be selected to be compatible with the host cell for which the expression vector is designed to be used in. The term "promoter" is well-known in the art and encompasses nucleic acid regions ranging in size and complexity from minimal promoters to promoters including upstream elements and enhancers.

Vectors of the invention may be transformed or transfected into a suitable host cell so as to provide for expression of an ST mutant of the invention. This process may comprise culturing a host cell transformed with an expression vector as described above under conditions to provide for expression by the vector of a coding sequence encoding the mutant, and optionally recovering the expressed protein.

The polynucleotide or vector of the invention may be administered to a subject such that the mutant ST peptide is expressed in-vivo. Examples of such vectors include, for example, plasmids and viral vectors.

Examples of viral vectors include retroviral vectors, Murine Leukemia Virus (MLV) vectors, adenovirus vectors, pox viral vectors and vaccinia viral vectors. Examples or retroviral vectors include murine leukemia virus (MLV), human immunodeficiency virus (HIV-1), equine infectious anaemia virus (EIAV), mouse mammary tumour virus (MMTV), Rous sarcoma virus (RSV), Fujinami sarcoma virus (FuSV), Moloney murine leukemia virus (Mo-MLV), FBR murine osteosarcoma virus (FBR MSV), Moloney murine sarcoma virus (Mo-MSV), Abelson murine leukemia virus (A-MLV), Avian myelocytomatosis virus-29 (MC29), and Avian erythroblastosis virus (AEV) and all other retroviridiae including lentiviruses. A detailed list of retroviruses may be found in Coffin et al., 1997, "retroviruses", Cold Spring Harbour Laboratory Press Eds: J M Coffin, SM Hughes, HE Varmus pp 758-763.

Antibodies

The present invention also provides a polyclonal or monoclonal antibody that is immunospecific for an ST mutant disclosed herein. In some embodiments, the polyclonal or monoclonal antibody that is immunospecific for the ST mutant is also capable of binding to native ST.

According to another aspect of the present invention there is provided a polyclonal or monoclonal antibody that is anti-ST mutant. In some embodiments, the polyclonal or monoclonal antibody that is anti-ST mutant is also anti-native ST.

As used herein, the term "antibody" refers to a protein consisting of one or more polypeptides substantially encoded by immunoglobulin genes or fragments of immunoglobulin genes. Antibodies may exist as intact immunoglobulins or as a number of fragments, including those well-characterised fragments produced by digestion with various peptidases. While various antibody fragments are defined in terms of the digestion of an intact antibody, one of skill will appreciate that antibody fragments may be synthesised de novo either chemically or by utilising recombinant DNA methodology. Thus, the term "antibody", as used herein, also includes antibody fragments which retain their binding activity for a target antigen, either produced by the modification of whole antibodies or synthesised de novo using recombinant DNA methodologies. Antibody fragments encompassed by the use of the term "antibody" include, but are not limited to, Fab, Fab', F(ab')2, Fv, scFv, dsFv diabody and Fd fragments. Furthermore, the antibodies and fragments thereof may be humanised antibodies.

ST mutants according to the invention may be used directly as immunogens to generate antisera and monoclonal antibodies. The invention thus provides a method for inducing antigen specific immunoglobulin production comprising the steps of:

a) immunizing an animal or human with a mutant according to the present invention; and
b) recovering immunoglobulin(s) specific for a region of the mutant from the serum of the animal.

The animals used for antibody production may be any animals normally employed for the purpose, particularly mammals. Especially indicated are mice, rats, guinea pigs, rabbits and Llamas.

In some embodiments, the antibodies may be single-chain antibodies (see Simon Krah, Christian Schroter, Stefan Zielonka, Martin Empting, Bernhard Valldorf & Harald Kolmar (2016) Single-domain antibodies for biomedical applications, Immunopharmacology and Immunotoxicology, 38:1, 21-28, DOI: 10.3109/08923973.2015.1102934.). Single-chain antibodies can be based on the heavy chain variable domains or the light chains. Single-chain antibodies based on the light chain may be referred to as Nanobodies®. Single-chain antibodies can be obtained by immunization of dromedaries, camels, llamas, alpacas or sharks with the desired antigen.

Immunisation is carried out according to established techniques (see "Antibodies, A Laboratory Manual" by E. Harlow and D. Lane (1988) Cold Spring Harbor, U.S.A.).

More particularly, the mutants, and conjugates thereof, of the present invention can be used to produce both polyclonal and monoclonal antibodies.

If polyclonal antibodies are desired, a selected mammal (e.g. mouse, rabbit, goat, horse, etc.) is immunised. Serum from the immunised animal is collected and treated according to known procedures. If the serum contains polyclonal antibodies to other antigens, the polyclonal antibodies can be purified by immunoaffinity chromatography. Techniques for producing and processing polyclonal antisera are known in the art.

Monoclonal antibodies directed against antigens used in the invention can also be readily produced by those skilled in the art. The general methodology for making monoclonal antibodies by hybridomas is well known. Immortal antibody-producing cell lines can be created by cell fusion and also by other techniques such as direct transformation of B-lymphocytes with oncogenic DNA or transfection with Epstein-Barr virus. Panels of monoclonal antibodies produced against antigens can be screened for various properties, for example for isotype and epitope affinity, and epitope mapping.

An alternative technique involves screening phage display libraries where, for example, the phage express scFv fragments on the surface of their coat with a large variety of complementary determining regions (CDRs). This technique is well known in the art.

Antibodies, both monoclonal and polyclonal, which are directed against antigens are particularly useful in diagnosis, and those which are neutralising are useful in passive immunotherapy. Monoclonal antibodies in particular may be used to raise anti-idiotype antibodies. Anti-idiotype antibodies are immunoglobulins which carry an "internal image" of the antigen of the infectious agent against which protection is desired.

Techniques for raising anti-idiotype antibodies are known in the art. These anti-idiotype antibodies may also be useful for treatment, as well as for an elucidation of the immunogenic regions of antigens.

Vaccine Compositions

The term "vaccine composition" as used herein may be used interchangeably with the term "vaccine".

The present invention provides a vaccine composition comprising an ST mutant or nucleic acid of the invention, and a pharmaceutically acceptable carrier and/or excipient.

The present invention also provides a vaccine composition comprising a vector of the invention and a pharmaceutically acceptable carrier and/or excipient.

The present invention further provides a vaccine composition comprising a host cell of the invention and a pharmaceutically acceptable carrier and/or excipient.

The present invention also provides a vaccine composition comprising an antibody of the invention and a pharmaceutically acceptable carrier and/or excipient.

The present invention also provides a pharmaceutical composition comprising an antibody of the invention and a pharmaceutically acceptable carrier and/or excipient.

The preparation of vaccines which contain an immunogenic polypeptide(s)/polynucleotide(s) as active ingredient(s), is known to those skilled in the art. Typically, such vaccines are prepared as injectables, either as liquid solutions or suspensions; solid forms suitable for solution in, or suspension in, liquid prior to injection may also be prepared. The preparation may also be emulsified, or the protein encapsulated in liposomes. The active immunogenic ingredients are often mixed with excipients which are pharmaceutically acceptable and compatible with the active ingredient. Suitable excipients are, for example, water, saline, dextrose, glycerol, ethanol, or the like and combinations thereof.

In addition, if desired, the vaccine may contain minor amounts of auxiliary substances such as wetting or emulsifying agents, pH buffering agents, and/or adjuvants which enhance the effectiveness of the vaccine.

An adjuvant is any pharmacologically acceptable substance which enhances the immune response to an antigen or allergen. Thus, a $T_h1$-inducing adjuvant enhances the response of $T_h1$ cells to an antigen or allergen.

Example of adjuvants include mucosal polypeptides.

An example of an adjuvant which might be effective is dmLT (double mutant heat-labile toxin (see recent review: Clements J D, Norton E B. The Mucosal Vaccine Adjuvant LT(R192G/L211A) or dmLT. —mSphere. 2018 Jul. 25; 3(4). pii: e00215-18. doi: 10.1128/mSphere.00215-18. Review. PubMed PMID: 30045966; PubMed Central PMCID: PMC6060342.).

Other examples of adjuvants which may be effective include, but are not limited to, aluminium hydroxide, tyrosine and derivatives thereof, N-acetyl-muramyl-L-threonyl-D-isoglutamine (Thr-MDP), N-acetyl-nor-muramyl-L-alanyl-D-isoglutamine (CGP 11637, referred to as nor-MDP), N-acetylmuramyl-L-alanyl-D-isoglutaminyl-L-alanine-2-(1'-2'-dipalmitoyl-sn-glycero-3-hydroxyphosphoryloxy)-ethylamine (CGP 19835A, referred to as MTP-PE) and RIBI, which contains three components extracted from bacteria, monophosphoryl lipid A, trehalose dimycolate and cell wall skeleton (MPL+TDM+CWS) in a 2% squalene/Tween 80 emulsion.

Further examples of adjuvants and other agents include aluminium phosphate, aluminium potassium sulfate (alum), beryllium sulfate, silica, kaolin, carbon, water-in-oil emulsions, oil-in-water emulsions, muramyl dipeptide, bacterial endotoxin, lipid X, *Corynebacterium parvum* (*Propionobacterium acnes*), *Bordetella pertussis*, polyribonucleotides, sodium alginate, lanolin, lysolecithin, vitamin A, saponin, liposomes, levamisole, DEAE-dextran, blocked copolymers or other synthetic adjuvants. Such adjuvants are available commercially from various sources, for example, Merck Adjuvant 65 (Merck and Company, Inc., Rahway, N.J.) or Freund's Incomplete Adjuvant and Complete Adjuvant (Difco Laboratories, Detroit, Michigan).

Typically, adjuvants such as Amphigen (oil-in-water), Alhydrogel (aluminium hydroxide), a mixture of Amphigen and Alhydrogel, tyrosine and derivatives thereof, and calcium phosphate are used.

Adjuvants that interact with toll-like receptors on phagocytic, and endocyte and/or antigen presenting cells, for example, but not limited to toll-like receptors 2 and/or 4 and/or 9 may be used. Examples of these adjuvants are, but not limited to, the $T_h1$ inducing adjuvant monophosphoryl lipid A (MPL, see U.S. Pat. Nos. 4,912,094 and 4,987,237), and its derivatives and synthetic analogues, and the CpG DNA motif and its derivatives and analogues.

The proportion of immunogen and adjuvant can be varied over a broad range so long as both are present in effective amounts. For example, aluminium hydroxide can be present in an amount of about 0.5% of the vaccine mixture ($Al_2O_3$ basis).

The effectiveness of an adjuvant may be determined by measuring the amount of antibodies directed against an immunogenic agent resulting from administration of this agent in vaccines which are also comprised of the various adjuvants.

In one embodiment the adjuvant is dmLT.

The vaccines are conventionally administered parenterally, by injection, for example either intradermally, subcutaneously or intramuscularly. Additional formulations which are suitable for other modes of administration include suppositories and oral formulations.

For suppositories, traditional binders and carriers may include, for example, polyalkylene glycols or triglycerides.

Oral formulations include such normally employed excipients as, for example, pharmaceutical grades of mannitol, lactose, starch, magnesium stearate, sodium saccharine, cellulose, sodium bicarbonate, magnesium carbonate, and the like. These compositions take the form of solutions, suspensions, tablets, pills, capsules, sustained release formulations or powders and may contain, for example, 10% to 95% of active ingredient, preferably 25% to 70%. Where the vaccine composition is lyophilised, the lyophilised material may be reconstituted prior to administration, for example as a suspension. Reconstitution is preferably effected in buffer.

Dosage and Administration of Vaccines

The vaccines are administered in a manner compatible with the dosage formulation, and in such amount as will be prophylactically and/or therapeutically effective.

A prophylactic vaccine is one which prevents disease. The quantity to be administered may depend on the subject to be treated and the capacity of the subject's immune system to produce antibodies.

Precise amounts of active ingredient required to be administered may depend on the judgement of the practitioner and may be peculiar to each subject.

In some embodiments, the subject is a human. In other embodiments, the subject is a pig.

The vaccine may be given in a single dose schedule or in a multiple dose schedule. A multiple dose schedule is one in which a primary course of vaccination may be with 1-10 separate doses followed by other doses given at subsequent time intervals required to maintain and/or reinforce the immune response, for example, at 2 to 4 weeks after the first dose, and if needed, a subsequent dose(s) after several months. The dosage regimen will also, at least in part, be determined by the need of the individual and be dependent upon the judgement of the practitioner.

In some embodiments, the vaccine may be given in a dose schedule wherein the amount of peptide as described herein in the dose schedule is in the range of from about 0.2 μg to about 500 μg, about 0.2 μg to about 200 μg, about 0.2 μg to about 100 μg, about 0.2 μg to about 50 μg, about 0.2 μg to about 20 μg, about 0.2 μg to about 17 μg, about 0.2 μg to about 15 μg, about 0.2 μg to about 10 μg, about 0.2 μg to about 5 μg, or about 0.2 μg to about 3 μg.

In some embodiments, the peptide as described herein is a mutant of an *E. coli* heat stable toxin (ST). In other embodiments, the peptide as described herein is a mutant of an *E. coli* heat stable toxin (ST) wherein a polypeptide carrier (such as LTB or CRM) is coupled to the mutant.

In some embodiments, the vaccine may be given in a dose schedule wherein the amount of peptide as described herein in the dose schedule is about 500 μg, about 200 μg, about 100 μg, about 50 μg, about 20 μg, about 17 μg, about 15 μg, about 10 μg, about 5 μg, about 3 μg, about 2 μg, about 1 μg, about 0.5 μg, about 0.4 μg, about 0.3 μg, or about 0.2 μg.

In some embodiments, the peptide as described herein is administered at a dosage of from about 0.2 μg to about 500 μg, about 0.2 μg to about 200 μg, about 0.2 μg to about 100 μg, about 0.2 μg to about 50 μg, about 0.2 μg to about 20 μg, about 0.2 μg to about 17 μg, about 0.2 μg to about 15 μg, about 0.2 μg to about 10 μg, about 0.2 μg to about 5 μg, or about 0.2 μg to about 3 μg.

In some embodiments, the peptide as described herein is administered at a dosage of about 500 μg, about 200 μg, about 100 μg, about 50 μg, about 20 μg, about 17 μg, about 15 μg, about 10 μg, about 5 μg, about 3 μg, about 2 μg, about 1 μg, about 0.5 μg, about 0.4 μg, about 0.3 μg, or about 0.2 μg.

In one embodiment, the vaccine is formulated to provide a dosage of from about 0.2 μg to about 500 μg, about 0.2 μg to about 200 μg, about 0.2 μg to about 100 μg, about 0.2 μg to about 50 μg, about 0.2 μg to about 20 μg, about 0.2 μg to about 17 μg, about 0.2 μg to about 15 μg, about 0.2 μg to about 10 μg, about 0.2 μg to about 5 μg, or about 0.2 μg to about 3 μg of peptide as described herein.

In one embodiment, the vaccine is formulated to provide a dosage of about 500 μg, about 200 μg, about 100 μg, about 50 μg, about 20 μg, about 17 μg, about 15 μg, about 10 μg, about 5 μg, about 3 μg, about 2 μg, about 1 μg, about 0.5 μg, about 0.4 μg, about 0.3 μg, or about 0.2 μg peptide as described herein.

In one embodiment, the vaccine is administered subcutaneously.

In one embodiment, the vaccine is formulated for subcutaneous administration.

In one embodiment, the vaccine is administered subcutaneously to a human.

In one embodiment, the vaccine is formulated for subcutaneous administration to a human.

In one embodiment, the vaccine is administered subcutaneously to a pig.

In one embodiment, the vaccine is formulated for subcutaneous administration to a pig.

In addition, the vaccine containing the antigen(s) may be administered in conjunction with other immunoregulatory agents, for example immunoglobulins.

The method of obtention of the toxoids as well as of the site-selective ST-attached conjugates at an internal site of ST with original exposure of the putative epitopes of importance to fulfil the requirements for an ETEC ST-based vaccine.

It is to be appreciated that all references herein to treatment include curative, palliative and prophylactic treatment. The treatment of mammals is particularly preferred. Both human and veterinary treatments are within the scope of the present invention.

EXAMPLES

Example 1

Material & Methods

Peptide synthesis was carried out on a 100 μmol scale on an ABI 433 synthesizer (Applied Biosystems, Foster City, CA) from a Fmoc-Tyr(tBu) Wang resin with a capacity of 0.31 mmol/g (Rapp Polymere GmbH, Tuebingen, Germany). N,N-diisopropylethylamine (DIPEA) and N-methyl pyrrolidone (NMP) were purchased from Applied Biosystems. Fluoromethoxycarbonyl amino acids (Fmoc-AAs) were purchased from Applied Biosystems, Novabiochem or Iris Biotech GMBH. Fmoc-AAs were activated with 1-[bis (dimethylamino)methylene]-1H-1,2,3-triazolo[4,5-b]pyridinium 3-oxid hexafluorophosphate (HATU) purchased from Matrix Innovation inc., Quebec (Canada) and Piperidine was purchased from Sigma. The Clear-Ox™ resin was purchased from Peptides International (Louisville, KY, USA). The AG1-X8 anion exchange resin was purchased from Biorad. All yields are calculated based on net peptide content determined by amino acid analysis (AAA).

Conjugate synthesis: native STh was purchased from Peptide International (Louisville, KY, USA) or chemically synthesized. A polyethylene glycol linker-equipped maleimide activated in the form of an N-hydroxysuccinimide ester, NHS-PEG$_2$-Mal, N-Succinimidyl-S-acetylthiopropionate (SATP), PBS (100 mM sodium phosphate, pH 7.2, 150 mM NaCl, part number 28372), PBSE buffer (5 mM EDTA added to PBS) and 10× conjugation buffer (part number 1856000) were purchased from Thermo Scientific. Bovine Serum Albumin (BSA, part number A7906) was purchased from Sigma. LTB (lot number 15005) was kindly provided by J. D. Clements (Tulane University, New Orleans, LA, USA), and may also appear in the name LTBc.

RP-MPLC was performed on a AP-100/200 flash, Armen Instrument (Saint Ave, France) eluting through a 26×313 mm preparative column packed with 100 Å 20 μm C18 Nucleoprep packing (Macherey & Nagel GmbH & Co, DUren, Germany), by eluting at a 20 mL/min flow rate and detecting at 215 nm.

RP-HPLC was performed on an Agilent 1100 Series liquid chromatograph and monitored by absorbance at 230 nm. Analytical HPLC: a 15-35% linear gradient of acetonitrile (MeCN) in 0.08% aqueous TFA over 20 min was applied at a 0.35 mL/min flow rate on a 2.1×100 mm Aeris PEPTIDE 3.6 μm XB-C18 100 Å column (Phenomenex, Le Pecq, France) equilibrated at 50° C. Semi-preparative RP-HPLC was performed on a Perkin Elmer Series 200, monitored by absorbance at 230 nm (unless stated otherwise): a 15-35% linear gradient of MeCN in 0.08% aqueous TFA was applied at a 6.0 mL/min flow rate on a 10×250 mm, Aeris PEPTIDE XB-C18, 5 pmn 100 Å column (Phenomenex).

LC-MS peptide analysis was performed on a 2.1×100 mm Aeris PEPTIDE equilibrated at 50° C., using a 1%/min linear gradient of MeCN in 10 mM triethylamine acetate buffer or 0.08% aqueous TFA, and detecting in the positive-ion mode on a quadrupole-TOF Micro mass spectrometer (Waters) equipped with a Z-spray API source.

LC-MS protein analysis was performed on a Aeris WIDE-PORE, 3.6 μm XB-C18, 2.1×100 mm, 200 Å, Phenomenex, equilibrated at 45° C., using MeCN/0.025% formic acid in $H_2O$/0.05% formic acid/0.04% TFA (5% isocratic for 5 min then a 5%-100% linear gradient over 20 min) and detecting in the positive-ion mode on a quadrupole-TOF Micro mass spectrometer (Waters) equipped with a Z-spray API source.

Electrospray ionisation mass spectrometry. ESI-MS was carried out on a quadrupole-TOF Micro mass spectrometer (Waters) equipped with a Z-spray API source. The peptide was dissolved in a mixture of water/methanol/acetic acid (49.5/49.5/1, v/v/v) and analyzed in positive-ion mode. Deconvolution used the MassLynx MaxEnt3 program.

Amino acid analysis (AAA) was performed on a Hitachi L8800 amino acid analyzer. Briefly, samples are submitted to acidic hydrolysis in 6N aqueous HCl containing 2% phenol, at 110° C., for 20h for peptide analysis and 48 hours for protein analysis. Peptide quantification is calculated using norleucine as internal standard. In the case of $_{SAc}$LTB and $_{SAc}$BSA, βAlanine is generated upon acid hydrolysis of the $PEG_2$-Mal linker. Therefore, the number of Phenylalanine residue present in the protein (10/LTB and 27/BSA, respectively) is used as reference. The peptide/protein ratio is calculated by taking the values found for the more stable AAs upon acid hydrolysis (AAs in bold in the table).

Native STh: General Processes
Native STh: Chemical Synthesis with Direct Oxidative Folding Synthesis and folding. Fmoc-AAs were side-protected as follows: tert-butyl (tBu) for glutamic acid, serine, threonine, and tyrosine; Trt for cysteine and asparagine; tert-butoxycarbonyl (Boc) for lysine. The diphenylmethyl (Dpm) protected Fmoc-Cys(Dpm)-OH was substituted to Fmoc-Cys(Trt)-OH in an attempt to prevent isomer formation observed after folding completion. All AA-precursors were single-coupled with eight-fold molar excess regarding the resin. Cleavage from the solid support and concomitant unmasking of the amino acid (AA) side chains were accomplished by a 3 hour treatment at room temperature with a mixture of TFA/thioanisole/phenol/water/ethanedithiol/triisopropylsilane (81.5/5/5/5/2.5/1). After filtration of the resin, the cleavage mixture was poured into cold diethyl ether. The precipitate was recovered by centrifugation, washed three times with cold diethyl ether, dried, re-suspended in a mixture of water and acetonitrile, and freeze-dried. Stirring in TFA/water/triisopropylsilane (95/2.5/2.5) for 2 hours resulted in trityl removal to give the crude peptide 77% from the resin (weight estimation). The above material was dissolved in 50% aqueous formic acid and purified by RP-MPLC by applying a linear gradient of 0-60% solvent B (mixture of acetonitrile and solvent A, 8/2 v/v) in solvent A (50 mM ammonium acetate) over 60 min. The suitable fractions were pooled and freeze dried (64%).

Folding was accomplished by stirring the RP-HPLC purified peptide pre-solubilized in DMSO (1.2% final concentration) in 0.2 M aqueous ammonium hydrogenocarbonate, pH 8 (final peptide concentration of 0.2 mg/mL) at 37° C. for 5 hours. Ammonium hydrogenocarbonate was eliminated by freeze drying. The crude material was dissolved in formic acid, then diluted with water to reach a 1:1 mixture and purified by RP-MPLC by applying a linear gradient of 0-60% solvent B (MeCN:solvent A, 8/2 v/v) in solvent A (0.08% aqueous TFA) over 60 min to give the major isomer with a 7.2% overall yield.

ESI-MS: $[M+H]^+$ calculated for $C_{93}H_{130}N_{24}O_{36}S_6$ 2041.6317, found 2041.6799.

Rt (HPLC): 11.1 min

Native STh: Orthogonal Chemical Synthesis

Synthesis of the linear peptide. The six cysteine residues were orthogonally side-protected by pairs. Aiming to compare the ratio of topo-isomers in relation with the bridge formation order, three combinations were designed (over six possibilities): STh1: the trityl protected Fmoc-Cys(Trt)-OH in position 7 and 15, the acetamido (Acm) protected Fmoc-Cys(Acm)-OH in position 10 and 18, the para-methoxybenzyl protected Fmoc-Cys(Mob)-OH in position 6 and 11; STh2: Fmoc-Cys(Trt)-OH in position 6 and 11, Fmoc-Cys(Acm)-OH in position 7 and 15, Fmoc-Cys(Mob)-OH in position 10 and 18; STh3: Fmoc-Cys(Trt)-OH in position 10 and 18, Fmoc-Cys(Acm)-OH in position 7 and 15, Fmoc-Cys(Mob)-OH in position 6 and 11. Other AA precursors, synthesis, cleavage and analytical conditions were as described above except that a 25-45% MeCN HPLC gradient in 0.08% aqueous TFA was used for the linear and precursor peptides. LC-MS analysis of the linear peptide crude using a linear gradient of MeCN in 10 mM triethylamine acetate buffer or 0.08% aqueous TFA showed the presence of side-products with an extra weight of +242 Da (15% to 20%), suggesting incomplete trityl deprotection. Increasing the TFA concentration resulted in a premature Mob loss. The crude peptides were solubilized either in 0.2 M ammonium hydrogenocarbonate with tris(2-carboxyethyl)phosphine (TCEP) (STh1 and STh2) or in 40% aqueous formic acid (STh3) and purified by RP-MPLC. The suitable fractions were pooled and freeze-dried.

First Disulfide Bridge Formation:
the Acm, Mob-protected peptides in 0.2 M ammonium hydrogenocarbonate, pH 8 (0.2 mg/mL) were incubated overnight at 37° C. followed by freeze-drying. Pre-solubilization in DMSO (1 to 2 mL) was performed in the case of STh2 and STh3.

Second Disulfide Bridge Formation:
0.5 M methanolic iodine (8 equiv) was added to the Acm/Mob-protected peptides in 0.1% aqueous TFA/50% MeCN (2.0 mg/mL) and the reaction mixture was stirred for 40 min.

Following quenching with ascorbic acid and dilution with two volumes of 0.08% aqueous TFA, RP-MPLC purification using a linear gradient of 10-70% solvent B in 0.08% aqueous TFA over 60 min gave a mixture of two isomers.

Third Disulfide Bridge Formation:
The Mob-protected peptides were solubilized in TFA/trifluoromethanesulfonic acid (TFMSA)/p-cresol, 8/1/1, at a concentration of 15 (STh1), 25 (STh2) or 33 (STh3) mg/mL. After stirring for 10 min at 0° C., the crudes were precipitated in cold diethyl-ether, dried, dissolved in 1/1 water/MeCN and stirred for 1 hour with AG1-X8 anion exchange resin previously turned into TFA salt. After filtration, the crude was diluted at 0.7 mg/mL in 1/1 0.1% aqueous TFA/MeCN and treated with 0.5 M methanolic iodine until persistence of a slight yellow coloration. Following quenching with ascorbic acid and dilution with two volumes of 0.08% aqueous TFA, RP-MPLC purification using a linear gradient of 10-70% solvent B in 0.08% aqueous TFA over 60 min gave the two isolated isomers.

The major isomers were isolated in 2.8%, 4.2% and 1.4% overall yield for STh1, STh2 and STh3, respectively.

fication provided the correct topological isomer (30%), corresponding to an overall yield of 7.5%.

ESI-MS: $[M+H]^+$ calculated for $C_{93}H_{130}N_{24}O_{36}S_6$ 2041.6317, found 2041.8756.

Rt (HPLC): 11.1 min as found for STh, STh1, STh2 and STh3.

Other representative data for the isolated peptides are gathered in Table 1.

TABLE 1

Yields, and purity for the synthesized STh by use of different routes

| STh orthogonal synthesis (disulfide bridge formation order) | $_{m/dm}$ST(Mob)$^2$ (Acm)$^2$ yield (synthesis, cleavage and purification) | $_{m/dm}$ST(Mob) yield disulfide bridge 7-15, 10-18 and purification (topological isomer ratio, STh in bold) | $_{m/dm}$ST yield disulfide bridge 6-11 and isolation of major isomer | overall isolated yield (major isomer) | Purity (15%-35% acetonitrile gradiant in aq. TFA) |
|---|---|---|---|---|---|
| Ortho 1 (7-15/10-18/6-11) | 34% | 36% (78%-22%) | 23% | 2.8% | 81% |
| Ortho 1(improved) (7-15/10-18/6-11) | 51% | 47.5% (78%-22%) | 31% | 7.5% | 95% |
| ortho 2 (6-11/7-15/10-18) | 30% | 39% (58%-42%) | 38% | 4.2% | 90% |
| Ortho 3 (10-18/7-15/6-11) | 33% | 42% (18%-84%) | 10% | 1.4% | 83% |

STh1, ESI-MS: $[M+H]^+$ calculated for $C_{93}H_{130}N_{24}O_{36}S_6$ 2041.6317, found 2041.8799.

STh2, ESI-MS: $[M+H]^+$ calculated for $C_{93}H_{130}N_{24}O_{36}S_6$ 2041.6317, found 2041.6898.

STh3, ESI-MS: $[M+H]^+$ calculated for $C_{93}H_{130}N_{24}O_{36}S_6$ 2041.6317, found 2041.6322.

All three peptides had Rt (HPLC): 11.1 min. Other representative data for the isolated peptides are gathered in Table 1 (Sth1=ortho1, STh2=orho2, STh3=ortho3).

Native STh: Improved Orthogonal Chemical Synthesis

The six cysteine residues were orthogonally side-protected by pairs as follows: monomethoxytrityl Fmoc-Cys(Mmt)-OH in position 7 and 15, Fmoc-Cys(Acm)-OH in position 10 and 18, and Fmoc-Cys(Mob)-OH in position 6 and 11. In addition, the dimethylcyclopropylmethyl protected Asn(Dmcp) was incorporated at positions 1, 2, 12. Treatment in 80% aqueous TFA for 1h50 gave the linear peptide. The crude was solubilized in 50% aqueous formic acid and purified by RP-MPLC, applying a linear gradient of 0-70% solvent B (MeCN:solvent A, 8/2 v/v) in solvent A (50 mM ammonium acetate) over 60 min. Suitable fractions were pooled to give the 7-15 bridged peptide in 50% yield. The latter was directly oxidized. Briefly, after conditioning, the Clear-Ox™ resin (15 to 20× molar excess over the amount of peptide) was suspended for 3 hours with magnetic stirring in a solution of the purified peptide (1 mg/mL) in 50 mM ammonium acetate:MeCN previously degassed for 10 min argon bubbling. When RP-HPLC follow up indicated the 7-15 disulfide bridge completion, the resin was filtered and the Acm/Mob-protected peptide was freeze-dried.

The Acm/Mob-protected peptides was dissolved in 1/1 0.1% aqueous TFA/MeCN at a concentration of 0.5 mg/mL. 0.5 M Methanolic iodine (5 equiv) was added and after stirring for 30 min, ascorbic acid was added to quench the reaction. After dilution with two volumes of 0.08% aqueous TFA, the Mob-protected peptide (two isomers) was purified by RP-MPLC. Cleavage of the Mob and formation of the 6-11 disulfide bridge were as above. Final RP-MPLC puri- Mutants: General Processes
Mutants: Synthesis with Direct Oxidative Folding The synthesis, cleavage and purification of the STh mutants were carried out according to the general method used for STh synthesis. The L9KA14T and L9GA14K double mutants were acetylated at their N-terminus by treatment of the resin for 30 min with acetic anhydride to give $_{Ac}$L9KA14T and $_{Ac}$L9GA14K, respectively. Peptide folding was done by stirring the linear peptide in 0.2 M ammonium hydrogenocarbonate, pH 8 (0.2 mg/mL) at 37° C. Follow up by analytical RP-HPLC indicated reaction completion, the resulting mixtures were freeze-dried and purified by semi-preparative RP-HPLC using a 12-32% MeCN gradient in 0.08% aqueous TFA to give three products. Two thin peaks were arbitrary named "isomer *" for the major one, and "isomer A" for the minor one, which was also the early eluting one. In addition, a wide-shaped peak containing a mixture of peptides was isolated and arbitrary named "isomer B". All isolated products were checked for purity by analytical HPLC and net peptide content (Table 2). Experimental masses were consistent with the expected values as shown below for the major isomers $_{Ac}$L9KA14T ESI-MS: $[M+H]^+$ calculated for $C_{32}H_{117}N_{23}O_{32}S_6$ 2128.6637, found 2128.5818.

L9GA14T ESI-MS: $[M+H]^+$ calculated for $C_{76}H_{106}N_{22}O_{31}S_6$ 2015.5797, found 2015.4883.

$_{Ac}$L9GA14K ESI-MS: $[M+H]^+$ calculated for $C_{80}H_{113}N_{23}O_{31}S_6$ 2084.6375, found 2084.5714.

Table 2: Yields and purity for the each of the synthesized mutants

TABLE 2

Yields and purity for the each of the synthesized mutants

| $_{dm}$ST | linear peptide yield (synthesis, cleavage and purification) | $_{dm}$ST yield isolation of major isomer (*) | overall isolated yield (major isomer *) | Purity (acetonitrile gradient in aqueous TFA) |
|---|---|---|---|---|
| $_{Ac}$L9K A14T | 41% | 3% | 1.2% | 72% (12%-32%) |

TABLE 2-continued

Yields and purity for the each of the synthesized mutants

| $_{dm}$ST | linear peptide yield (synthesis, cleavage and purification) | $_{dm}$ST yield isolation of major isomer (*) | overall isolated yield (major isomer *) | Purity (acetonitrile gradient in aqueous TFA) |
|---|---|---|---|---|
| L9G A14T | 29% | 11% | 3.2% | 88% (12%-32%) |
| $_{Ac}$L9G A14K | 40% | 9.5% | 3.8% | 81% (12%-32%) |

Mutants: Orthogonal Chemical Synthesis

Synthesis were carried out according to the non-optimized method for STh orthogonal synthesis, as described above. The six cysteines were pairwise orthogonally side-protected by introduction of Fmoc-Cys(Trt)-OH at position 7 and 15, Fmoc-Cys(Acm)-OH at position 10 and 18, and Fmoc-Cys(Mob)-OH at position 6 and 11, respectively. Therefore, the STh-specific 6-11 disulfide bridge, which is absent in guanylin and uroguanylin, was formed last.

Specific data for each single or double mutant are gathered in Table 3.

A14T ESI-MS: $[M+H]^+$ calculated for $C_{80}H_{114}N_{22}O_{31}S_6$ 2071.6324, found 2071.6963.

L9KA14T ESI-MS: $[M+H]^+$ calculated for $C_{80}H_{115}N_{23}O_{31}S_6$ 2086.6532, found 2086.8145

$_{Ac}$L9KA14T ESI-MS: $[M+H]^+$ calculated for $C_{82}H_{117}N_{23}O_{32}S_6$ 2128.6637, found 2128.7256.

L9GA14T ESI-MS: $[M+H]^+$ calculated for $C_{76}H_{106}N_{22}O_{31}S_6$ 2015.5797, found 2015.4912.

$_{Ac}$L9GA14K ESI-MS: $[M+H]^+$ calculated for $C_{80}H_{113}N_{23}O_{31}S_6$ 2084.6375, found 2084.7715.

TABLE 3

Yields, and purity for each of the synthesized mutants

| $_{m/dm}$ST | $_{m/dm}$ST(Mob)$^2$ (Acm)$^2$ yield (synthesis, cleavage and purification) | $_{m/dm}$ST(Mob)$^2$ yield disulfide bridge 7-15, 10-18 and purification (topological isomer ratio) | $_{m/dm}$ST yield disulfide bridge 6-11 and isolation of major Isomer | overall isolated yield (major isomer) | Purity (acetonitrile gradient in aqueous TFA) |
|---|---|---|---|---|---|
| A14T | 29% | 55% (40%-60%) | 33% | 5.3% | 98% (15%-35%) |
| L9K A14T | 42% | 39% (60%-40%) | 31% | 5% | 98% (10%-30%) |
| $_{Ac}$L9K A14T | 29% | 39% (56%-44%) | 24% | 2.7% | 96% (10%-30%) |
| L9G A14T | 32% | 31% (31%-69%) | 20% | 2.8% | 96% (10%-30%) |
| $_{Ac}$L9G A14K | 37% | 8% (20%-80%) | 31% | 1% | 96% (5%-25%) |

STh and STh Toxoid Conjugates

I. Peptide-LTB Conjugates by Means of the Thiol-Maleimide Chemistry

STh, A14T and $_{Ac}$L9KA14T Maleimide Derivatives ($_{Mal}$STh, $_{Mal}$A14T and $_{Mal,Ac}$L9KA14T)

Chemically synthesized STh, A14T and $_{Ac}$L9KA14T mutants were dissolved at 2.0 mg/mL in 10 mM, 10 mM and 20 mM sodium phosphate buffer pH 7, respectively. The linker-equipped maleimide (NHS-PEG$_2$-Mal, 10 mg/mL in DMSO) was added to the peptide solution. After 30 min, semi-preparative RP-HPLC eluting with 20-40% (STh and A14T) and 15-35% ($_{Ac}$L9KA14T) linear gradients of MeCN in 0.08% aqueous TFA, followed by freeze-drying of the suitable fractions, gave the Mal-activated peptides, $_{Mal}$A14T and $_{Mal,Ac}$L9KA14T, respectively. The latter were controlled by ESI-MS and quantified by amino acid analysis (AAA) (Table 4).

The term "$_{Ac}$L9KA14T" as used herein may be used interchangeably with the terms "AcKT" and "$_{Ac}$L9K-A14T".

TABLE 4

Data overview for peptide to $_{Mal}$peptide conversion

| | Peptide (mg) | Mal-peptide (mg) | Yield (%) | Mal-peptide formula | $[M + H]^+$ (calculated) | $[M + H]^+$ (found) |
|---|---|---|---|---|---|---|
| STh | 2.00 | 1.97 | 85 | $C_{93}H_{130}N_{24}O_{36}S_6$ | 2351.7482 | 2351.7482 |
| A14T | 2.34 | 1.84 | 68 | $C_{94}H_{132}N_{24}O_{37}S_6$ | 2381.8271 | 2381.7588 |
| $_{Ac}$L9K-A14T | 2.00 | 1.90 | 83 | $C_{96}H_{135}N_{25}O_{38}S_6$ | 2438.8948 | 2438.7802 |

Thioacetylated LTB and BSA ($_{SAc}$LTB and $_{SAc}$BSA)

Figure 2:
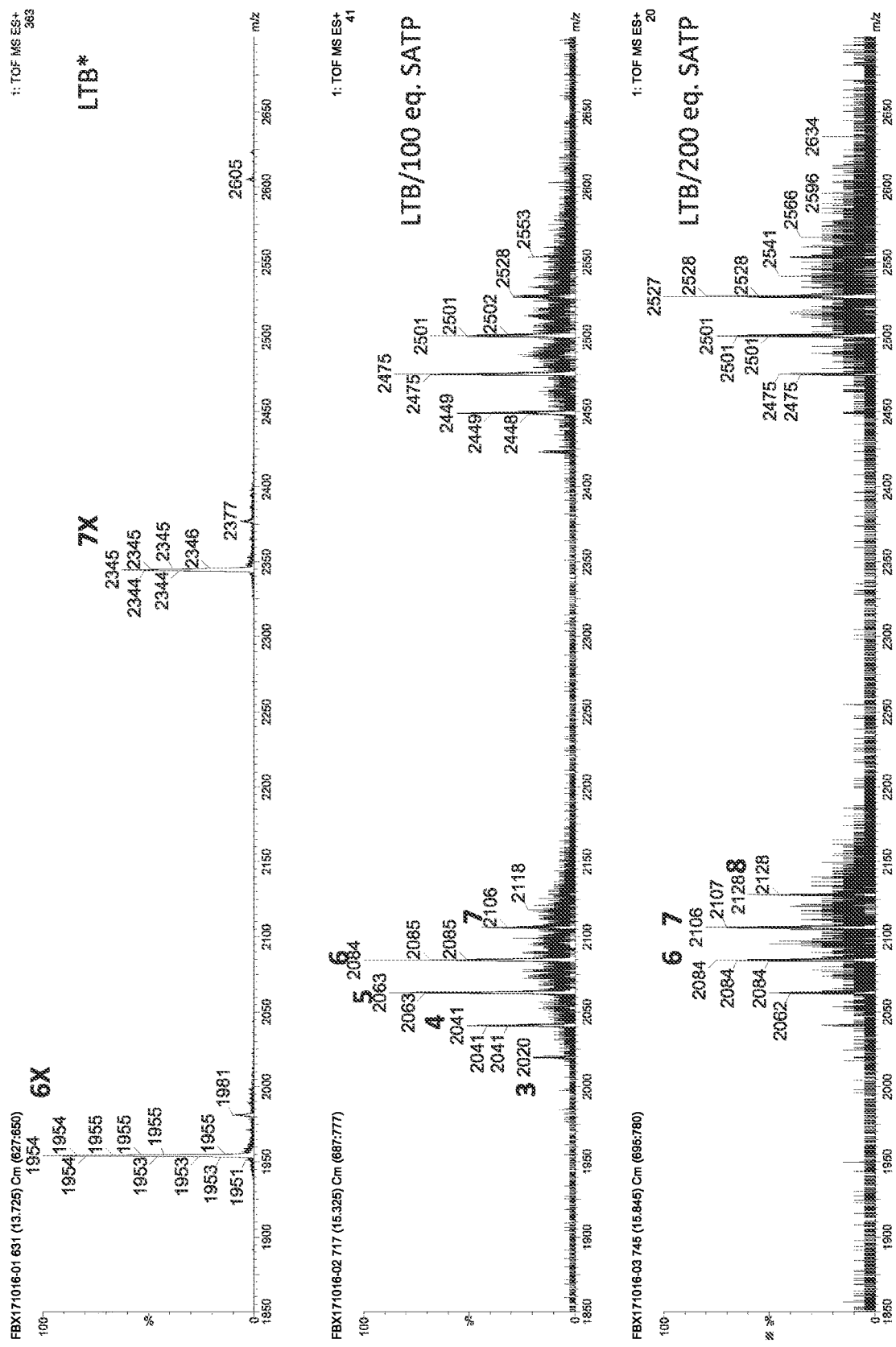
FIG. 2: ESI$^+$-MS monitoring of LTB to $_{SAc}$LTB prepared by use of different SATP/LTB ratio. * LTB is a 58.6 kDa pentameric protein (5×11719 Da).

LTB (5 mg, 1.0 mg/mL in 50 mM TRIS, 200 mM NaCl, 1 mM EDTA, 3 mM NaN$_3$ pH 7.5) and BSA (5 mg, 1.0 mg/mL H$_2$O) were submitted to PBSE buffer exchange and concentration to 5 mg/mL by ultrafiltration (Amicon Ultra-15, 10 kD). SATP (100 equiv mol/mol, 2.0 mg) in DMSO (100 μL) was added to the protein solution, and the reaction mixture was stirred at room temperature for 30 min. LC-MS monitoring indicated reaction completion in the case of BSA. In the case of LTB, more SATP (100 equiv mol/mol, 2.0 mg) was added and the reaction mixture was stirred at room temperature for an additional 30 min (FIG. 2). Excess reagent was removed by ultrafiltration as above using PBSE buffer. The final concentration of the thioacetate-activated protein solution was 4.8 mg/mL and 5.2 mg/mL for $_{SAc}$BSA and $_{SAc}$LTB, respectively.

STh-, A14T- and $_{Ac}$L9KA14T-LTB Conjugates Via Thiol Maleimide Chemistry

Figure 3:
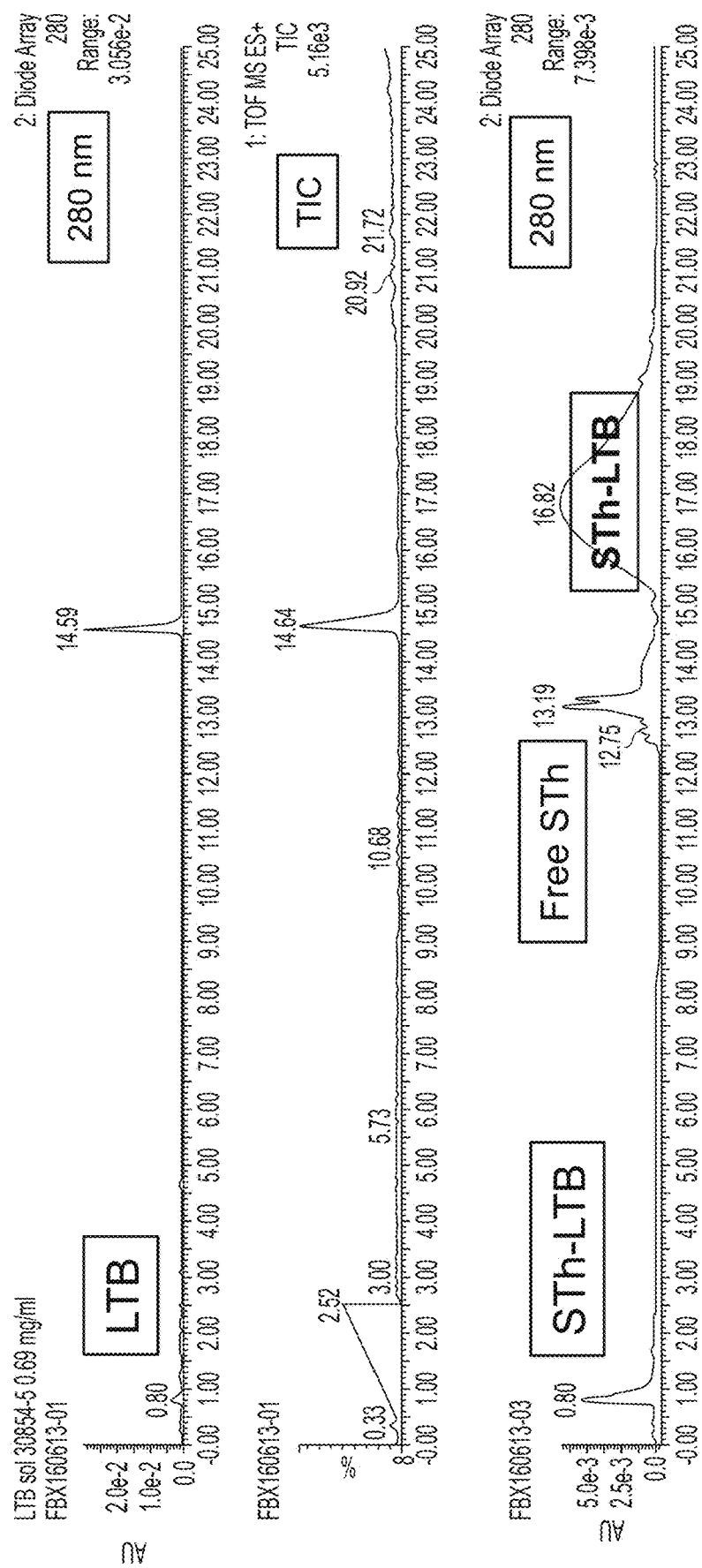
FIG. 3: LCMS (ESI$^+$) monitoring of the SAcLTB to STh-LTB conversion showing the absence of STh in the purified conjugate. The term "fly" signifies do not generate multicharge m/z species.
Figure 3:
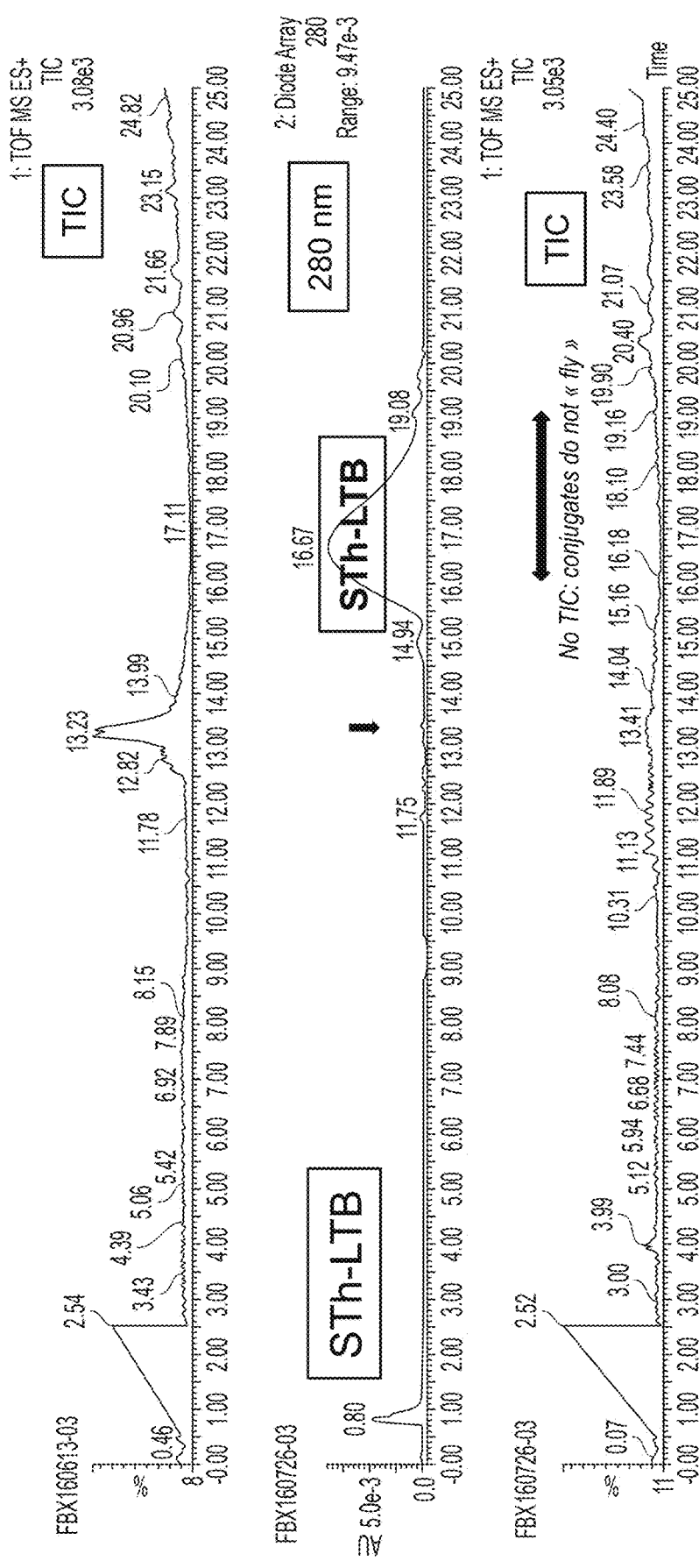
Figure 4A:
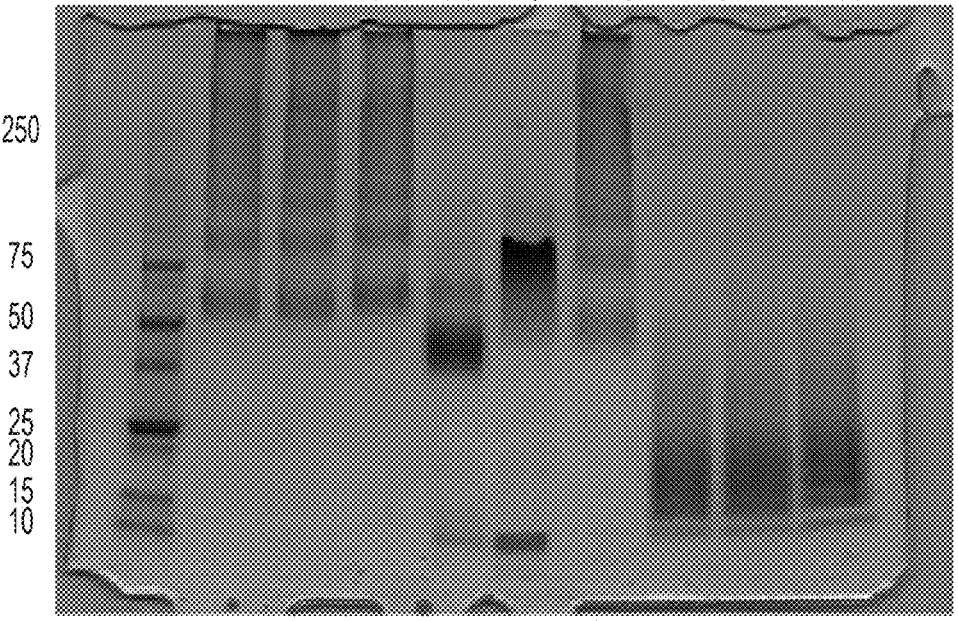
Figure 4B:
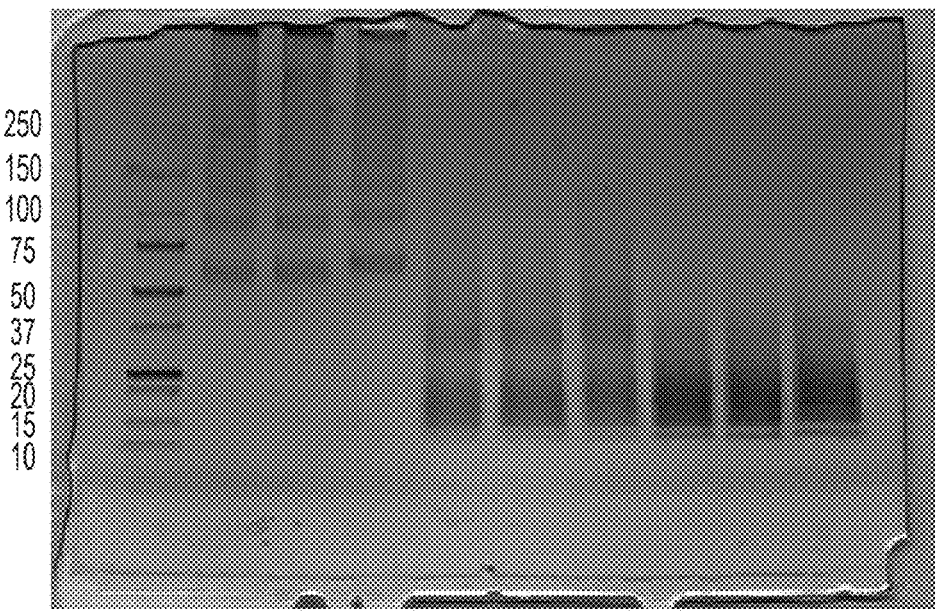
Figure 5A:
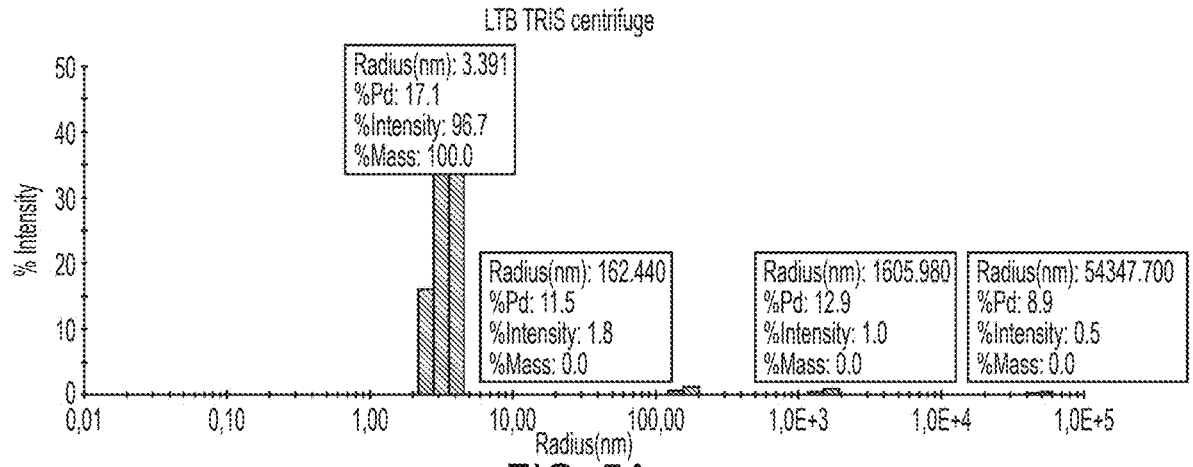
Figure 5B:
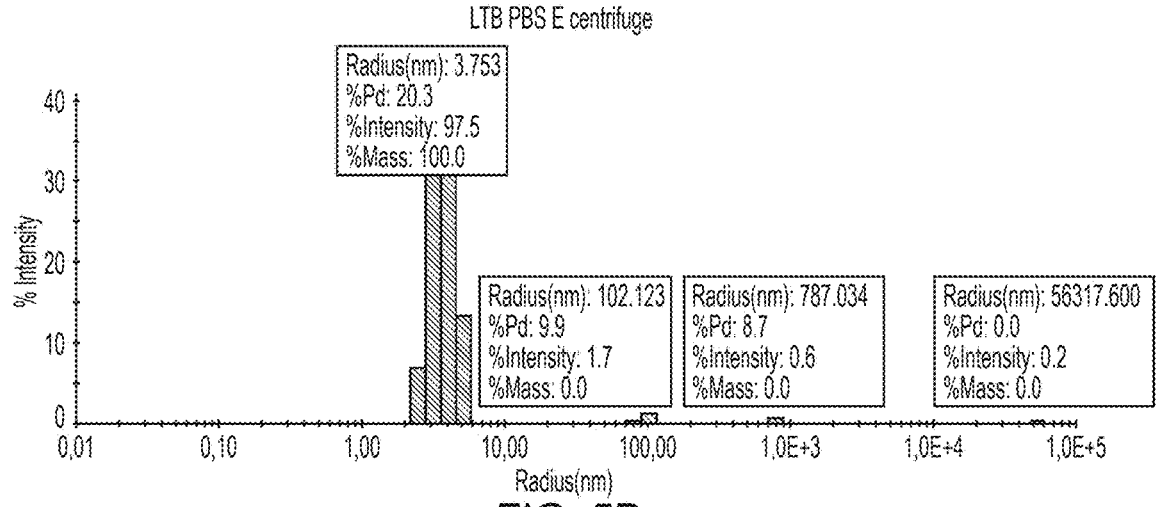
Figure 5C:
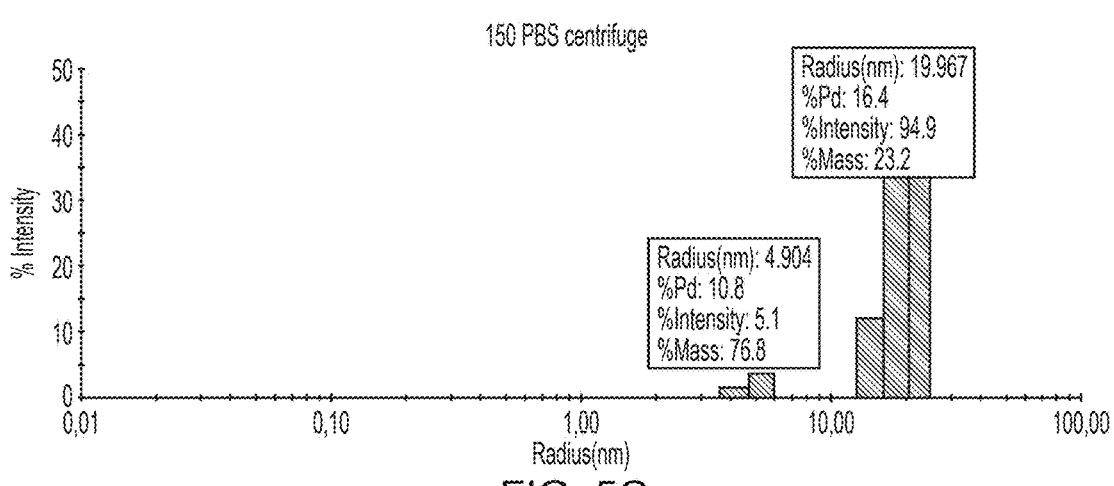
Figure 5D:
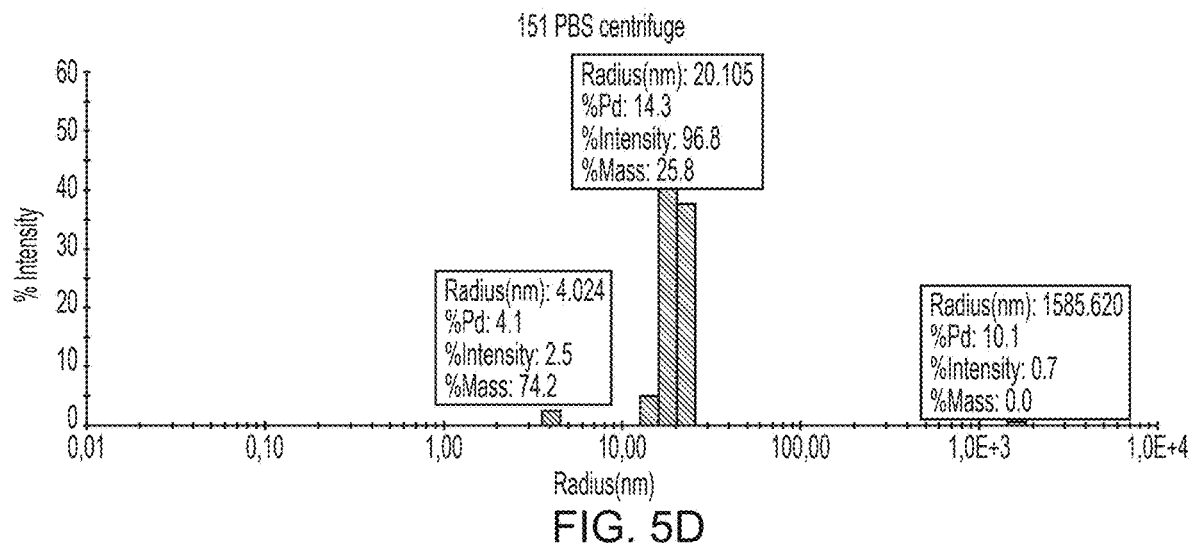
Figure 5E:
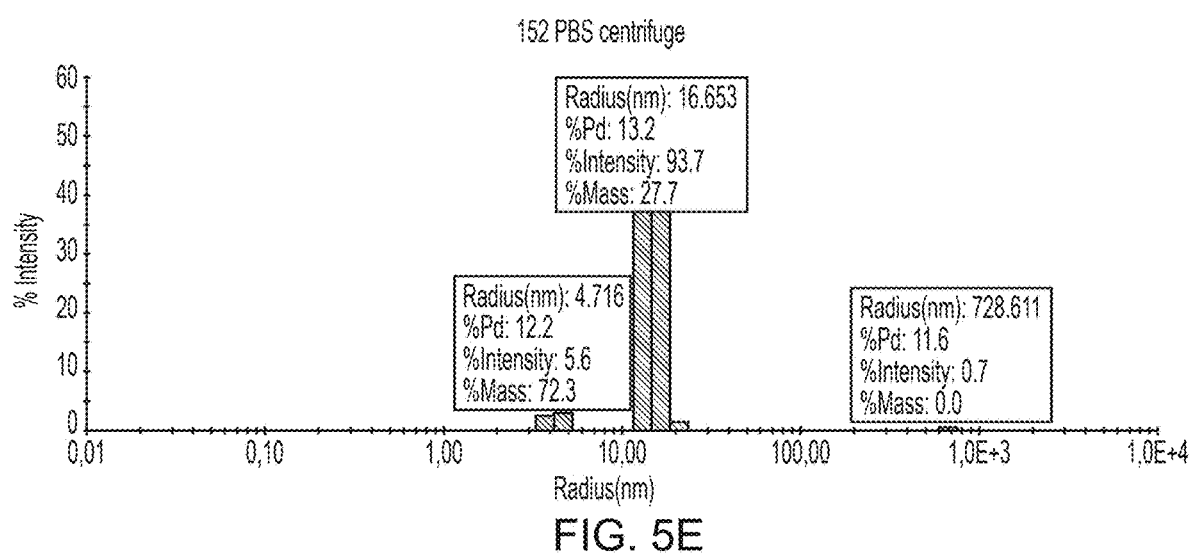

To $_{SAc}$LTB (1.5 mg, average 30 SAc/LTB) in PBSE (300 μL) was added $_{Mal}$A14T and $_{Mal-Ac}$L9KA14T (2.0 mg, 1.1 equiv per SAc) in PBSE (300 μL) followed by hydroxylamine hydrochloride (38 equiv per SAc, 60 μL of 0.5 M NH$_2$OH,HCl in 10× conjugation buffer). After being kept for 3 hours at room temperature under gentle magnetic stirring, the reaction mixture was submitted to intensive ultrafiltration (Amicon Ultra-15, 10 kD) in PBS until LC-MS analysis with UV detection at 280 nm indicated the absence of any remaining free peptide (FIG. 3). The peptide:carrier ratio was determined by amino acid analysis (AAA) (Table 5 and Table 6). SDS page analysis and Dynamic Light Scattering (DLS) analysis (FIGS. 4 and 5) indicated the presence of soluble aggregates (23-28%) in addition to monomeric conjugates.

TABLE 5

Data overview for the synthesis of LTB-peptide conjugates

| | $_{Mal}$Peptide (mg) | $_{SAc}$LTB (mg) | $_{SAc}$LTB* (nmole) | conjugate (mg) | conjugate** (nmole) | conjugate yield (%) | conjugate volume (mL) | concentration (mg/mL) | Peptide/LTB ratio mol/mol | mw conjugate average calculated (D) | peptide content in conjugate (%, w/w) |
|---|---|---|---|---|---|---|---|---|---|---|---|
| STh-LTB | 1.97 | 1.56 | 25 | 2.47 | 22 | 88 | 1.2 | 2.0 | 22 | 112226 | 40 |
| A14T-LTB | 1.84 | 1.46 | 23 | 2.2 | 20 | 87 | 1.3 | 1.7 | 21 | 110208 | 39.5 |
| $_{Ac}$L9KA14T-LTB | 1.9 | 1.46 | 23 | 1.88 | 17 | 74 | 1.2 | 1.6 | 20 | 108910 | 39.1 |

*average calculated MW fo 30 SATP/LTB: 62490

**determined from average calculated MW

STh-BSA Conjugate Via Thiol Maleimide Chemistry

STh-LTB was obtained by use of the protocol described for obtaining the LTB-peptide conjugates (see above).

TABLE 6

AAA data for LTB, $_{SAc}$LTB, LTB-peptide conjugates, BSA and STh-BSA conjugate.

| | Theo LTB | $_{SAc}$LTB | Theo STh | STh-LTB | Δ/AAs STh | Theo A14T | A14T-LTB | Δ/AAs A14T | Theo $_{Ac}$KT | $_{Ac}$KT-LTB | Δ/AAs $_{Ac}$KT | Theo BSA | BSA | STh-BSA | Δ/AAs STh |
|---|---|---|---|---|---|---|---|---|---|---|---|---|---|---|---|
| $CysSO_3H$ | | | | | | | | | | | | | | | |
| CMC | | | | | | | | | | | | | | | |
| Asx | 10 | 9.7 | 3 | 22.4 | 4.2 | 3 | 21.9 | 4.1 | 3.0 | 21.1 | 3.8 | 54 | 54.6 | 101.4 | 15.8 |
| $MetSO_2$ | | | | | | | | | | | | | | | |
| Thr | 11 | 9.2 | 1 | 12.8 | | 2 | 16.1 | | 2 | 15.8 | | 33 | 31.9 | 46.7 | |
| Ser | 9 | 6.5 | 2 | 12.2 | | 2 | 12.1 | | 2 | 11.9 | | 28 | 25.0 | 48.8 | |
| Glx | 13 | 13.3 | 1 | 18.3 | 4.5 | 1 | 16.3 | 4.6 | 1 | 18.1 | 4.4 | 79 | 81.8 | 95.3 | 13.5 |
| Gly | 3 | 3.2 | 1 | 7.7 | 4.5 | 1 | 7.3 | 4.1 | 1 | 7.2 | 4.0 | 16 | 16.4 | 32.8 | 16.4 |
| Ala | 6 | 6.7 | 1 | 11.1 | 4.3 | 0 | 7.0 | | 0 | 7.1 | | 47 | 46.6 | 63.1 | 16.5 |
| Cys * | 2 | | | | | | | | | | | 35 | | | |
| Val | 4 | 4.3 | | 4.1 | | | 4.3 | | | 4.4 | | 36 | 34.0 | 31.1 | |
| Met * | 4 | | | | | | | | | | | 4 | | | |
| Ile | 12 | 10.6 | | 10.6 | | | 10.8 | | | 10.8 | | 14 | 12.8 | 12.7 | |
| leu | 5 | 5.2 | 1 | 9.4 | 4.3 | 1 | 9.1 | 3.9 | 0 | 5.2 | | 61 | 61.3 | 77.9 | 16.6 |
| Nleu | | | | | | | | | | | | | | | |
| Tyr | 4 | 3.6 | 2 | 9.8 | | 2 | 8.7 | | 2 | 8.0 | | 20 | 19.5 | 45.6 | |
| Phe | 2 | 2 | | 2 | | | 2 | | | 2 | | 27 | 27 | 27 | |
| βala | | 0.8 | | 5.3 | 4.5 | | 5.0 | 4.2 | | 4.7 | 3.9 | 0 | 0.5 | 21.0 | 20.5 |
| Lys | 9 | 8.9 | | 8.9 | | | 9.1 | | 1 | 12.8 | 3.8 | 59 | 54.3 | 57.8 | |
| His | 1 | 0.9 | | 2.2 | | | 2.1 | | | 2.1 | | 17 | 16.0 | ND | |
| NH3 | | | | | | | | | | | | | | | |
| Arg | 4 | 3.8 | | 3.4 | | | 8.6 | | | 3.7 | | 23 | 23.8 | 23.8 | |
| Pro | 3 | 3.0 | 1 | 7.1 | | 1 | 6.7 | | 1 | 6.9 | | 28 | 27.7 | 47.7 | |
| Trp | 1 | | | | | | | | | | | 2 | | | |
| average/monomer LTB | | | | | 4.4 | | | 4.2 | | | 4.0 | | | | |
| average/LTB | | | | | 22 | | | 21 | | | 20 | | | | |
| average/BSA | | | | | | | | | | | | | | | 16.5 |

II. Peptide-LTB Conjugates by Means of the Copper(I)-Catalyzed Azide-Alkyne Cycloaddition (CuAAC) Chemistry STh Azido Derivative ($_{N3}$STh)

Chemically synthesized STh was dissolved at 2.0 mg/mL in 20 mM sodium phosphate buffer pH 7. The linker-equipped azido (NHS-PEG$_4$-N$_3$, 100 mg/mL in DMSO, 10 equiv) was added to the peptide solution. After stirring at room temperature for 75 min, semi-preparative RP-HPLC eluting with 20-40% linear gradient of MeCN in 0.08% aqueous TFA over 20 min at 6 mL/min flow rate, followed by freeze-drying of the suitable fractions, gave $_{N3}$STh peptide (56%).

ESI-MS: [M+H]$^+$ calculated for C$_{90}$H$_{131}$N$_{25}$O$_{35}$S$_6$: 2314.7642, found 2314.8552

Propargyl LTB (PrgLTB)

LTB (370 μg, 1.6 mg/mL in 50 mM TRIS, 200 mM NaCl, 1 mM EDTA, 3 mM NaN$_3$, pH 7.5) was submitted to PBS buffer exchange and concentrated to 5 mg/mL by ultrafiltration (Sartorius, Vivaspin 500, 10 kD MWCO). Propargyl-NHS (100 equiv mol/mol, 0.2 mg) in DMSO (5 μL) was added to the obtained LTB in PBS, and the reaction mixture was stirred at room temperature for 60 min, at which time more Propargyl-NHS (100 equiv) was added. LC-MS monitoring indicated that the propargyl/LTB ratio reached a plateau corresponding to a loading of 35-40 propargyl moiety per LTB. Excess reagent was removed by ultrafiltration as above using PBS buffer to reach a 5 mg/mL final concentration of the $_{Prg}$LTB solution in PBS.

STh-LTB conjugate via CuAAC-chemistry (protocol adapted from Prelosolski et al. *Current Protocols in Chemical Biology* 2011, 3, 153-162)

All solvents were Helium purged. To $_{Prg}$LTB (100 μg, 5 mg/mL in PBS, 20 μL) were added successively $_{N3}$STh (48 μL of a 2.5 mM solution in 9:1 H$_2$O/MeCN, 2 equiv per Propargyl moiety), CuSO$_4$/THPA (premix solution of 6 μL of 5 mg/mL CuSO$_4$ in water and 12 μL of 22 mg/mL THPA in water, 18 μL), aminoguanidine (11 mg/mL in water, 60 μL) and sodium ascorbate (20 mg/mL in water, 60 μL). The reaction mixture was stirred for 3 hours under an Argon atmosphere, and then submitted to intensive ultrafiltration in PBS. Total removal of the $_{N3}$STh peptide was confirmed by LC-MS analysis. A 28 average STh peptide per LTB was determined by amino acid analysis.

STh-LTB Conjugate: Obtained by Means of Glutaraldehyde Chemistry

The glutaraldehyde conjugation protocol is described in Lockwood D E, Robertson D C. Development of a competitive enzyme-linked immunosorbent assay (ELISA) for *Escherichia coli* heat-stable enterotoxin (STa). J Immunol Methods. 1984 Dec. 31; 75(2):295-307. PubMed PMID: 6520401.

Reference: 10:1 (STh-LTB), 30:1 (STh-LTB), 40:1 (STh-LTB). AAAs of 40:1 (STh-LTB) gave a 18 STh/LTB ratio but when controlled by LC-MC analysis, free and polymerized STh were found, leading to a non-reliable STh:LTB ratio. Not enough material for AAAs of the 2 others conjugates.

Figure 6A:
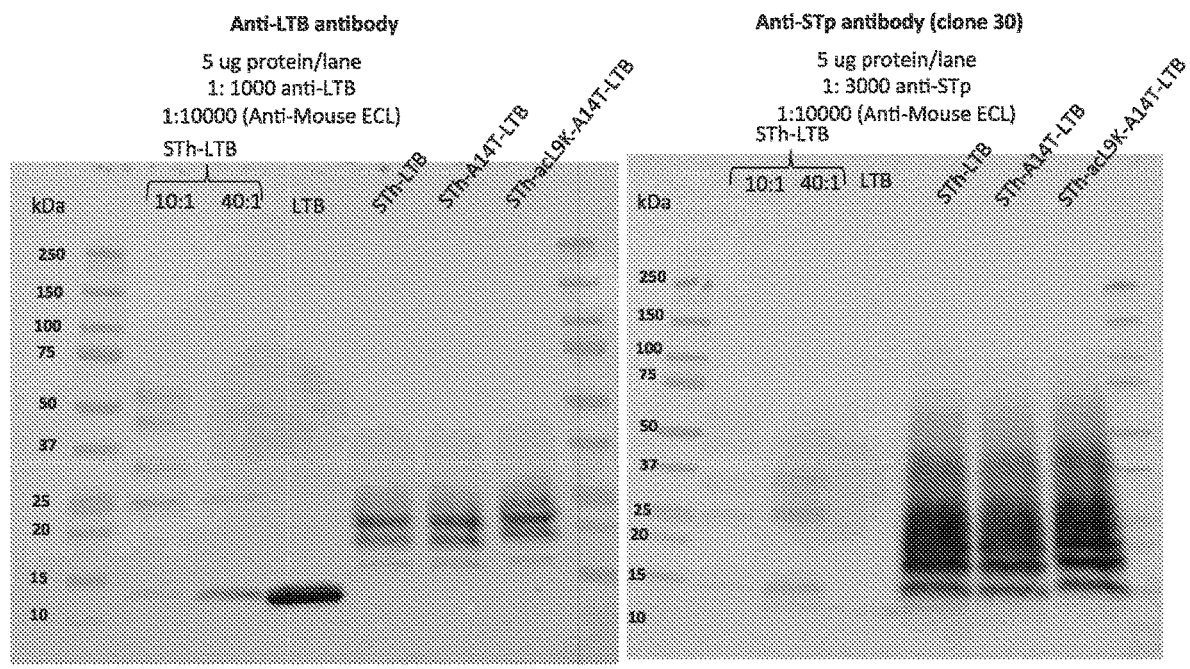
Figure 6B:
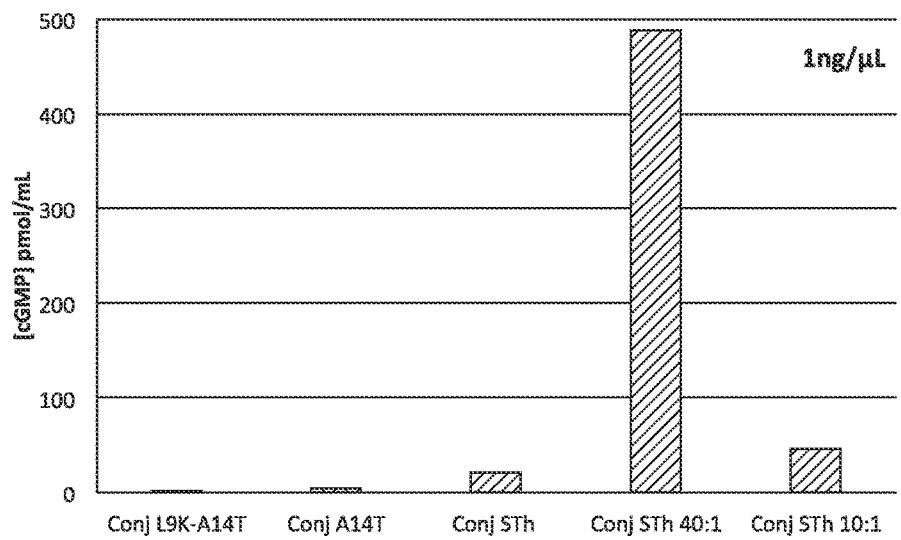

Thiol/maleimide conjugates displayed low/no toxicity (FIG. 6B). In contrast, the quite high toxicity observed for the 40:1 STh-LTB conjugate (bar 4) could be explained by the free STh present in the conjugate, as identified by LCMS analysis (FIG. 6).

These data are in favor of the importance of carefully established analytical controls all along the peptide and conjugate synthesis.

DISCUSSION

Peptide Synthesis

In the case of orthogonal chemical synthesis, topological isomers were generated during the formation of the second disulfide bridge, with a ratio (estimated by relative HPLC peak area) remaining stable until completion of the toxin and toxoid synthesis. The orthogonally synthesized version of native STh was structurally identical both with the synthetic peptide obtained by direct oxidative folding and the recombinant peptide as shown by the concordance of HPLC retention times and biological activity. In addition, the STh orthogonal synthesis, whatever the order of disulfide bridge formation, resulted in the isolation of an additional topological isomer (isomer C), which is not or only slightly formed by the other methods.

In the case of the orthogonal synthesis, the native (N) to topological (T) isomer ratio (N/T ratio) strongly depends on the order of cysteine bridge formation. Among the three of the six possible combinations tested for STh synthesis, the 7-15$_{Cys(Trt)}$/10-18$_{Cys(Acm)}$/6-11$_{Cys(Mob)}$ system gave the best N/T ratio.

Further improvements aimed to abrogate premature loss of Mob during TFA cleavage and optimize protecting group orthogonality. Thus, a Dmcp protective group was used for Asparagine in position 1, 2 and 12, and a Mmt protecting group was used for Cysteine at position 7 and 15 in place of Asn(Trt) and Cys(Trt), respectively. This allowed complete Asparagine side chain deprotection without loss of the Cysteine 6-11 Mob protecting groups. To our satisfaction, a 7.5% overall yield of STh was achieved, well above the 2.8% yield of the original synthesis.

RP-HPLC Isomer Correlation

The first indication that the isolated STh mutants fulfill both the expected cysteine pairing and STh native-structure similarity consisted in comparing the RP-HPLC behavior of the recombinant (rSTh) and chemically synthesized molecules. Retention times were compared and co-injections were performed when necessary. As first input, it was demonstrated that the major isomer of chemically synthesized STh (sSTh), whatever the chemical pathway (direct oxidative folding or controlled synthesis) co-eluted with recombinant STh (rSTh), which was previously shown to be identical to the native toxin isolated from ETEC cultures.

RP-HPLC comparison between recombinant and synthetic A14T, L9KA14T, L9GA14T and L9GA14K mutants was achieved accordingly. As rL9KA14T and rL9GA14K were not acetylated at their N-terminus whereas the corresponding chemically synthesized $_{Ac}$L9KA14T and $_{Ac}$L9GA14K mutants were, acetic anhydride was preliminary added to analytic samples of the lysine containing recombinant peptides before analysis in order to indirectly compare the retention properties of the products of N-acetylation to that of synthetic $_{Ac}$L9KA14T and $_{Ac}$L9GA14K, respectively. The major isomers of synthetic and recombinant A14T and $_{Ac}$L9KA14T were shown to co-elute using various elution conditions.

Figure 7:
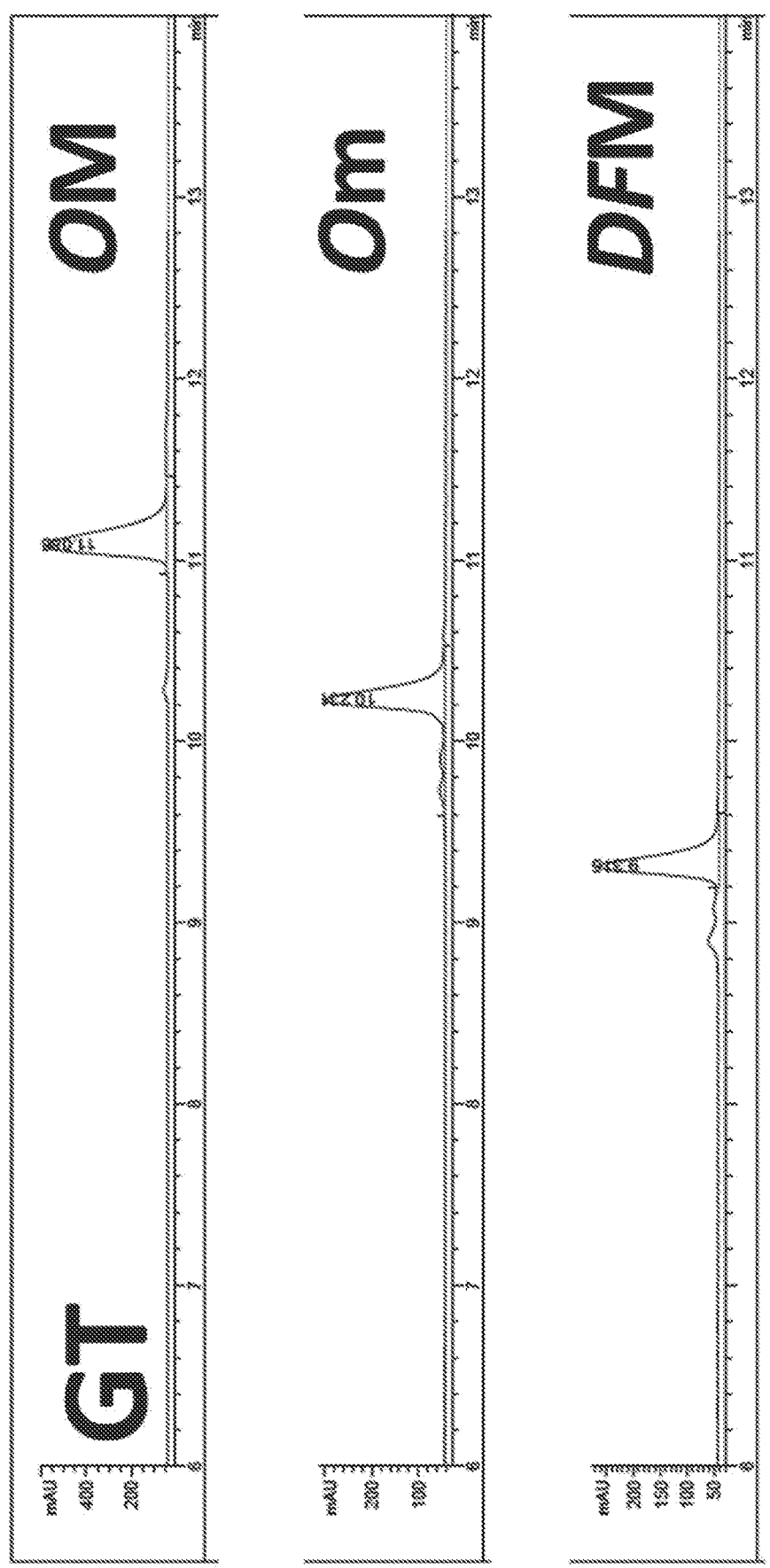
Figure 7:
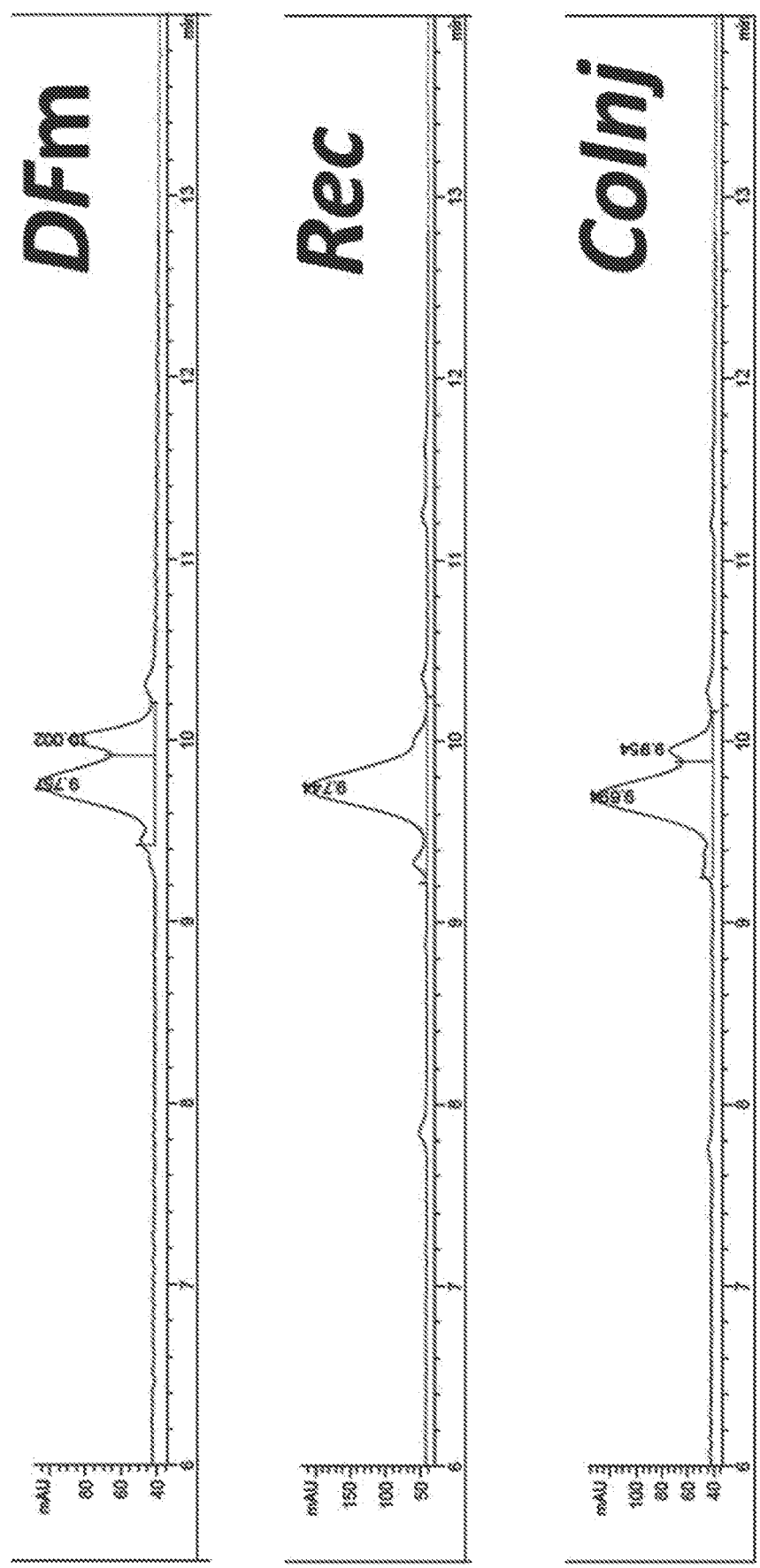
Figure 8:
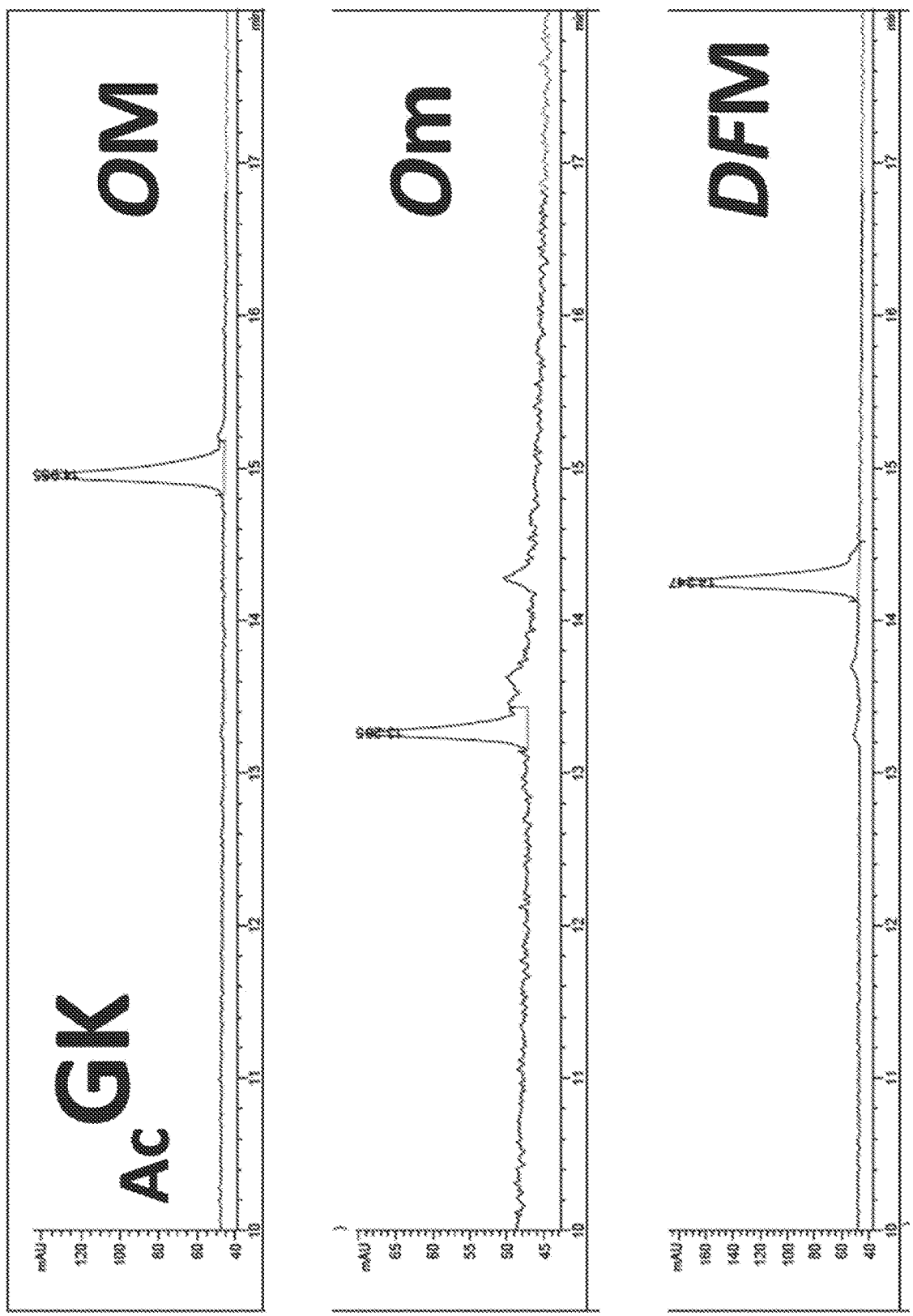
Figure 9:
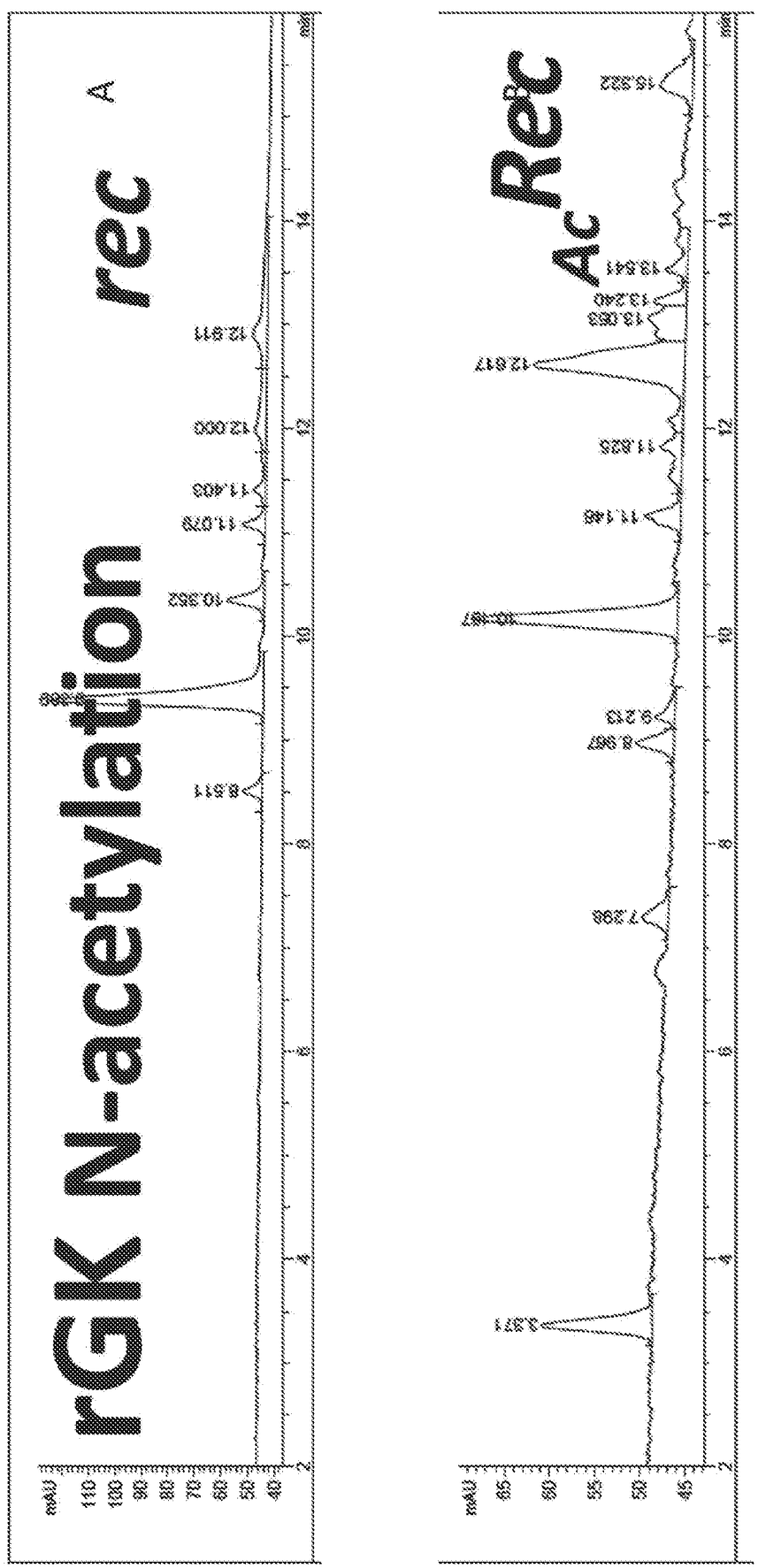
Figure 9:
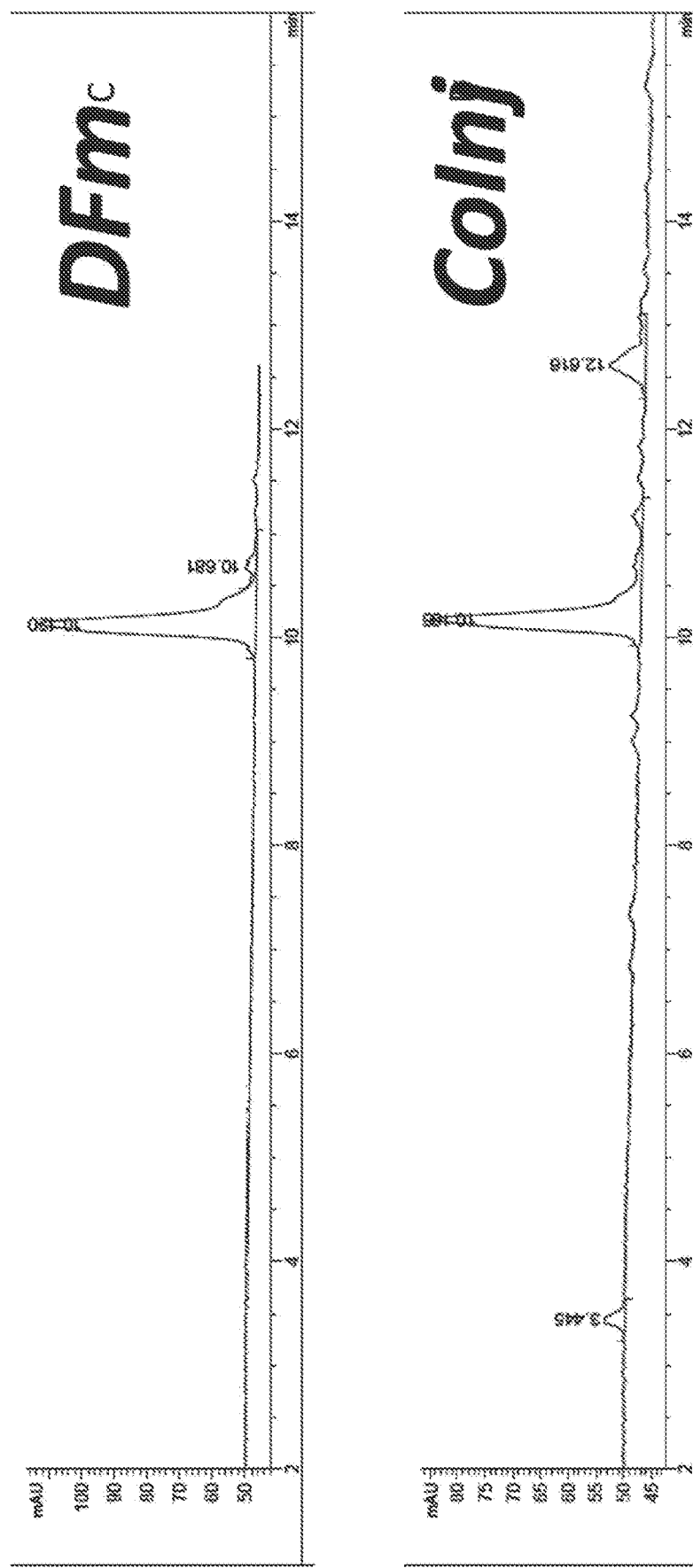

In contrast, divergent results were unexpectedly observed for the G9 mutated peptides. For both L9GA14T and $_{Ac}$L9GA14K, major rG9 isomers correlate with one of the minor isomers isolated after direct oxidative folding of the chemically synthesized MPLC-purified linear peptides. (See FIGS. 7-9 and the Figure legends) Unexpectedly, the two chemically synthesized isomers isolated following stepwise controlled chemical folding (orthogonal synthesis) did not match with any of the major isomers formed by the other processes, either recombinant preparation or direct oxidative folding chemical synthesis.

Although the major rL9GA14T isomers co-eluted with a minor isomer under RP-HPLC analytical conditions, providing strong support to chemical and folding identity, their antigenic properties differed. Whereas rL9GA14K and $_{Ac}$L9KA14T ortho were antigenic as indicated by competitive ELISA assay using anti-STa mlgG C30 and a rabbit anti-STh polyclonal serum, the chemically synthesized isomer B of $_{Ac}$L9GA14K, which co-eluted with one of the products of N-acetylation of rL9GA14K, although not pure based on RP-HPLC analysis, was obviously not recognized by those same antibodies, which were used for pre-selection of antigenic STh mimics. Similarly, available data show that isomer B of chemically synthesized L9GA14T, although not pure based RP-HPLC analysis, is not a good antigenic mimic of native STh.

In contrast, the major isomers of L9GA14T and $_{Ac}$L9GA14K isolated by orthogonal chemical synthesis retained to a large extent STh antigenic properties. A possible explanation for these observations is that antigenic mimicry resulted from the presence albeit in small proportion of isomer B in the batches of the recombinant double mutants, rL9GA14T and rL9GA14K, used for the competitive ELISA assay. This was indeed the case as shown by careful RP-HPLC comparison of the various preparations.

While RP-HPLC control may be an indicator of correct folding as for single mutant A14T and double mutant L9KA14T, this is not always the case as exemplified for double mutants encompassing a glycine residue at position 9 (L9GA14T and L9GA14K). Furthermore, in the absence of a well-defined controlled analytical reference, RP-HPLC analysis is misleading as exemplified for rL9GA14T and rL9GA14K. These original data demonstrate that in the absence of any structural information, STh-folding topology cannot be guaranteed for novel STh mutants prepared without stepwise control of correct cysteine pairing.

In the absence of any native reference and structural information, these original data support the fact that a controlled folding strategy, such as that provided by orthogonal chemical synthesis, should be implemented for the preparation of toxoids to guarantee their correct cysteine pairing. In addition, since this production strategy results in the formation of two topological isomers, ascertaining antigenic mimicry is required to identify which one of the two foldamers reflects the native STh scaffold. This can be achieved by use of ELISA assay using a suitable set of anti-STh and/or anti-STa monoclonal IgG antibodies.

Interestingly and unexpectedly, a minor antigenic activity was also found for isomer "C", a side-product isolated from the orthogonal synthesis of native STh. HPLC co-elution with the recombinant peptides was a second indicator in the case of single mutant A14T and double mutant L9KA14T but divergent isomers were observed for double mutant with a glycine in position 9 (L9GA14T and L9GA14K).

Example 2

Immunizations with ST Vaccine Candidates
Summary

Two conjugate immunogens, LTB-STh-A14T and LTB-STh-L9K/A14T, carrying chemically synthesized non-toxic STh mutant variants, were assessed for their abilities to elicit neutralizing antibodies in mice. In the first experiment, the two vaccine candidates were compared to the control immunogen LTB-STh carrying native STh. The experiment demonstrated that the LTB-STh-L9K/A14T can elicit antibodies that neutralize STh. This was confirmed in a follow-up immunization experiment, where only the two immunogens were compared. The LTB-STh-A14T immunogen, despite having a near identical hapten-carrier ratio to that of LTB-STh-L9K/A14T, seemed to consistently elicit lower anti-STh titers than LTB-STh-L9K/A14T, and with no discernible neutralizing activity. The most straightforward explanation for this is that the internal conjugation anchor provided by the introduced lysine residue in LTB-STh-L9K/A14T exposes STh in a more favorable manner than the N-terminal anchor used in the LTB-STh-A14T immunogen. In the second immunization experiment, the neutralizing sera were assessed for cross-reactivity towards uroguanylin and guanylin. No or low levels of unwanted cross-reactivity was observed.

Materials and Methods
Peptide Synthesis.

This is described in Example 1.

Chemical Conjugation.

Preparation and characterization are already described in Example 1. An overview of the immunogens used in this study is given in Table 2.1.

TABLE 2.1

Immunogens used in the study.

| Immunogen | Carrier | STh variant[a] | Chemistry | Hapten/carrier ratio[b] |
|---|---|---|---|---|
| LTB-STh | LTB | Native STh | Thiol-maleimide | ~20 |
| LTB-STh-A14T | LTB | STh-A14T | Thiol-maleimide | ~20 |
| LTB-STh-L9K/A14T | LTB | STh-$_{Ac}$L9K/A14T | Thiol-maleimide | ~20 |

[a]Ac-acetylated amino terminus (N-terminus);
[b]Number of haptens per LTB pentamer Mouse immunization experiment 1. C57BL/6 mice (female mice; 6 weeks of age) were immunized using doses of 10 µg conjugate for each immunogen (Table 2.1). dmLT was used as an adjuvant at 1 µg per mouse/injection. Injections were prepared in phosphate buffered saline (100 µl). The primary dose was administered on day 1 and booster doses were administered on day 21 and day 42. Mice were sacrificed on day 66 and sera collected. An overview of combinations of immunogens, adjuvants, and routes of immunization is given in Table 2.2.

TABLE 2.2

Groups of mice in immunization experiment 1.

| Mouse group | Immunogen | Adjuvant | Route[a] | Group size |
|---|---|---|---|---|
| STh/FCA | LTB-STh | Freund's complete | IP | 5 |
| STh/- | LTB-STh | — | SC | 5 |
| STh/dmLT | LTB-STh | dmLT | SC | 9 |
| A14T/dmLT | LTB-STh-A14T | dmLT | SC | 9 |
| L9K/A14T/dmLT | LTB-STh-L9K/A14T | dmLT | SC | 9 |

[a]Routes of immunization: IP, intraperitoneal; SC, subcutaneous

Mouse immunization experiment 2. C57BL/6 mice (female mice; 6 weeks old) were immunized using doses of 10 µg conjugate for each immunogen (Table 2.1) and 1 µg of dmLT as adjuvant in each injection, in a total volume of 100 µl per mouse/injection. The primary dose was administered on day 1 and booster doses were administered on day 21, day 42, and day 63. Mice were sacrificed on day 77 and sera collected. An overview of combinations of immunogens, adjuvants, and routes of immunization is given in Table 2.3.

TABLE 2.3

Groups of mice in immunization experiment 2.

| Mouse group | Immunogen | Adjuvant | Route[a] | Group size |
|---|---|---|---|---|
| A14T/dmLT | LTB-STh-A14T | dmLT | SC | 10 |
| L9K/A14T/dmLT | LTB-STh-L9K/A14T | dmLT | SC | 10 |

[a]Route of immunization: SC, subcutaneous

Estimation of antibody titers. Serum from each immunized mouse was titrated for anti-STh, anti-LTB, or anti-BSA-maleimide antibodies using ELISA plates coated with 40 ng STh peptide, 40 ng LTB, or 40 ng BSA-maleimide, respectively. Two-fold dilution series (see figure legends for details) of the sera were used in the assays, and the titers were defined as the last dilution in each series that had a signal-to-background ratio of ≥2.1. The ELISAs were conducted as follows. Nunc Immobilizer Amino Plates (Thermo Fisher Scientific, Waltham, UK) were coated overnight at 4° C. with the relevant coating peptide/protein in 100 µl PBS buffer. The wells were emptied and subsequently blocked by adding 180 µl 1% (w/v) ovalbumin (Sigma-Aldrich) in PBS-T (PBS, 0.05% Tween-20). All subsequent incubations were performed with gentle shaking for 60 min at room temperature, followed by three washes with PBS-T. Sera were diluted to the required concentration in PBS-T, and 120 µl was added to each well. Following incubation and washes, 100 µl 1:4,000 diluted alkaline phosphatase-conjugated rabbit anti-mouse IgG secondary antibody (Abcam, Cambridge, UK) was added. After incubation and washes, 100 µl substrate (250 mM diethanolamine, 0.5 mM $MgCl_2$, 0.5 mg/ml 4-nitrophenyl phosphate disodium salt, pH 9.8) was added, and the absorbance at 405 nm was measured within 30 min using a Hidex Sense microplate reader (Hidex, Turku, Finland).

Competitive ELISAs to determine immunological cross-reactions. Immunological cross-reactivity between anti-STh antibodies and STp, guanylin and uroguanylin, was assessed using competitive ELISA. The ELISAs were conducted as described for titer estimation, except that 4 ng STh native peptide coating was used, and that STp, guanylin, or uroguanylin peptide was added together with the serum in a total volume of 120 µl to allow for competition for binding to the STh peptide coating. In these assays 10 µM stocks of STh, STp, guanylin (Bachem, Bubendorf, Switzerland), or uroguanylin (Bachem) were diluted 3-fold 12 times, and 60 µl of each peptide dilution was added to the ELISA plate wells, immediately followed by 60 µl of antibody dilution. Antibody titrations were initially performed for each serum to identify optimal antibody dilutions for the competitive ELISAs. The mouse sera were diluted as follows: L9K/A14T/dmLT #1, 1:2700; #2, 1:2700; #3, 1:8100; and #6, 1:300 and the competition was performed for 2 h at room temperature with gentle shaking.

HEK-hGCC Neutralization Assay.

A stable cell line expressing human GC-C(HEK-hGCC) was generated in HEK293E cells following retroviral transduction and selection in puromycin. Cell lines were cultured in DMEM medium containing 10% fetal bovine serum (Thermo Fisher Scientific). Receptor expression was confirmed by western blotting and radioligand binding. This cell line was available in the laboratory and used for experiments described here. STh (10-8) molar was incubated with pre-immune sera or antisera (25 µl each sera) in a total volume of 200 µl of DMEM/10% fetal bovine serum for 2.5 h at 25° C. Following incubation, 100 µl of sample was applied to HEK-hGCC cells cultured to confluence in individual wells of a 48-well tissue culture plate, after removing spent medium on the cells. Following incubation for 30 min at 37° C., cells were lysed on 0.1N HCl and directly taken for cGMP estimation by radioimmunoassay, using a cGMP-specific antiserum and $^{125}$-labelled succinyl tyrosyl cGMP (Sigma) prepared in the laboratory.

T84 cell neutralization assay. The mouse sera were analyzed for their ability to neutralize STh. T84 cells (ATCC® CCL-248™; ATCC, Rockville, MD) were seeded and grown to confluence in Nunc 48-well plates (Thermo Fisher Scientific) containing Gibco™ Dulbecco's Modified Eagle Medium/Nutrient Mixture F-12 (DMEM/F-12, Thermo Fisher Scientific) supplemented with 10% fetal bovine serum (Sigma-Aldrich) and 0.2% gentamicin (LONZA, Basel, Switzerland). Cells were washed thrice with 200 µl DMEM/F-12 medium and pre-incubated with 100 µl DMEM/F12 containing 1 mM 3-isobutyl-1-methylxanthine (Sigma-Aldrich) for 10 min at 37° C. We pre-incubated 10 nM STh overnight at 4° C. with mouse sera 1:10 diluted in DMEM/F-12 medium (total volume 80 µl). The serum-peptide mix was added to each well with an equal volume of DMEM-F12 medium containing 1 mM IBMX and incubated for 30 min at 37° C., followed by aspiration of the medium and cell lysis by incubation with 400 µl 0.1 M HCl at room temperature for 20 min. The lysates were centrifuged at 16,000×g for 10 min and the cGMP levels were measured by using the Direct cGMP ELISA kit (Enzo Life Sciences, Inc, Farmingdale, NY).

Results and Discussion

Mouse Immunization Experiment 1.

Figure 10:
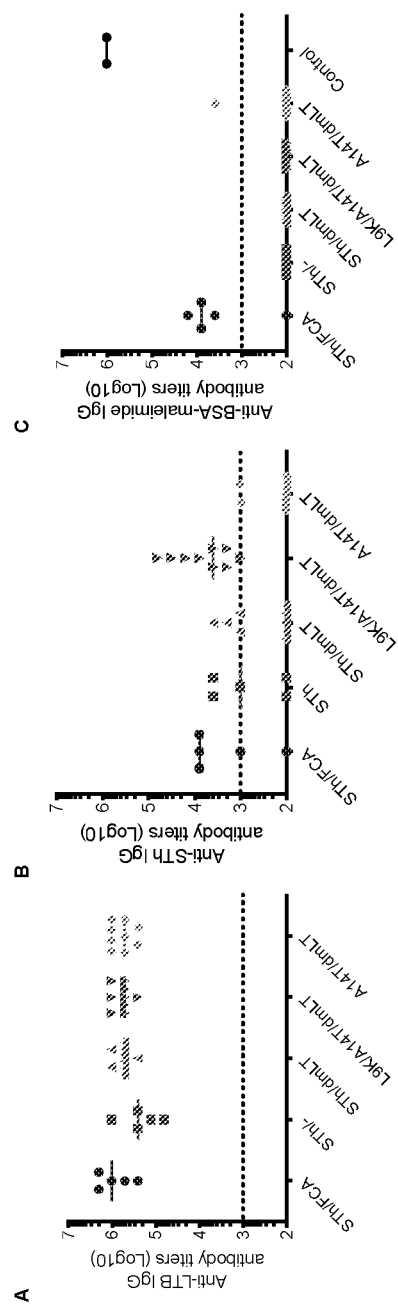

Antibody titers against STh, the carrier (LTB), and the chemical linker (maleimide) were estimated using ELISA (FIG. 10).

The anti-LTB titers show little-to-moderate intra-group variations in titers (FIG. 10A). The STh/FCA group had the highest median titer, the group with no adjuvant had the lowest median titer, and the dmLT groups had identical median titers. The anti-STh titers were more variable than the anti-LTB titers, both within and between groups (FIG. 10B). The STh/FCA group had the highest median titers, the L9K/A14T/dmLT group had the second highest, followed by the non-adjuvanted group. The STh/dmLT and A14T/dmLT groups had more sera with titers below the lowest tested dilution (1:1000) than above, which indicates that these two groups had the poorest immune responses. Anti-maleimide antibodies were only observed in 4 of 5 STh/FCA sera, and 1 of 9 L9K/A14T/dmLT sera (FIG. 10C). This suggests that the response to the linker may depend on the adjuvant used.

Figure 11:
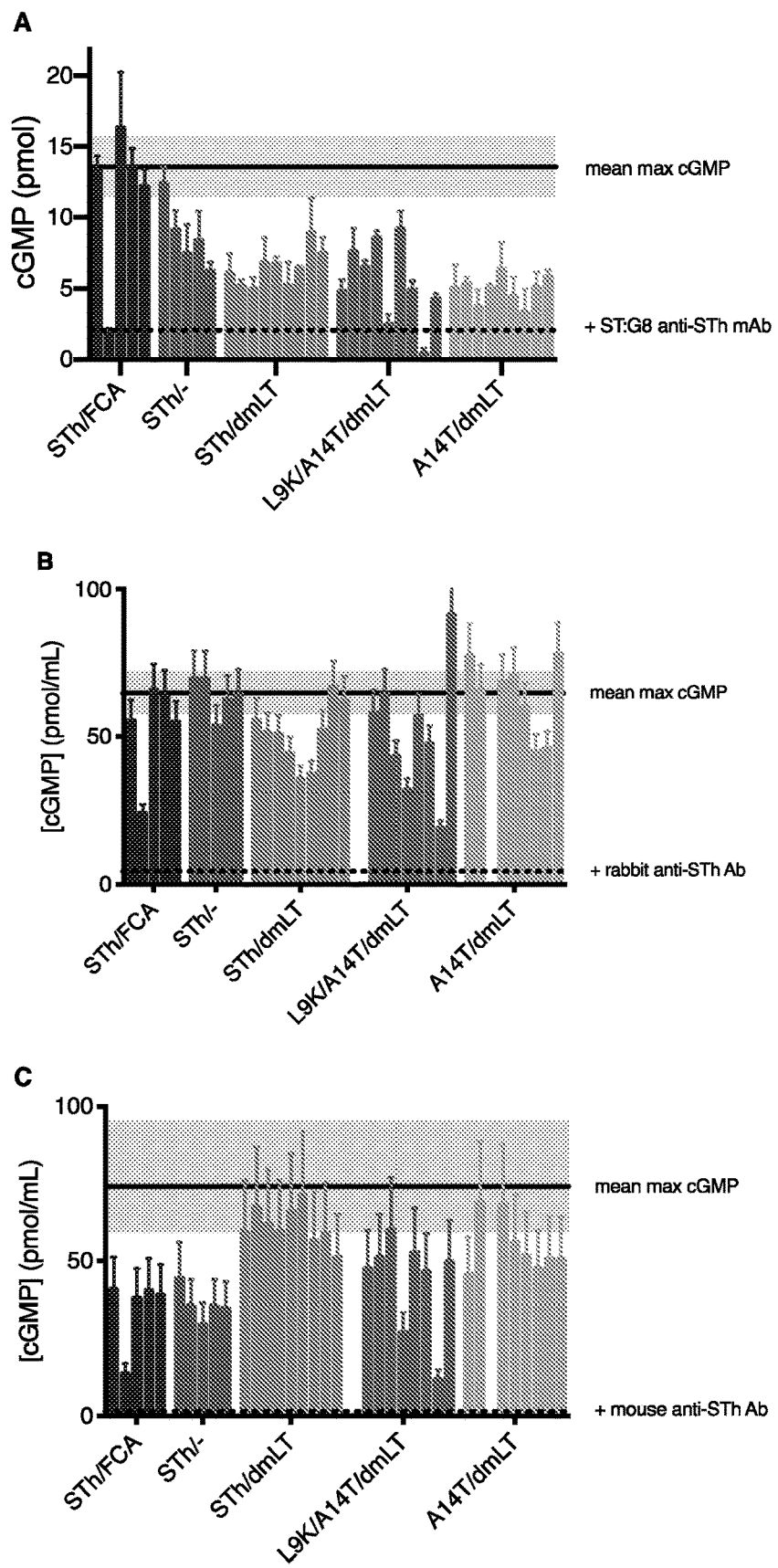

Only three sera showed consistent neutralizing activities in the HEK-hGCC and both T84 cell neutralization experiments (FIG. 11), namely the STh/FCA serum #2, L9K/A14T/dmLT serum #4, and L9K/A14T/dmLT serum #8. Interestingly, the two L9K/A14T/dmLT sera were the ones with the highest titers: $10^{4.5}$ and $10^{4.8}$, respectively. The STh/FCA serum #2 was among the three STh/FCA sera with the highest titer, namely $10^{3.9}$. The lack of reproducible neutralizing activities among the remaining 34 sera does not exclude the presence of (low levels of) neutralizing antibodies, but only 3 sera were reproducibly shown to have neutralizing activities.

These results demonstrate that the double mutant immunogen, LTB-STh-L9K/A14T, can elicit antibodies that neutralize native STh.

Mouse Immunization Experiment 2.

Figure 12:
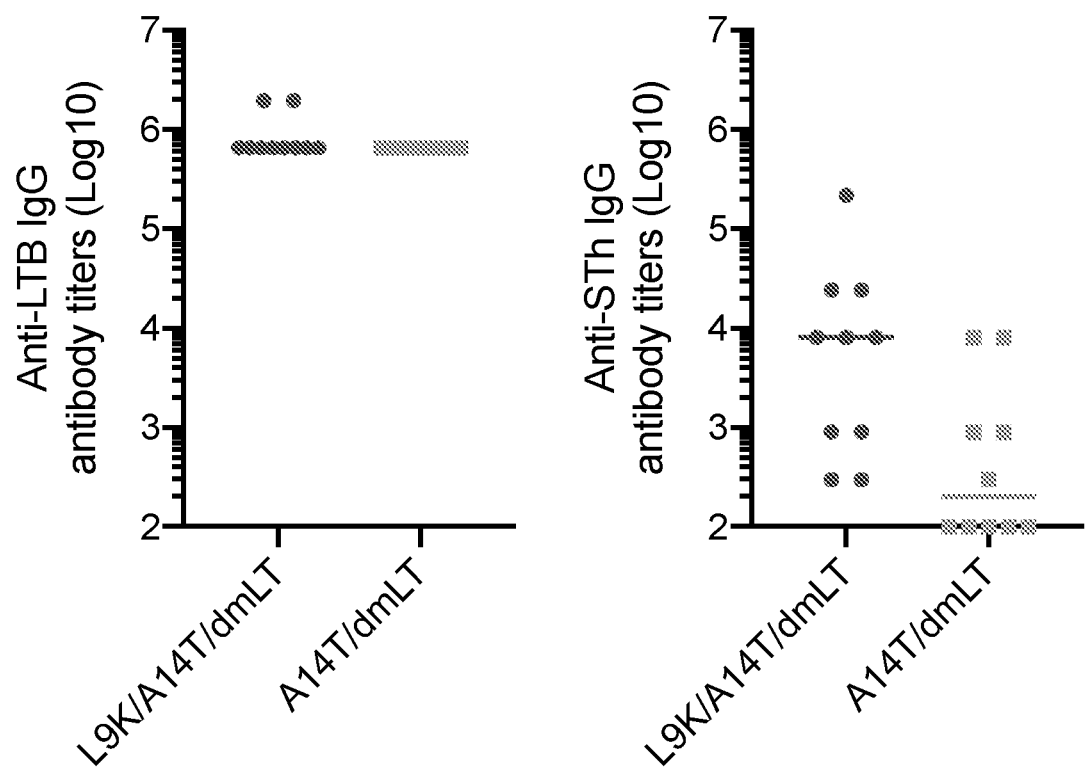

The second immunization experiment focused on two groups, namely A14T/dmLT and L9K/A14T/dmLT (Table 2.1). It was conducted as the first experiment, but with an additional booster dose. Antibody titers against STh and the carrier (LTB) were estimated using ELISA (FIG. 12).

In line with the results from the first immunization experiment (FIG. 10), the anti-LTB titers show little-to-moderate intra-group variations in titers (FIG. 12A), whereas both within and between group variations in anti-STh titers are substantial (FIG. 12B). As in immunization experiment 1, the highest anti-STh titers were observed in the L9K/A14T/dmLT group.

Figure 13:
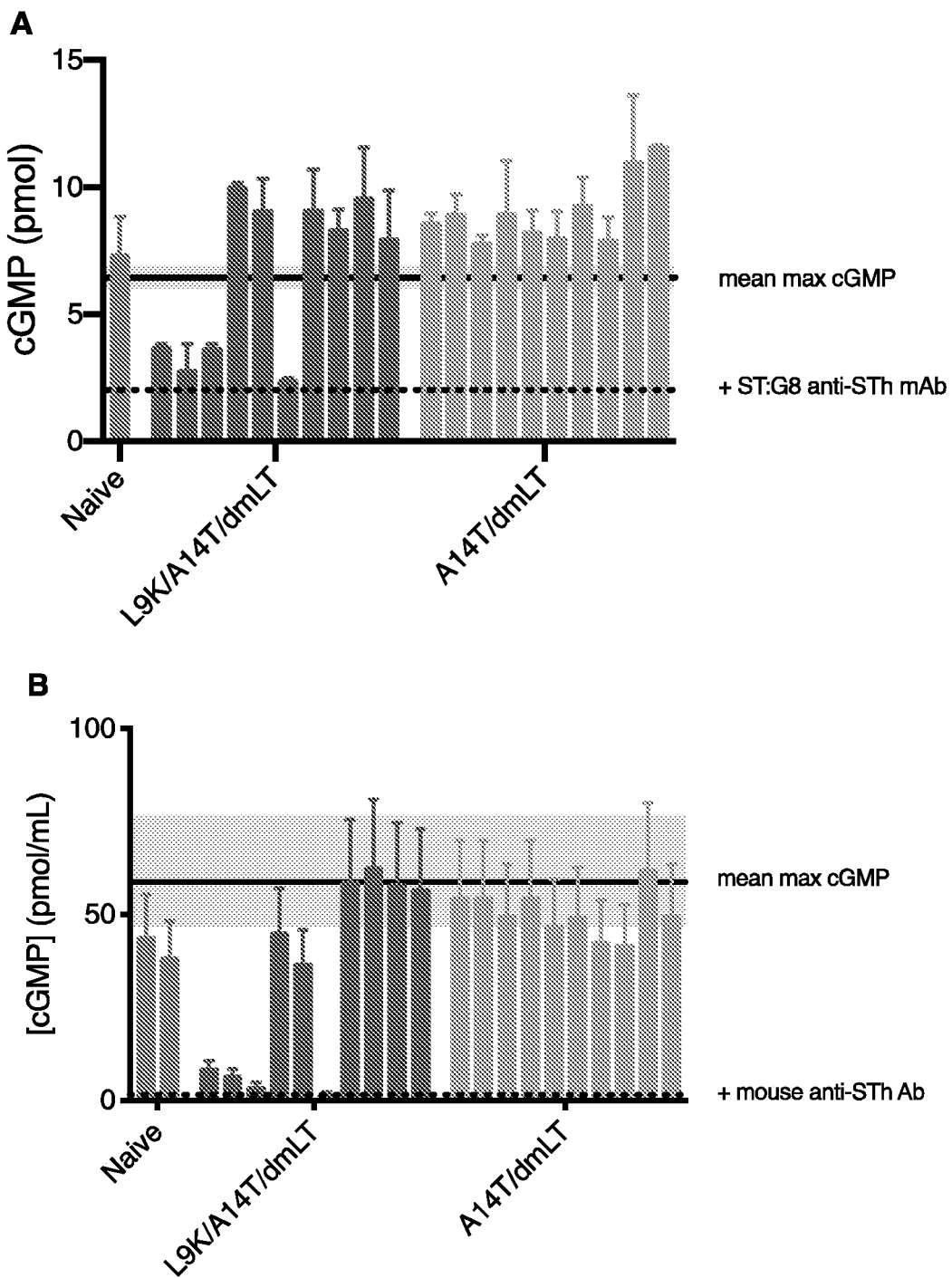

Four sera showed neutralizing activities in the HEK-hGCC and T84 cell neutralization experiments (FIG. 13), namely the L9K/A14T/dmLT sera #1, #2, #3, and #6. As in the first immunization experiment, the neutralizing sera were the ones with the highest titers: $10^{4.4}$, $10^{4.4}$, $10^{5.2}$, and $10^{3.9}$, respectively.

These results confirm that the double mutant immunogen, LTB-STh-L9K/A14T, can elicit antibodies that neutralize native STh.

Figure 14:
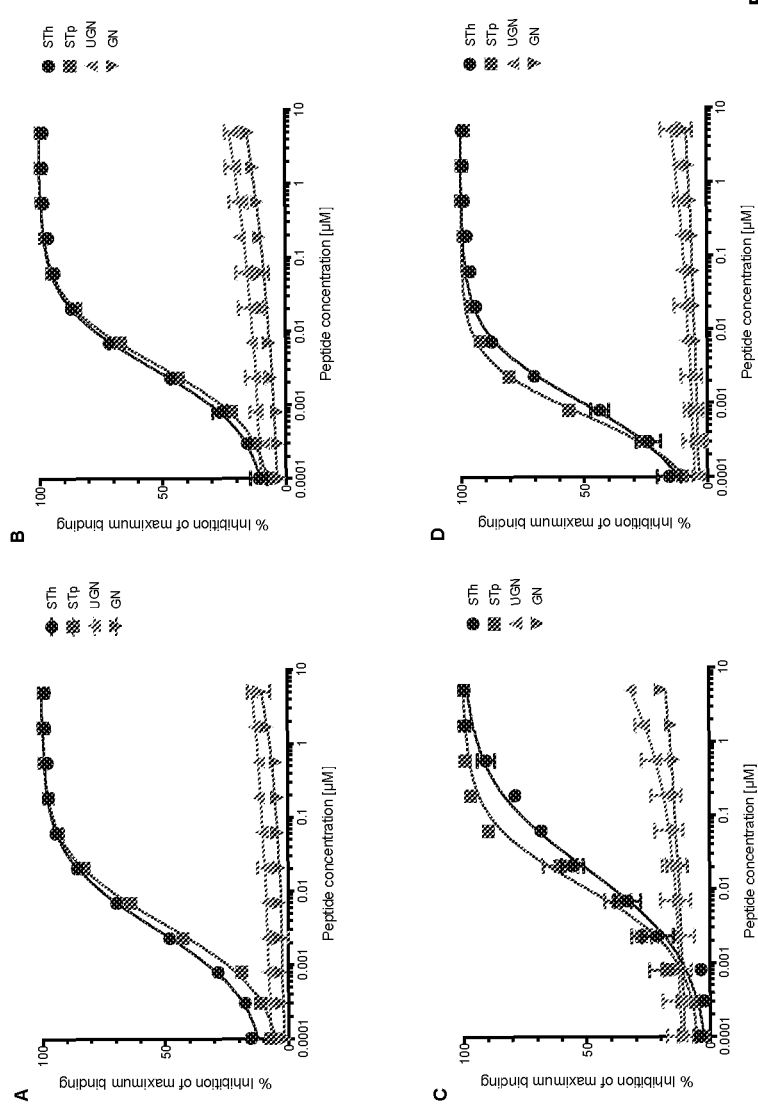

Immunological cross-reactivity of the four neutralizing L9K/A14T/dmLT sera was measured by using competitive ELISAs where all four GC-C receptor ligands were tested for their ability to compete for binding to immobilized STh (FIG. 14). All sera cross-reacted strongly with STp, as demonstrated by modest to no difference in affinities compared to STh. In contrast, little to no cross-reaction towards uroguanylin or guanylin was observed.

Conclusions

The two mouse immunization experiments demonstrated that the synthetic vaccine candidate LTB-STh-L9K/A14T can elicit antibodies that neutralize STh, with no or low levels of unwanted cross-reactivity. In contrast, the synthetic vaccine candidate LTB-STh-A14T and the control immunogen LTB-STh, despite having near identical hapten-carrier ratios to LTB-STh-L9K/A14T, seemed to elicit lower anti-STh titers with no discernible neutralizing activity.

The most straightforward explanation for this is that the internal conjugation anchor provided by the introduced lysine residue in LTB-STh-L9K/A14T exposes STh in a more favorable manner than the N-terminal anchor used in the LTB-STh-A14T immunogen. The conclusion is that LTB-STh-L9K/A14T is a very promising ST vaccine candidate.

Example 3

Immunizations with ST Vaccine Candidates

Summary

Two chemically synthesized STh toxoid-protein conjugate immunogens, LTB-STh-L9K/A14T and CRM-STh-L9K/A14T, carrying a non-toxic double mutant variant of STh N-ter acetylated, were assessed for their abilities to elicit neutralizing antibodies in mice. The experiment aimed at studying the influence of the carrier (LTB vs CRM197) and that of the dose (low vs high) on the immunogenicity of the non-toxic STh double mutant. CRM-STh-L9K/A14T (1:4 average CRM:peptide ratio) consistently elicited STh-neutralizing antibodies regardless of dose, with no or low levels of unwanted immunological cross-reactivity. In contrast, LTB-STh-L9K/A14T (1:15 average LTB:peptide ratio) elicited more variable anti-STh immune responses, where only sera with high titers had neutralizing activity. Higher doses of LTB-STh-L9K/A14T seemed to improve the elicitation of neutralizing antibodies. The conclusions are that the non-toxic STh-L9K/A14T peptide is a promising STh toxoid, that CRM197 conjugates may be superior to LTB conjugates at inducing a functional anti-STh response, and that CRM-STh-L9K/A14T, whereby the non-toxic STh-L9K/A14T peptide is linked by its internal K9 amino acid only to the carrier, is a very promising ST vaccine candidate.

Materials and Methods

Peptide Synthesis.

This is described in Example 1.

Chemical Conjugation.

Preparation and characterization of conjugates were performed as already described in Example 1. An overview of the immunogens used in this study is given in Table 2.1. Note that the LTB conjugates used in here (hapten-carrier ratio 15:1) is from a different batch that the ones used in the first two experiments (hapten-carrier ratio 20:1).

CRM-STh-L9K/A14T Conjugate

CRM (5 mg, 5.0 mg/mL in 100 mM NaCl, 20 Mm HEPES, 10% glycerol, pH 8.0 from Provepharm) was submitted to 100 mM sodium phosphate, 5 mM EDTA, pH 7.5 (NaPiE) buffer exchange and concentrated to 5 mg/mL by ultrafiltration (Amicon Ultra-15, 10 kDa). SATP (10 equiv., 200 µg) in DMSO (50 µL) was added to the protein solution, and the reaction mixture was stirred at rt (room temperature) for 90 min. The unreacted reagent was removed by ultrafiltration as above using NaPiE buffer.

Thioacetylated CRM ($_{SAc}$CRM, 3 mg, average 4-5 SAc/CRM) in NaPiE (600 µL) was added to $_{Mal,Ac}$STh-L9K/A14T (3.7 mg, 6.5 equiv per SAc) in NaPiE (400 µL) followed by hydroxylamine hydrochloride (50 equiv per SAc, 25 µL of 0.5 NH$_2$OH, HCl in 10× conjugation buffer). After being kept for 3.5 hours at room temperature under gentle magnetic stirring, the reaction mixture was submitted to intensive ultrafiltration (Amicon Ultra-15, 10 kDa) in PBS. The toxoid:CRM ratio (4:1) and conjugate concentration (4 mg/mL; 900 µL) were determined by amino acid analysis (AAA). The peptide content in conjugate (average calculated mw: 68,520 Da) represent 12% (w/w).

TABLE 3.1

Immunogens used in the study.

| Immunogen | Carrier | STh variant[a] | Chemistry | Hapten/carrier ratio |
|---|---|---|---|---|
| LTB-STh-L9K/A14T | LTB | STh-$_{Ac}$L9K/A14T | Thiol-maleimide | ~15[b] |
| CRM-STh-L9K/A14T | CRM197 | STh-$_{Ac}$L9K/A14T | Thiol-maleimide | ~4 |

[a]Ac-acetylated amino terminus;
[b]Number of haptens per LTB pentamer

Mouse immunization experiment 3. C57BL/6 mice (female mice; 6 weeks of age) were immunized with each of the two immunogens (Table 2.1) using two doses equivalent to 3 and 15 µg peptide (a 'low' dose and a 'high' dose). dmLT was used as an adjuvant at 1 µg per mouse/injection. Injections were prepared in 100 µl phosphate-buffered saline (PBS). The primary dose was administered on day 1 and booster doses were administered on day 21 and day 42. Mice were sacrificed on day 66 and sera collected. An overview of combinations of immunogens, adjuvants, and routes of immunization is given in Table 2.2.

TABLE 3.2

Groups of mice.

| Mouse group | Immunogen | Dose[a] | Adjuvant | Route[b] | Group size |
|---|---|---|---|---|---|
| LTB-3 | LTB-STh-L9K/A14T | 3 µg | dmLT | SC | 6 |
| LTB-15 | LTB-STh-L9K/A14T | 15 µg | dmLT | SC | 5 |
| CRM-3 | CRM-STh-L9K/A14T | 3 µg | dmLT | SC | 6 |
| CRM-15 | CRM-STh-L9K/A14T | 15 µg | dmLT | SC | 6 |

[a]Immunogen doses are given as ST peptide equivalents,
[b]Route of immunization: SC, subcutaneous Estimation of IgG antibody titers. Serum from each immunized mouse was titrated for anti-STh IgG titers using ELISA plates coated with 40 ng STh peptide. Two-fold dilution series (see figure legends for details) of the sera were used in the assays, and the titers were defined as the last dilution in each series that had a signal-to-background ratio of ≥2.1. The ELISAs were conducted as follows. Nunc Immobilizer Amino plates (Thermo Fisher Scientific, Waltham, UK) were coated with STh overnight at 4° C. in 100 µl PBS buffer. The wells were emptied and subsequently blocked by adding 180 µl 1% (w/v) ovalbumin (Sigma-Aldrich) in PBS-T buffer (PBS, 0.05% Tween-20). All subsequent incubations were performed with gentle shaking for 60 min at room temperature, followed by three washes with PBS-T. Sera were diluted to the required concentration in PBS-T, and 120 µl was added to each well. Following incubation and washes, 100 µl 1:4,000 diluted alkaline phosphatase-conjugated rabbit anti-mouse IgG secondary antibody (Abcam, Cambridge, UK) was added. After incubation and washes, 100 µl substrate (250 mM diethanolamine, 0.5 mM $MgCl_2$, 0.5 mg/ml 4-nitrophenyl phosphate disodium salt, pH 9.8) was added, and the absorbance at 405 nm was measured within 30 min using a Hidex Sense microplate reader (Hidex, Turku, Finland).

Statistical differences between groups were analyzed by multiple testing using ordinary one-way ANOVA and Tukey's multiple comparison test (GraphPad Prism8).

Competitive ELISAs to determine immunological cross-reactions. Immunological cross-reactivity between anti-STh antibodies and STp, guanylin and uroguanylin, was assessed using competitive ELISA. The ELISAs were conducted as described for titer estimation, except that 4 ng STh native peptide coating was used, and that STp, guanylin, or uroguanylin peptide was added together with the serum in a total volume of 120 µl to allow for competition for binding to the STh peptide coating. In these assays, we diluted 10 µM stocks of STh, STp, guanylin (Bachem, Bubendorf, Switzerland), or uroguanylin (Bachem) 3-fold 12 times, and 60 µl of each peptide dilution was added to the ELISA plate wells, immediately followed by 60 µl of antibody dilution. Antibody titrations were initially performed for each serum to identify optimal antibody dilutions for the competitive ELISAs. The competition was performed for 2 hours at room temperature with gentle shaking.

To estimate the cross-reacting fractions, we generated four-parameter log-logistic regression models in R (drc R package), using the following constraints: the bottom parameter was set to be shared by all peptides and have a minimum value of 0, and the top parameter was set to a maximum value of 100. Based on the fitted models, we calculated 90% inhibitory concentrations ($IC_{90}$) of each cognate peptide and used these concentrations to calculate the percent inhibition of binding for each of the noncognate peptides (Diaz Y, Govasli M L, Zegeye E D, Sommerfelt H, Steinsland H, Puntervoll P.; Infect Immun. 2019 Jun. 20; 87(7)). The estimated values were adjusted by subtracting the bottom parameter estimate. Cross-reacting fractions were then calculated by dividing the adjusted percent inhibition value of a given peptide by the corresponding inhibition values for the cognate ST peptide.

T84 cell neutralization assay. The mouse sera were analyzed for their ability to neutralize STh. T84 cells (ATCC® CCL-248™; ATCC, Rockville, MD) were seeded and grown to confluence in Nunc 48-well plates (Thermo Fisher Scientific) containing Gibco™ Dulbecco's Modified Eagle Medium/Nutrient Mixture F-12 (DMEM/F-12, Thermo Fisher Scientific) supplemented with 10% fetal bovine serum (Sigma-Aldrich) and 0.2% gentamicin (LONZA, Basel, Switzerland). Cells were washed thrice with 200 µl DMEM/F-12 medium and pre-incubated with 100 µl DMEM/F12 containing 1 mM 3-isobutyl-1-methylxanthine (Sigma-Aldrich) for 10 min at 37° C. We pre-incubated 10 nM STh overnight at 4° C. with mouse sera 1:10 diluted in DMEM/F-12 medium (total volume 80 µl). The serum-peptide mix was added to each well with an equal volume of DMEM-F12 medium containing 1 mM IBMX and incubated for 30 min at 37° C., followed by aspiration of the medium and cell lysis by incubation with 400 µl 0.1 M HCl at room temperature for 20 min. The lysates were centrifuged at 16,000×g for 10 min and the cGMP levels were measured by using the Direct cGMP ELISA kit (Enzo Life Sciences, Inc, Farmingdale, NY).

Results and Discussion

Mouse Immunization Experiment 3

Figure 15:
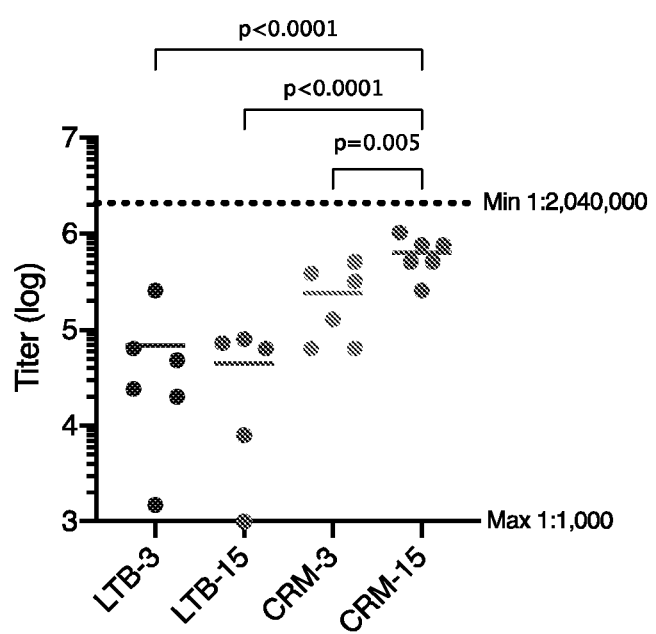

Antibody titers against STh were estimated using ELISA (FIG. 15).

The anti-STh titers of the LTB-conjugate groups had the lowest median titers and had the highest inter-individual variation within each group (FIG. 15). The observed variability, with individual mice apparently not developing an immune response, was also observed in the two previous immunization experiments (1 and 2) with LTB-STh-L9K/A14T conjugates. There did not seem to be a pronounced impact of higher dose (15 µg) on the immunogenicity of the LTB-STh-L9K/A14T conjugates. The anti-STh titers of the CRM-conjugate groups had higher median titers with less within-group variation than the LTB-conjugate groups. Also, the high-dose CRM-15 group had higher titers than the low-dose CRM-3 group. These results suggest that CRM197 is a more suitable carrier for the STh double mutant than LTB.

All 12 CRM197-conjugate group sera were able to neutralize native STh in the T84 cell assay, whereas 3 of 6 sera in the LTB-3 group and 4 of 5 sera in LTB-15 group showed neutralizing activity (FIG. 16). The sera that did not neutralize STh were among those with the lowest anti-STh titers. These results confirm that the double mutant immunogen, LTB-STh-L9K/A14T, can elicit antibodies that neutralize native STh, provided that the titers are high enough, and demonstrate that with a carrier, such as CRM197, it is possible to get consistent neutralizing immune responses to the non-toxic STh double mutant.

The immunological cross-reactivity of all sera, except LTB-15 serum #2, was measured using competitive ELISAs where all four GC-C receptor ligands were tested for their ability to compete with the immobilized STh for binding to the antibodies (FIG. 14). All sera cross-reacted strongly with STp but showed little to no cross-reaction towards uroguanylin or guanylin.

Conclusions

This mouse immunization experiment demonstrated that the vaccine candidate CRM-STh-L9K/A14T consistently elicited STh-neutralizing antibodies, at two different doses, with no or low levels of unwanted cross-reactivity.

The vaccine candidate LTB-STh-L9K/A14T elicited more variable anti-STh immune responses, when administered at similar peptide equivalent doses, where only sera with high titers had neutralizing activity. Higher doses of LTB-STh-L9K/A14T seemed to improve the elicitation of neutralizing antibodies.

The conclusions are that CRM197 conjugates may be superior to LTB conjugates at inducing a functional anti-STh response, and that CRM-STh-L9K/A14T is a very promising ST vaccine candidate.

All publications mentioned in the above specification are herein incorporated by reference. Various modifications and variations of the described methods and system of the present invention will be apparent to those skilled in the art without departing from the scope and spirit of the present invention. Although the present invention has been described in connection with specific preferred embodiments, it should be understood that the invention as claimed should not be unduly limited to such specific embodiments. Indeed, various modifications of the described modes for carrying out the invention which are obvious to those skilled in biochemistry and biotechnology or related fields are intended to be within the scope of the following claims.

SEQUENCE LISTING

```
    SEQ ID NO: 1 (STh wild-type sequence):
    NSSNYCCELCCNPACTGCY
```

ST mutants of SEQ ID NO: 1 may comprise the mutation L9K.

ST mutants of SEQ ID NO: 1 may comprise two mutations wherein the first mutation is selected from L9K, L9N, L9T, L9S, L9A and L9G and the second mutation is A14T.

ST mutants of SEQ ID NO: 1 may comprises a mutation at position L9 in combination with a mutation at position A14.

ST mutants of SEQ ID NO: 1 may comprise a mutation at position L9 in combination with the mutation A14T.

ST mutants of SEQ ID NO: 1 may comprise the mutation L9K in combination with the mutation A14T.

ST mutants of SEQ ID NO: 1 may comprise the mutation at position L9 in combination with the mutation A14K.

ST mutants of SEQ ID NO: 1 may comprise the mutation L9G in combination with the mutation A14K.

```
    SEQ ID NO: 2 (STp wild-type sequence):
    NTFYCCELCCNPACAGCY
```

ST mutants of SEQ ID NO: 2 may comprise the mutation L8K.

ST mutants of SEQ ID NO: 2 may comprise two mutations wherein the first mutation is selected from L8K, L8N, L8T, L8S, L8A and L8G and the second mutation is A13T.

ST mutants of SEQ ID NO: 2 may comprises a mutation at position L8 in combination with a mutation at position A13.

ST mutants of SEQ ID NO: 2 may comprise a mutation at position L8 in combination with the mutation A13T.

ST mutants of SEQ ID NO: 2 may comprise the mutation L8K in combination with the mutation A13T.

ST mutants of SEQ ID NO: 2 may comprise the mutation at position L8 in combination with the mutation A13K.

ST mutants of SEQ ID NO: 2 may comprise the mutation L8G in combination with the mutation A13K.

Summary Paragraphs

1. A mutant of an *E. coli* heat-stable toxin (ST) having the following wild-type sequence:

```
                                           (SEQ ID NO: 1)
    NSSNYCCELCCNPACTGCY
``` wherein the mutant comprises at least two mutations wherein the first mutation is selected from L9K, L9N and L9T and the second mutation is A14T.

2. The mutant according to paragraph 1 wherein the mutant has the following mutations: L9K and A14T.
3. The mutant according to paragraph 1 wherein the mutant has the following mutations: L9N and A14T.
4. The mutant according to paragraph 1 wherein the mutant has the following mutations: L9T and A14T.
5. A mutant of an *E. coli* heat-stable toxin (ST) having the following sequence:

```
                                           (SEQ ID NO: 5)
    NSSNYCCEKCCNPTCTGCY; or (SEQ ID NO: 6)
    NSSNYCCENCCNPTCTGCY; or (SEQ ID NO: 7)
    NSSNYCCETCCNPTCTGCY
```

6. A mutant of an *E. coli* heat-stable toxin (ST) having the following wild-type sequence:

```
                                           (SEQ ID NO: 1)
    NSSNYCCELCCNPACTGCY
``` wherein the mutant comprises the mutation L9K.

7. A mutant of an *E. coli* heat-stable toxin (ST) having the following wild-type sequence:

```
                                           (SEQ ID NO: 2)
    NTFYCCELCCNPACAGCY
``` wherein the mutant comprises at least two mutations wherein the first mutation is selected from L8K, L8N and L8T and the second mutation is A13T.

8. The mutant according to paragraph 7 wherein the mutant has the following mutations: L8K and A13T.
9. The mutant according to paragraph 7 wherein the mutant has the following mutations: L8N and A13T.
10. The mutant according to paragraph 7 wherein the mutant has the following mutations: L8T and A13T.
11. A mutant of an *E. coli* heat-stable toxin (ST) having the following sequence:

```
                                          (SEQ ID NO: 11)
    NTFYCCEKCCNPTCAGCY; or (SEQ ID NO: 12)
    NTFYCCENCCNPTCAGCY; or (SEQ ID NO: 13)
    NTFYCCETCCNPTCAGCY.
```

12. A mutant of an *E. coli* heat-stable toxin (ST) having the following wild-type sequence:

NTFYCCELCCNPACAGCY (SEQ ID NO: 2)

wherein the mutant comprises L8K.

13. A method for producing the mutant of an *E. coli* heat-stable toxin (ST) according to any one of paragraphs 1 to 6 wherein the method comprises synthesizing the polypeptide sequence of the mutant using Fluoromethoxycarbonyl amino acids (Fmoc-AAs) wherein the Fmoc-AAs are side-protected using tert-butyl (tBu) for E, S, T, and Y; Trt or Dmcp for N; tert-butoxycarbonyl (Boc) for K; and wherein the cysteines (Cs) are sequentially orthogonally side-protected by the introduction of Fmoc-Cys(Trt)-OH at positions 7 and 15, Fmoc-Cys(Acm)-OH at positions 10 and 18, and Fmoc-Cys(Mob)-OH at positions 6 and 11.

14. A method for producing the mutant of an *E. coli* heat-stable toxin (ST) according to any one of paragraphs 7 to 12 wherein the method comprises synthesizing the polypeptide sequence of the mutant using Fluoromethoxycarbonyl amino acids (Fmoc-AAs) wherein the Fmoc-AAs are side-protected using tert-butyl (tBu) for E, S, T, and Y; Trt or Dmcp for N; tert-butoxycarbonyl (Boc) for K; and wherein the cysteines (Cs) are sequentially orthogonally side-protected by the introduction of Fmoc-Cys(Trt)-OH at positions 6 and 14, Fmoc-Cys(Acm)-OH at positions 9 and 17, and Fmoc-Cys(Mob)-OH at positions 5 and 10.

15. A mutant of an *E. coli* heat-stable toxin (ST) produced by the method according to paragraph 13 or 14.

16. The mutant according to any one of paragraphs 1 to 12 or 15 wherein the mutant is coupled to a carrier.

17. The mutant according to paragraph 16 wherein said carrier is LT-B or CRM197.

18. The mutant according to any one of paragraphs 1 to 12 or 15 wherein the mutant is acetylated at its N-terminus.

19. The mutant according to any one of paragraphs 1 to 12 15 or 16 wherein at least one carrier is coupled to the mutant.

20. The mutant according to paragraph 19 wherein said carrier is LT-B or CRM197.

21. The mutant according to any one of paragraphs 1 to 12, 15, 19 or 20 wherein a carrier is coupled to the mutant at an internal amino acid (such as the amino acid at position 9 for mutants of the wild-type sequence

NSSNYCCELCCNPACTGCY (SEQ ID NO: 1)

or the amino acid at position 8 for mutants of the wild-type sequence

NTFYCCELCCNPACAGCY) (SEQ ID NO: 2)

and/or wherein a carrier is coupled to the mutant at the N-terminus.

22. The mutant according to any one of paragraphs 1 to 12, 15 or 19 to 21 wherein the mutant is acetylated at its N-terminus.

23. The mutant according to any one of paragraphs 1 to 12 or 15 to 22 wherein the mutant is folded by site-selective cysteine pairing.

24. The mutant according to paragraphs 23 wherein site-selective cysteine pairing occurs in the order: positions 7 and 15, positions 10 and 18, and lastly positions 6 and 11 for mutants of the wild-type sequence

NSSNYCCELCCNPACTGCY; (SEQ ID NO: 1)

in the order: positions 6 and 14, positions 9 and 17, and lastly positions 5 and 10 for mutants of the wild-type sequence

NTFYCCELCCNPACAGCY; (SEQ ID NO: 2)

in the order: positions 7 and 15, positions 10 and 18, and lastly positions 6 and 11 for mutants of an *E. coli* heat-stable toxin (ST) having the following sequence:

NSSNYCCEKCCNPTCTGCY, or (SEQ ID NO: 5)

NSSNYCCENCCNPTCTGCY, or (SEQ ID NO: 6)

NSSNYCCETCCNPTCTGCY; (SEQ ID NO: 7)

or in the order: positions 6 and 14, positions 9 and 17, and lastly positions 5 and 10 for mutants of an *E. coli* heat-stable toxin (ST) having the following sequence:

NTFYCCEKCCNPTCAGCY, or (SEQ ID NO: 11)

NTFYCCENCCNPTCAGCY, or (SEQ ID NO: 12)

NTFYCCETCCNPTCAGCY. (SEQ ID NO: 13)

25. An isolated nucleic acid that encodes a mutant according to any of paragraphs 1 to 12 or 15 to 24.

26. A vector comprising the nucleic acid according to paragraph 25.

27. A host cell comprising the vector according to paragraph 26.

28. An antibody that is immunospecific for a mutant of an *E. coli* heat-stable toxin according to any one of paragraphs 1 to 12 and 15 to 24.

29. A vaccine composition comprising the mutant according to any one of paragraphs 1 to 12 and 15 to 24, a nucleic acid according to paragraph 25, or a vector according to paragraph 26 and a pharmaceutically acceptable carrier or excipient.

30. A mutant according to any one of paragraphs 1 to 12 and 15 to 24, a nucleic acid according to paragraph 25, a vector according to paragraph 26 for use in treating or preventing *E. coli* infection.

31. A method for treating or preventing *E. coli* infection comprising administering a mutant according to any one of paragraphs 1 to 12 and 15 to 24, a nucleic acid according to paragraph 25, or a vector according to paragraph 26 to a patient in need of the same.

32. The method according to claim 31 wherein the patient is a human.

The invention claimed is:

1. A mutant of an *E. coli* heat-stable toxin (ST) having the following wild-type sequence:

NSSNYCCELCCNPACTGCY (SEQ ID NO: 1)

wherein the mutant has two mutations wherein the first mutation is L9K and the second mutation is A14T.

2. A method for producing the mutant of an *E. coli* heat-stable toxin (ST) according to claim 1, wherein the method comprises synthesizing the polypeptide sequence of the mutant using Fluoromethoxycarbonyl amino acids (Fmoc-AAs) wherein the Fmoc-AAs are side-protected using tert-butyl (tBu) for E, S, T, and Y; Trt or Dmcp for N; tert-butoxycarbonyl (Boc) for K; and wherein the cysteines (Cs) are sequentially orthogonally side-protected by the introduction of FmocCys(Trt)-OH at positions 7 and 15, Fmoc-Cys(Acm)-OH at positions 10 and 18, and Fmoc-Cys (Mob)-OH at positions 6 and 11.

3. The mutant according to claim 1 wherein the mutant is coupled to a carrier.

4. The mutant according to claim 3 wherein said carrier is CRM197 or LT-B.

5. The mutant according to claim 1 wherein a carrier is coupled to the mutant at an internal amino acid and/or wherein a carrier is coupled to the mutant at the N-terminus.

6. The mutant according to claim 1 wherein the mutant is acetylated at its N-terminus.

7. The mutant according to claim 1 wherein the mutant is folded by site-selective cysteine pairing.

8. The mutant according to claim 7 wherein site-selective cysteine pairing occurs in the order: positions 7 and 15, positions 10 and 18, and lastly positions 6 and 11.

* * * * *